United States Patent
Spivack et al.

(10) Patent No.: US 11,249,714 B2
(45) Date of Patent: Feb. 15, 2022

(54) SYSTEMS AND METHODS OF SHAREABLE VIRTUAL OBJECTS AND VIRTUAL OBJECTS AS MESSAGE OBJECTS TO FACILITATE COMMUNICATIONS SESSIONS IN AN AUGMENTED REALITY ENVIRONMENT

(71) Applicant: Magical Technologies, LLC, Redmond, WA (US)

(72) Inventors: Nova Spivack, Redmond, WA (US); Matthew Hoerl, Redmond, WA (US)

(73) Assignee: Magical Technologies, LLC, Wilmington, DE (US)

( * ) Notice: Subject to any disclaimer, the term of this patent is extended or adjusted under 35 U.S.C. 154(b) by 34 days.

(21) Appl. No.: 16/130,499

(22) Filed: Sep. 13, 2018

(65) Prior Publication Data
US 2019/0107990 A1  Apr. 11, 2019

Related U.S. Application Data

(60) Provisional application No. 62/621,470, filed on Jan. 24, 2018, provisional application No. 62/613,595, (Continued)

(51) Int. Cl.
*G06F 3/14* (2006.01)
*G06T 19/00* (2011.01)
(Continued)

(52) U.S. Cl.
CPC ............ *G06F 3/1454* (2013.01); *A63F 13/69* (2014.09); *A63F 13/80* (2014.09); *A63F 13/87* (2014.09);
(Continued)

(58) Field of Classification Search
CPC .... G06F 3/1454; G06F 3/04815; G06F 3/011; G06F 3/147; G06F 3/013; H04L 51/32;
(Continued)

(56) References Cited

U.S. PATENT DOCUMENTS 8,231,465 B2  7/2012  Yee
8,694,553 B2  4/2014  Shuster
(Continued)

FOREIGN PATENT DOCUMENTS

KR  10-2012-0007215 A  1/2012
KR  10-2014-0043522 A  4/2014
(Continued)

OTHER PUBLICATIONS

International Search Report & Written Opinion for Application No. PCT/US18/44214, Date of filing: Jul. 27, 2018, Applicant: Magical Technologies, LLC, dated Nov. 23, 2018, 20 pages.
(Continued)

*Primary Examiner* — Mong-Shune Chung
(74) *Attorney, Agent, or Firm* — London Bridge Ventures

(57) ABSTRACT

Systems and methods of shareable virtual objects and virtual objects as message objects to facilitate communications sessions in an augmented reality environment are disclosed. In one aspect, embodiments of the present disclosure include a method, which may be implemented on a system, to facilitate sharing of an object in an augmented reality environment of a real world environment. The method can further include world-locking the object or user-locking the object in accordance with a request of the object to be posted in the augmented reality environment for a given user. In world-locking the object, the object is enabled to be interacted with by the given user if and when the given user is at or in the vicinity of the given location. In user-locking the object, the object is enabled to be interacted with by the
(Continued)

given user regardless of where the given user is physically located in the real world environment.

20 Claims, 29 Drawing Sheets

Related U.S. Application Data filed on Jan. 4, 2018, provisional application No. 62/581,989, filed on Nov. 6, 2017, provisional application No. 62/575,458, filed on Oct. 22, 2017, provisional application No. 62/557,775, filed on Sep. 13, 2017.

(51) Int. Cl.

| | | |
|---|---|---|
| *G06F 3/01* | (2006.01) | |
| *H04L 12/58* | (2006.01) | |
| *A63F 13/80* | (2014.01) | |
| *A63F 13/87* | (2014.01) | |
| *A63F 13/69* | (2014.01) | |
| *G09G 5/14* | (2006.01) | |
| *G06F 3/147* | (2006.01) | |
| *G06F 3/0481* | (2022.01) | |
| *G06T 11/60* | (2006.01) | |
| *G09B 5/00* | (2006.01) | |
| *G09B 5/06* | (2006.01) | |
| *G06Q 30/06* | (2012.01) | |
| *G09B 5/02* | (2006.01) | |
| *G09B 5/04* | (2006.01) | |

(52) U.S. Cl.
CPC ............. *G06F 3/011* (2013.01); *G06F 3/013* (2013.01); *G06F 3/04815* (2013.01); *G06F 3/147* (2013.01); *G06Q 30/0635* (2013.01); *G06Q 30/0643* (2013.01); *G06T 11/60* (2013.01); *G06T 19/003* (2013.01); *G06T 19/006* (2013.01); *G09B 5/00* (2013.01); *G09B 5/065* (2013.01); *G09G 5/14* (2013.01); *H04L 51/046* (2013.01); *H04L 51/10* (2013.01); *H04L 51/32* (2013.01); *A63F 2300/537* (2013.01); *A63F 2300/609* (2013.01); *A63F 2300/80* (2013.01); *G09B 5/02* (2013.01); *G09B 5/04* (2013.01); *G09G 2340/10* (2013.01); *G09G 2340/12* (2013.01); *G09G 2370/20* (2013.01); *H04L 51/20* (2013.01)

(58) Field of Classification Search
CPC ....... H04L 51/10; H04L 51/046; H04L 51/20; G09G 5/14; G09G 2340/12; G09G 2340/10; G09G 2370/20; G06T 19/003; G06T 19/006; G06T 11/60; G06Q 30/0643; G06Q 30/0635; G09B 5/065; G09B 5/00; G09B 5/04; G09B 5/02; A63F 13/69; A63F 13/87; A63F 13/80; A63F 2300/80; A63F 2300/609; A63F 2300/537
USPC .................................. 345/428; 715/848, 850
See application file for complete search history.

(56) References Cited

U.S. PATENT DOCUMENTS

| | | |
|---|---|---|
| 8,878,846 B1 | 11/2014 | Francis |
| 8,930,195 B1 | 1/2015 | LeBeau |
| 9,781,342 B1 | 10/2017 | Turley |
| 10,026,226 B1 * | 7/2018 | Lotto ...................... H04W 4/02 |
| 10,339,721 B1 | 7/2019 | Dascola |
| 10,496,272 B1 | 12/2019 | Lonkar |
| 10,740,804 B2 | 8/2020 | Spivack |
| 10,904,374 B2 | 1/2021 | Spivack |
| 10,957,083 B2 | 3/2021 | Du |
| 2002/0099257 A1 | 7/2002 | Parker |
| 2002/0099679 A1 | 7/2002 | Usitalo |
| 2003/0158796 A1 | 8/2003 | Balent |
| 2005/0021472 A1 | 1/2005 | Gettman |
| 2008/0140494 A1 | 6/2008 | Charuk |
| 2008/0215415 A1 | 8/2008 | Wilims |
| 2009/0061901 A1 | 3/2009 | Arrasvuori |
| 2009/0144105 A1 | 6/2009 | Blatchley |
| 2009/0234943 A1 | 9/2009 | Garbow |
| 2009/0259662 A1 | 10/2009 | Cragun |
| 2009/0300122 A1 | 12/2009 | Freer |
| 2010/0100487 A1 | 4/2010 | Lingafelt |
| 2010/0114662 A1 | 5/2010 | Jung |
| 2011/0007086 A1 | 1/2011 | Kim |
| 2011/0251902 A1 | 10/2011 | Nagarajayya |
| 2012/0105473 A1 | 5/2012 | Bar-Zeev |
| 2012/0116728 A1 | 5/2012 | Shear |
| 2012/0154441 A1 | 6/2012 | Kim |
| 2012/0172131 A1 | 7/2012 | Boswell |
| 2012/0194541 A1 | 8/2012 | Kim |
| 2012/0218296 A1 | 8/2012 | Belimpasakis |
| 2012/0229508 A1 | 9/2012 | Wigdor |
| 2012/0239213 A1 | 9/2012 | Nagata |
| 2012/0249741 A1 | 10/2012 | Maciocci |
| 2012/9256954 | 10/2012 | Soon-Shiong |
| 2012/0290366 A1 | 11/2012 | Giles |
| 2013/0083173 A1 | 4/2013 | Geisner |
| 2013/0135344 A1 | 5/2013 | Stirbu |
| 2013/0141419 A1 | 6/2013 | Mount |
| 2013/0211945 A1 | 8/2013 | Po-Ching |
| 2013/0263016 A1 | 10/2013 | Lehtiniemi |
| 2013/0286004 A1 | 10/2013 | McCulloch |
| 2013/0293468 A1 | 11/2013 | Perez |
| 2013/0293584 A1 | 11/2013 | Anderson |
| 2013/0336093 A1 | 12/2013 | Suvanto |
| 2014/0028712 A1 | 1/2014 | Keating |
| 2014/0059447 A1 | 2/2014 | Berk |
| 2014/0063197 A1 | 3/2014 | Yamamoto |
| 2014/0071164 A1 | 3/2014 | Saklatvala |
| 2014/0100955 A1 | 4/2014 | Osotio |
| 2014/0100994 A1 | 4/2014 | Tatzel |
| 2014/0100997 A1 | 4/2014 | Mayerle |
| 2014/0114845 A1 | 4/2014 | Rogers |
| 2014/0168121 A1 | 6/2014 | Chou |
| 2014/0184496 A1 | 7/2014 | Gribetz |
| 2014/0208272 A1 | 7/2014 | Vats |
| 2014/0337920 A1 | 11/2014 | Giobbi |
| 2014/0361971 A1 | 12/2014 | Sala |
| 2014/0369558 A1 | 12/2014 | Holz |
| 2014/0372540 A1 | 12/2014 | Libin |
| 2015/0005070 A1 | 1/2015 | Monahan |
| 2015/0019983 A1 | 1/2015 | White |
| 2015/0055821 A1 | 2/2015 | Fotland |
| 2015/0058102 A1 | 2/2015 | Christensen |
| 2015/0123966 A1 | 5/2015 | Newman |
| 2015/0130689 A1 | 5/2015 | Sugden |
| 2015/0130836 A1 | 5/2015 | Anderson |
| 2015/0187137 A1 | 7/2015 | Mullins |
| 2015/0206349 A1 | 7/2015 | Rosenthal |
| 2015/0213355 A1 | 7/2015 | Sharma |
| 2015/0254793 A1 | 9/2015 | Hastings |
| 2015/0283460 A1 | 10/2015 | Huang |
| 2015/0302517 A1 | 10/2015 | Spivack |
| 2015/0302652 A1 | 10/2015 | Miller |
| 2015/0371447 A1 | 12/2015 | Yasutake |
| 2015/0378440 A1 | 12/2015 | Umlauf |
| 2016/0026253 A1 | 1/2016 | Bradski |
| 2016/0100034 A1 | 4/2016 | Miller |
| 2016/0133230 A1 | 5/2016 | Daniels |
| 2016/0134805 A1 | 5/2016 | Takahashi |
| 2016/0175715 A1 | 6/2016 | Ye |
| 2016/0203645 A1 | 7/2016 | Knepp |
| 2016/0217623 A1 * | 7/2016 | Singh ..................... G09G 3/003 |
| 2016/0234643 A1 | 8/2016 | Crutchfield |

(56) References Cited

U.S. PATENT DOCUMENTS

| | | |
|---|---|---|
| 2016/0314609 A1 | 10/2016 | Taylor |
| 2016/0323332 A1 | 11/2016 | Welinder |
| 2016/0330522 A1 | 11/2016 | Newell |
| 2016/0335289 A1 | 11/2016 | Andrews |
| 2016/0342782 A1 | 11/2016 | Mullins |
| 2017/0052507 A1 | 2/2017 | Poulos |
| 2017/0093780 A1 | 3/2017 | Lieb |
| 2017/0103584 A1 | 4/2017 | Vats |
| 2017/0123750 A1 | 5/2017 | Todasco |
| 2017/0154242 A1 | 6/2017 | Blanchflower |
| 2017/0178373 A1 | 6/2017 | Sarafa |
| 2017/0186232 A1 | 6/2017 | Dange |
| 2017/0193276 A1 | 7/2017 | Choi |
| 2017/0193314 A1 | 7/2017 | Kim |
| 2017/0243403 A1 | 8/2017 | Daniels |
| 2017/0244703 A1 | 8/2017 | Lee |
| 2017/0316186 A1 | 11/2017 | Breitenfeld |
| 2018/0053267 A1 | 2/2018 | Penner |
| 2018/0089869 A1 | 3/2018 | Bostick |
| 2018/0096362 A1 | 4/2018 | Kwan |
| 2018/0113594 A1 | 4/2018 | Alnatsheh |
| 2018/0145937 A1 | 5/2018 | Choi |
| 2018/0190003 A1* | 7/2018 | Upadhyay ............ G06T 19/003 |
| 2018/0190166 A1 | 7/2018 | Salmimaa |
| 2018/0196585 A1 | 7/2018 | Densham |
| 2018/0231921 A1 | 8/2018 | Smith |
| 2018/0268589 A1 | 9/2018 | Grant |
| 2018/0308287 A1 | 10/2018 | Daniels |
| 2018/0330542 A1 | 11/2018 | Bharti |
| 2018/0349088 A1 | 12/2018 | Leppanen |
| 2018/0350146 A1 | 12/2018 | Gervasio |
| 2018/0365883 A1 | 12/2018 | Fillhardt |
| 2018/0365897 A1 | 12/2018 | Pahud |
| 2018/0365898 A1 | 12/2018 | Costa |
| 2019/0005724 A1 | 1/2019 | Pahud |
| 2019/0034765 A1 | 1/2019 | Kaehler |
| 2019/0080172 A1 | 3/2019 | Zheng |
| 2019/0102946 A1 | 4/2019 | Spivack |
| 2019/0107990 A1 | 4/2019 | Spivack |
| 2019/0107991 A1 | 4/2019 | Spivack |
| 2019/0108558 A1 | 4/2019 | Spivack |
| 2019/0108578 A1 | 4/2019 | Spivack |
| 2019/0108580 A1 | 4/2019 | Spivack |
| 2019/0108682 A1 | 4/2019 | Spivack |
| 2019/0108686 A1 | 4/2019 | Spivack |
| 2019/0197935 A1 | 4/2019 | Spivack |
| 2019/0132700 A1* | 5/2019 | Yokoyama ............ H04L 65/403 |
| 2019/0188450 A1 | 6/2019 | Spivack |
| 2019/0236259 A1 | 8/2019 | Remillet |
| 2019/0253542 A1 | 8/2019 | Fan |
| 2019/0260870 A1 | 8/2019 | Spivack |
| 2019/0266404 A1 | 8/2019 | Spivack |
| 2019/0295298 A1 | 9/2019 | VanBlon |
| 2019/0318076 A1* | 10/2019 | Chun .................. H04W 4/021 |
| 2019/0355050 A1* | 11/2019 | Geisler ................ G06T 19/006 |
| 2019/0391637 A1 | 12/2019 | Taylor |
| 2019/0392085 A1 | 12/2019 | Ragan |
| 2020/0019295 A1 | 1/2020 | Spivack |
| 2020/0021784 A1 | 1/2020 | Grusche |
| 2020/0068133 A1 | 2/2020 | Spivack |
| 2020/0294311 A1 | 9/2020 | Holz |
| 2021/0026441 A1 | 1/2021 | Spivack |
| 2021/0074068 A1 | 1/2021 | Spivack et al. |
| 2021/0110608 A1 | 4/2021 | Elby |

FOREIGN PATENT DOCUMENTS

| | | |
|---|---|---|
| KR | 10-2014-0088578 | 7/2014 |
| KR | 10-1693631 B1 | 1/2017 |
| WO | 2017093605 | 6/2017 |
| WO | 2019023659 | 1/2019 |
| WO | 2019028159 | 2/2019 |
| WO | 2019055703 | 3/2019 |
| WO | 2019079826 | 4/2019 |
| WO | 2020018431 | 1/2020 |

OTHER PUBLICATIONS

International Search Report & Written Opinion for Application No. PCT/US18/44844, Date of filing: Aug. 1, 2018, Applicant: Magical Technologies, LLC, dated Nov. 16, 2018, 13 pages.
International Search Report & Written Opinion for Application No. PCT/US18/45450, Date of filing: Aug. 6, 2018, Applicant: Magical Technologies, LLC, dated Jan. 2, 2019, 20 pages.
International Search Report & Written Opinion for Application No. PCT/US18/50952, Date of filing; Sep. 13, 2018, Applicant: Magical Technologies, LLC, dated Mar. 15, 2019, 22 pages.
International Search Report & Written Opinion for Application No. PCT/US18/56951, Date of filing: Oct. 22, 2018, Applicant: Magical Technologies, LLC, dated Feb. 22, 2019, 17 pages.
International Search Report & Written Opinion for Application No. PCT/US19/41821, Date of filing: Jul. 15, 2019, Applicant: Magical Technologies, LLC, dated Nov. 21, 2019, 9 pages.
"Fujifilm balloon" (downloaded @https://web.archive.org/web/20150514181842/http://www.imageafter.com/image.php?image=b2ain/ehicle3002.jpg. (Year: 2015).
"Print Ad Rates", downloaded @ https://web.archive.org/web/20160319050126/https://diverseeducation.com/media-kit/print-ad-rates/,available online since Mar. 14, 2016 (Year: 2016).
Mehdi Mekni et al., 'Augmented Reality Applications, Challenges and Future Trends', Applied computer and applied computational science, Apr. 25, 2014, pp. 205-214.
IPRP for Application No. PCT/US18/44214, Date of filing: Jul. 27, 2018, Applicant: Magical Technologies, LLC, Date of Mailing: Jan. 28, 2020, 18 pages.
IPRP for Application No. PCT/US18/44844, Date of filing: Aug. 1, 2018, Applicant: Magical Technologies, LLC, Date of Mailing: Feb. 4, 2020, 11 pages.
IPRP for Application No. PCT/US18/45450, Date of filing: Aug. 6, 2018, Applicant: Magical Technologies, LLC, Date of Mailing: Feb. 13, 2020, 10 pages.
International Search Report & Written Opinion for Application No. PCT/US18/50952, Date of filing: Sep. 13, 2018, Applicant: Magical Technologies, LLC, dated Mar. 17, 2020, 12 pages.
IPRP for Application No. PCT/US19/41821, Date of filing: Jul. 15, 2019, Applicant: Magical Technologies, LLC, Date of Mailing: Nov. 21, 2019, 8 pages.
Previtali et al. ("A Flexible Methodology for Outdoor/Indoor Building Reconstruction From Occluded Point Clouds", ISRS Annals of the Photogrammetry, Remote Sensing and Spatial Information Sciences, vol. II-3, 2014 ISPRS Technical Commission III Symposium, Sep. 5-7, 2014, Zurich, Switzerland) (Year: 2014).
IPRP for Application No. PCT/US18/56951, Date of filing: Oct. 22, 2018, Applicant: Magical Technologies, LLC, Date of Mailing: Apr. 28, 2020, 16 pages.
English translation of KR 2012-0042253.
English translation of KR 2014-0088578.
English translation of KR 101693631 Bl.
English translation of KR 20120007215 A.
English translation of KR 20140043522 A.
Szemenyei, Maiden, and Ferenc Vajda. "3d object detection and scene optimization for tangible augmented reality." Periodica Polytechnica Electrical Engineering and Computer Science 62.2 (2018): 25-3. (Year: 2018).

* cited by examiner

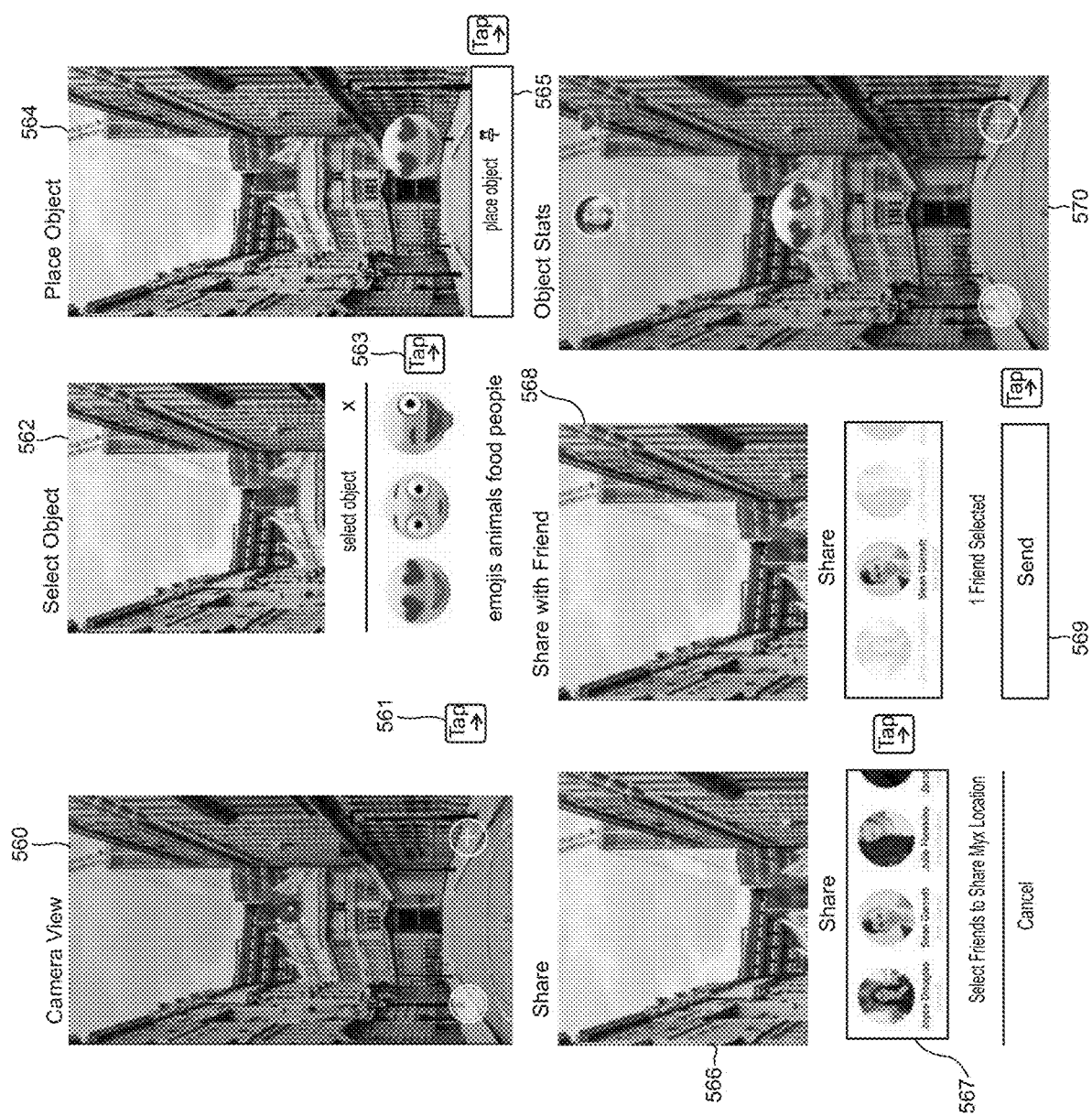

SYSTEMS AND METHODS OF SHAREABLE VIRTUAL OBJECTS AND VIRTUAL OBJECTS AS MESSAGE OBJECTS TO FACILITATE COMMUNICATIONS SESSIONS IN AN AUGMENTED REALITY ENVIRONMENT

CLAIM OF PRIORITY

This application claims the benefit of:

* U.S. Provisional Application No. 62/557,775, filed Sep. 13, 2017 and entitled "Systems and Methods of Augmented Reality Enabled Applications Including Social Activities or Web Activities and Apparatuses of Tools Therefor," (8004.US00), the contents of which are incorporated by reference in their entirety;

* U.S. Provisional Application No. 62/575,458, filed Oct. 22, 2017 and entitled "Systems, Methods and Apparatuses of Single directional or Multi-directional Lens/Mirrors or Portals between the Physical World and a Digital World of Augmented Reality (AR) or Virtual Reality (VR) Environment/Objects; Systems and Methods of On-demand Curation of Crowdsourced (near) Real time Imaging/Video Feeds with Associated VR/AR Objects; Systems and Methods of Registry, Directory and/or Index for Augmented Reality and/or Virtual Reality Objects," (8005.US00), the contents of which are incorporated by reference in their entirety; and

* U.S. Provisional Application No. 62/581,989, filed Nov. 6, 2017 and entitled "Systems, Methods and Apparatuses of: Determining or Inferring Device Location using Digital Markers; Virtual Object Behavior Implementation and Simulation Based on Physical Laws or Physical/Electrical/Material/Mechanical/Optical/Chemical Properties; User or User Customizable 2D or 3D Virtual Objects; Analytics of Virtual Object Impressions in Augmented Reality and Applications; Video objects in VR and/or AR and Interactive Multidimensional Virtual Objects with Media or Other Interactive Content," (8006.US00), the contents of which are incorporated by reference in their entirety.

* U.S. Provisional Application No. 62/613,595, filed Jan. 4, 2018 and entitled "Systems, methods and apparatuses of: Creating or Provisioning Message Objects Having Digital Enhancements Including Virtual Reality or Augmented Reality Features and Facilitating Action, Manipulation, Access and/or Interaction Thereof," (8008.US00), the contents of which are incorporated by reference in their entirety.

* U.S. Provisional Application No. 62/621,470, filed Jan. 24, 2018 and entitled "Systems, Methods and Apparatuses to Facilitate Gradual and Instantaneous Change or Adjustment in Levels of Perceptibility of Virtual Objects and Reality Object in a Digital Environment," (8009.US00), the contents of which are incorporated by reference in their entirety.

CROSS-REFERENCE TO RELATED APPLICATIONS

This application is related to U.S. application Ser. No. 16/130,541, also filed on Sep. 13, 2018 and entitled "Systems And Methods Of Virtual Billboarding And Collaboration Facilitation In An Augmented Reality Environment," the contents of which are incorporated by reference in their entirety.

This application is related to U.S. application Ser. No. 16/160,582, also filed on Sep. 13, 2018 and entitled "Systems And Methods Of Rewards Object Spawning And Augmented Reality Commerce Platform Supporting Multiple Seller Entities", the contents of which are incorporated by reference in their entirety.

This application is related to PCT Application no. PCT/US18/50952, also filed on Sep. 13, 2018 and entitled "Systems And Methods Of Shareable Virtual Objects and Virtual Objects As Message Objects To Facilitate Communications Sessions In An Augmented Reality Environment", the contents of which are incorporated by reference in their entirety.

This application is related to PCT Application no. PCT/US2018/44844, filed Aug. 1, 2018 and entitled "Systems, Methods and Apparatuses to Facilitate Trade or Exchange of Virtual Real-Estate Associated with a Physical Space", the contents of which are incorporated by reference in their entirety.

This application is related to PCT Application no. PCT/US2018/45450, filed Aug. 6, 2018 and entitled "Systems, Methods and Apparatuses for Deployment and Targeting of Context-Aware Virtual Objects and/or Objects and/or Behavior Modeling of Virtual Objects Based on Physical Principles", the contents of which are incorporated by reference in their entirety.

TECHNICAL FIELD

The disclosed technology relates generally to augmented reality environments and virtual objects that are shareable amongst users.

BACKGROUND

The advent of the World Wide Web and its proliferation in the 90's transformed the way humans conduct business, live lives, consume/communicate information and interact with or relate to others. A new wave of technology is on the cusp of the horizon to revolutionize our already digitally immersed lives.

BRIEF DESCRIPTION OF THE DRAWINGS

FIG. 5F graphically depicts example user interfaces for placing a virtual object at a physical location and example user interfaces for sharing a virtual object with another user via an augmented reality environment, in accordance with embodiments of the present disclosure.

DETAILED DESCRIPTION

Figure 1:
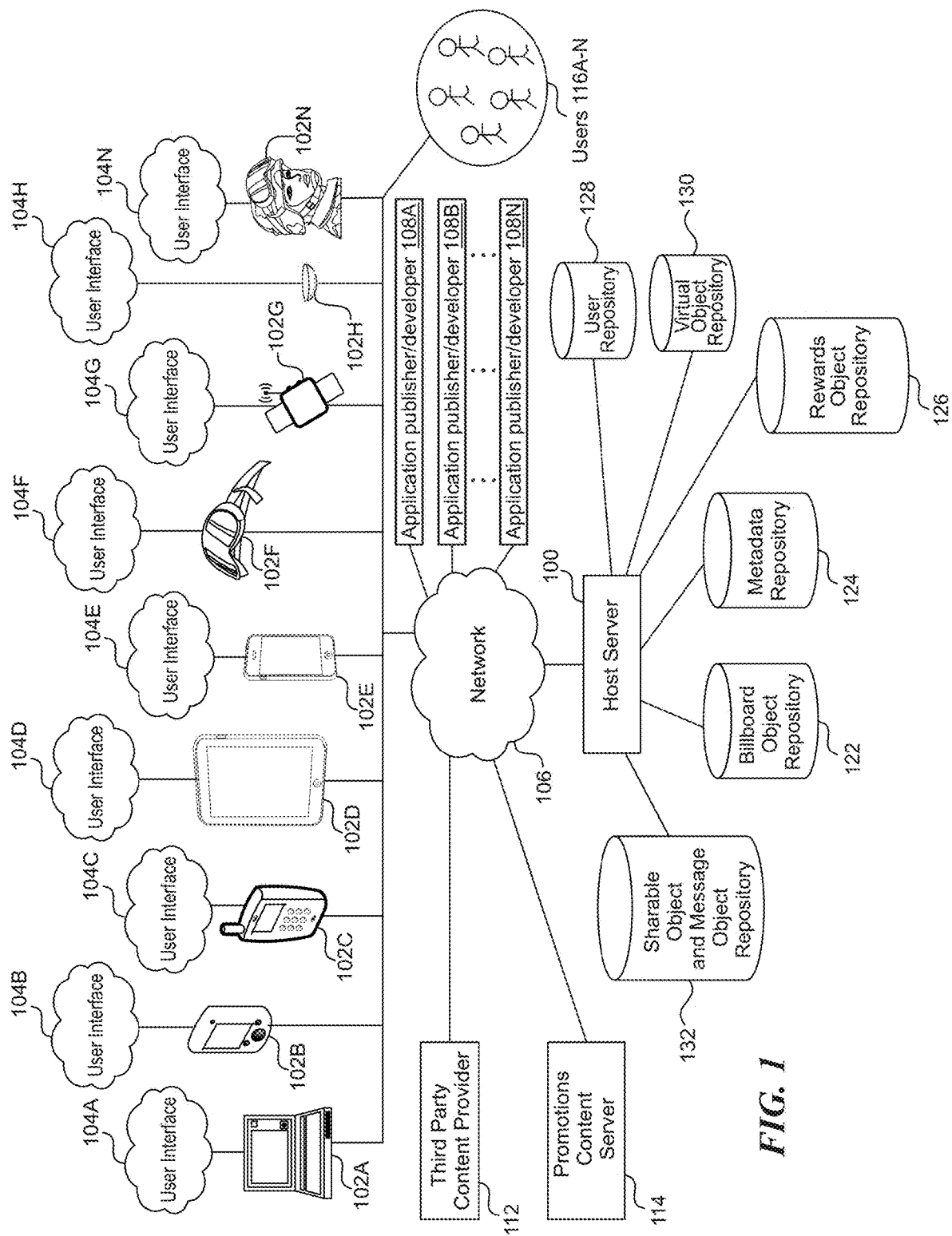
FIG. 1 illustrates an example block diagram of a host server able to deploy virtual objects for various applications, in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems, methods and apparatuses of platforms (e.g., as hosted by the host server 100 as depicted in the example of FIG. 1) of shareable virtual objects and virtual objects as message objects to facilitate communications sessions in an augmented reality environment. In general, the object or virtual object is generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable.

Further embodiments include, systems and methods of collaboration facilitation in an augmented reality environment. Embodiments of the present disclosure further include providing an educational experience in a real world environment, via an augmented reality platform. Embodiments of the present disclosure further include systems, methods and apparatuses to facilitate interaction with a virtual billboard associated with a physical location in the real world environment.

Further embodiments of the present disclosure further include systems, methods and apparatuses of platforms (e.g., as hosted by the host server 100 as depicted in the example of FIG. 1) to spawn a rewards object in an augmented reality platform having value to a user in the real world environment. Yet further embodiments of the present disclosure include an augmented reality commerce platform administer a marketplace which supports multiple seller entities via an augmented reality environment.

One embodiment includes, sending a virtual object (VOB) as a message.

For example, the VOB appears in the recipient's inbox, message stream, or device as a 3D object that can be interacted with (open it, talk to it, touch it or play with it, read it share it, reply to it, file it, publish it, edit it, customize it, tag it or annotate it etc). The recipient's inbox can include a 2D or 3D interface (list, plane, 3D space). The VOB can be set to appear at a fixed distance relative to or near the user, and/or at specific times, and/or within or near specified geolocations or named places, and/or in specified contexts (shopping, working, at home).

In general, VOBs can function like messages that have one or more recipients like email (to, CC, Bcc) and can also be shared with groups or made public, tagged or pinned to the top or a certain location in an interface. VOBs can also carry envelope metadata (e.g. created date, sent date, received date, etc). A thread of related VOB messages is a conversation that uses VOBs as the medium.

Embodiments of the present disclosure further include systems, methods and apparatuses of: creating, rendering, depicting, provisioning, and/or generating message objects with digital enhancements. The enhanced messages can include virtual and/or augmented reality features. The enhanced messages can further be rendered, accessed, transmitted, manipulated, acted on and/or otherwise interacted with via various networks in digital environments by or amongst users, real or digital entities, other simulated/virtual objects or computing systems including any virtual reality (VR), non-virtual reality, augmented reality (AR) and/or mixed reality (mixed AR, VR and/or reality) environments or platforms. For instance, enhanced messages can be shared, transmitted or sent/received via communication channels including legacy SMS, Internet, mobile network via web services, applications (e.g., mobile apps) or dedicated platforms such as VR/AR or mixed VR/AR platforms or environments.

Example embodiments of the present disclosure further include, by way of example:

In one embodiment, a user drafts, writes or composes a message having augmented reality ("AR") content. The AR content can include one or more virtual objects. A virtual object can include a 2D or 3D graphical rendering, which can include one or more of: text, images, audio, video, or computer graphics animation. The virtual object can appear and be accessed (preview, view, shared, edited, modified), acted on and/or interacted with via an imaging device such as a smartphone camera, wearable device such as an augmented reality (AR) or virtual reality (VR) headset, gaming consoles, any wearable technology, AR glasses, wearable smart watch, wearable computer, heads up display, advanced textiles, smart garments, smart shoes, smart helmets, activity trackers, in car display or in car navigation panel or unit, etc.)

The message can be for instance, supplemented, formatted, optimized or designed with additional text, graphical content, multimedia content, and/or simulated objects or virtual objects. The user can place the enhanced messages (or any of the simulated or virtual objects) in physical locations relative to their device, and/or also relative to other virtual objects or simulated objects in the scene to construct a scene relative to a user view or the user's camera perspective.

In one example, if a user places a virtual object visually in front of their physical position, the virtual or simulated object can be saved to that physical position or near that physical position or within a range of the physical location. The user can also place and save the object for example, at any angle e.g., 10 degrees to the right of their front position If placed at a particular angle, and/or size and/or swivel the virtual object, it can be saved in that particular relative location and orientation. The user can also turn around and place it behind themselves and then turn forward again, before sending the message, then it can then save that virtual object or simulated object as being behind them.

In one embodiment, the user can further select, identify or specify recipients of for the message. For example, the Recipients can be from existing contacts lists, or can be added as new contacts and/or individuals or named groups or lists of individuals.

Note that a recipient need not be a single person. For instance, a recipient can be an AR enabled chatroom, group or mailing list An AR enabled chatroom, group or mailing list can be associated with a name and/or address. It may also have policies and permissions governing who is the admin, what other roles exist and what their access, preview, view, edit, delete, enhance, sharing, read/write/invite permissions are.

In one embodiment, an AR enabled chatroom or group is or includes a shared social space where AR messages (e.g., enhanced messages) that are sent to the chatroom or group can be updated synchronously and/or asynchronously to all the recipients. This enables a real-time or near-real-time or asynchronous AR experience for the participants. In some instances, posting AR content to the chatroom or group can be equivalent to sending an AR message to the members of the group or chatroom.

According to embodiments of the present disclosure, a user sends a message (e.g., the enhanced message) to recipients and the message can be transmitted to recipients. The recipients can be notified that they have received an AR message or that a system has received a message intended for them. If recipients are members of a group that is the recipient or intended recipient, then a group notification can be sent to individual members of the group. Recipients can be notified with a text message, social invite on Facebook or Twitter or another social network, a message in a chatroom, an email message, or a notification on their phone, or a notification in a particular messaging or other type of mobile, desktop or enterprise/Web app.

In some embodiments, individual recipients can open the AR message to access, preview or view its content. The relevant application can also automatically open to access the message. For example, by clicking on or otherwise selecting the notification, the AR message can be acted on or interacted with. For example, the AR message can be opened and rendered in the appropriate application or reader for display or further action or interaction.

Identifiers for an application or plug-in used to display, present or depict it can be conveyed or included in metadata in the notification, or it can be implicit in the type of notification or channel that the notification is sent through and received in. The AR application that detects or receives and renders the message can depict or display the content of the message appropriately. In particular, virtual objects or simulated objects that were placed into relative positions around the sender can be rendered in the same relative positions around the receiver.

If the sender places a virtual/simulated object, or set of objects, in front of their camera when they composed the message, then those objects can appear in front of the recipient's camera in the same relative positions that the sender intended. If a user puts a virtual object behind themselves, the virtual object can also be behind the receiver when they receive the AR message and the receiver can then turn around and see the virtual object behind them in that case.

In addition, individual recipients can perform social actions on a received AR message, based on the policies and permissions of the application they use to receive it and/or the metadata on the message itself. They can also reply to an AR message with another AR message. They may reply to an AR message with a new AR message, or a non-AR message. With proper permissions and/or upon meeting certain criteria, users or recipients can modify an AR message to be stored, posted publicly/privately and/or sent in reply or forwarded to another user or group of users.

In an event when an AR message is configured to allow modifications, certain (or any) recipients can add modifications such as additional virtual objects, to the AR message, and these modifications can be be added to the original Message and the sender and any/all other recipients of the AR message will also get these updates. Revisions to the original message can be stored so users can roll back to or view any of the previous versions.

In other words, an AR message can be configured to be a collaborative object that can be modified on an ongoing basis by the sender and any/all recipients such that they can collaboratively add to, interact with or act on the content of the message. Modifications to an AR message can be subject to permissions, criterion and/or policies such as moderation approval by the sender or an admin.

In some embodiments, users can forward an AR message to other recipients Forwarding an AR message sends it to other recipients with forwarding metadata in the header of the message. They can comment on the AR message. A comment can be or include by way of example, text, document, message, emoji, emoticon, a gif, audio or video, that appears on an associated comments thread which can be non AR based or AR based.

A comment can also be created and rendered as an AR comment object or part of an AR comments digest object that is associated with the AR message. Users can save, tag, flag, delete, archive, rate, like, mark as spam, apply rules or filters, file into a folder, and perform other actions activities on or interact AR messages that are similar to the activities that can be performed on email, text messages or other digital objects rendered in a digital environment.

AR Billboarding and Messaging

Embodiments of the present disclosure further include AR billboarding and/or messaging. In one embodiment, when people post in the disclosed VR/AR environment, the system enables them to select a person and/or place and/or time to post it to. If they choose just the person it is a message. If just a place it can be a billboard. A person and place is a sticky note or targeted billboard. If they choose just a time then it appears for everyone they can post it to at a time. Place and time or person and time also have effects. The disclosed system can obey, implement or enforce the rules and displays what is permitted under the constraints. Enabling a person to post to a place that they are not in can be implemented. What plane do they post to, at what angle, what altitude in a building, the system can enable them to choose that with an altitude or floor of building selector, or building map. In some instance, it is free to post to place you are in but not free to places you are not in.

People could collaboratively tag places and things in places for us. A person chooses a plane at a place and names it "desk in my room" then that surface is logged with geo cords. It goes on the map as a named target. Other users can select it and post an object to that place. So the object appears at that named location relative to that place for anyone who is there. Billboards could be compound objects like that—e.g., as collages made of stickers. The "try it"

sticker on top of the "Lose Weight Feel Great" object. Compound objects can be implemented in the system as sticking things on or next to or near other things to build grouped objects and then define as a grouped object so it moves as one—like in a drawing app.

Algorithmic AR/VR Content Feeds

Embodiments of the present disclosure further include algorithmic AR/VR Content Feeds. A an example embodiment can include: (1) the Twitter near a billboard you designed for the video—or something like it, (2) some interesting things auto-spawning near the user (gems, 50% off coupon, secret VIP event ticket, free gift offer). Some of these could appear and then self-delete after n seconds or minutes, giving you a reason to look at the same place again even though you looked recently.

The system can award points for actions in the environment, like when you find a special virtual object, or when you do things like click on objects, etc. all of this speaks to the addictiveness and reward of the app. With a process that makes it relevant to each user (e.g., user activity stream for each user). So the story is that users get: messages from friends that are highly relevant by nature, relevant content near them about their interests (from public+layers they follow, in an algo-curated public feed), and relevant rewards and sponsored content (rewards from us and targeted ads/offers from sponsors). The content from friends and the relevant content around them+rewards, keeps them looking and coming back.

If the sponsored ad content is at least not irrelevant, and ideally also provides some points or other kinds of rewards (social reward, access to exclusive events, big savings, etc.) then users will not only tolerate them but may even enjoy and want them. If for example a sponsor made some great sponsored 3D content and even made it rewarding to engage with it, and it was relevant to Joe, then Joe would enjoy it rather than find it annoying. The difference between something being "content" or "annoying advertising" is relevancy and quality.

The system can reward users in a number of ways. One is the depicted content itself may be delightful or entertaining or useful. The other is that is the system includes a built in treasure hunt metagame—which spawns rewards that the system provides and that sponsors can pay for, to each user, intelligently. that the process is designed and adapted to keep users playing just like a slot machine.

In one embodiment, the system's reward system is akin to a real world casino. For example, the system provides a unique experience to the users so Joe doesn't see the same content or rewards every time he logs in. An "ad" in the system should be content+reward. If it is just content it has to be rewarding in itself. Otherwise at least add points rewards to it. The uncertainty and luck of discovery aspect—the potential jackpot aspect—these make it fun and addictive.

Statistically, the system can use and implement casino math and/or relevant mathematical adaptations for this—specifically, slot machines dynamically adjust the probability of a player winning based on how they are playing, to keep them betting. The system implements this or a version of this. A "bet" is another minute of attention in the environment.

Like a customized slot machine where jackpots are sponsored targeted ads (that the customer actually wants). But jackpots are both actually—the system can provide points awards to users for actions they take (time spent, interactions, clicks, etc.) and just by luck and based on their karma. So can advertisers—advertisers can insert rewards and the disclosed system runs them in the spawn. There are also other kinds of jackpots beyond just points—for example a coupon has a bar code and gives the user a huge discount at a store but may not dispense any points. Similarly a really great little game or collectors item VOB could also be rewarding to a user that likes that.

There can be several streams of content that users are exposed to in the disclosed VR/AR environment: (1) objects addressed explicitly to them, (2) objects that are shared with users and groups they follow (but are not explicitly addressed to them), (3) objects that are shared with them by the system, and sponsors of the system. The public layer can include of (2)+(3). All other layers can show for example, either (1) or only (2). The system's content and ads only appear in the public layer. A user can choose not to see the public layer, but they cannot choose to see the public layer without sponsored content (ads). The system ensures that public layer is so good and rewarding that users want to see it all the time.

One embodiment of the present disclosure includes some coins and gems and power-up objects—the system associates or assigns points with them, but advertisers can also buy them and run them and add some kind of branding to them so that when users redeem them they see some sponsored content, or have to first go through a sponsored interaction.

The key is lots of quality custom or adapted content to always keep the user engaged: There has to be the optimal ratio. Too much reward is also no longer special. In one embodiment, it is 80/n where n is usually 20% and there is a bell curve of greater and lower reward frequency where the frequency increases a bit while the user has good karma, and then there is another variable for the probability of different sized points rewards as well. For instance, a user who is more engaged can earn better karma and sees more rewards for a while, and there is a dice roll every time a reward spawns where the probability of a higher value reward also can change based on user karma for a while. The more a user uses with the disclosed AR/VR environment and the more they engage, the better they perform. Instead of 80/20 maybe it becomes 70/30 best case, and the user can earn bigger rewards on average during that time. But then it decays unless the user maintain it.

As for the 80 or 70% of the experience that is non-sponsored content, that can be user generated content (UGC) or content from APIs like Yelp and Twitter. Messaging, billboarding/community, publishing are the UGC part. Then we need a healthy amount of API content that is useful and contextually relevant (geo-relevant to start with).

In one example, of the 80% to 70%, about half is allocated or earmarked for UGC, and half could be from APIs. In fact even if there was only API content it could be useful in certain contexts. Like as a tourist or when looking for a place to eat—so that's a mechanism to fill the world with a lot of content: Twitter, Facebook, Insta, Yelp, Wikipedia, Google Maps—about things near you, the place near you. APIs of an object with the Linkedin profile, Insta profile, of each person near you can also be utilized.

Billboarding can be advantageous where there are lots of users. Messaging can be initially useful between friends. The API content can be what populates the world and is the primary excuse for looking through our lens. Adding geo-relevant Twitter, news, media content, and other social media content into the AR view is a good place to start because there is almost always something near you. Note that with the web there is really no page to look at that shows you relevant information from every network to where you are geographically and temporally right now. In a 2D interface you have a list to work with. But in AR, such as the disclosed AR environment, which is 3D, there is so much more room to work with. This touches on the desktop concept, and even personal intelligent assistants—basically the disclosed process includes an intelligent assistant that shows users relevant objects to user's context, through the system's lens.

A user's context includes, for example the user's identity, past, the user's present activity, location, time of day, who else is there. Usually the system will either have no API content or UGC for a user and place. The disclosed system executes processes which understand that users want to see messages from friends, the best content from people, groups and brands they follow, and the best, most popular, or most relevant stuff from public. Users also want to see rewards that give them value that matters to them—including points where redeemable (cryptocurrency, digital currency, fiat currency, etc.) or useful (buy virtual goods or pay to boost posts and get attention in the AR environment platform or system), and they want to see very entertaining and/or relevant content from sponsors.

The innovative process includes optimizing this mix to attain and achieve the most engagement and continued engagement from each individual user; the process includes a/b testing across users and populations of users and when it learns that some item is getting great response for some demographic and context it also can increase the frequency of that content for that audience and context. Or it can move it to the "top level" or outside of containers; basically to the disclosed system provides a great, non-cluttered UX; there always has to be enough to keep it engaging and interesting, and the system ensures that it nests or manages the world of information; the disclosed innovative rewards system helps with ensuring there is at least a chance there is a reward all the time; as an example, it's inovative function is to drive engagement with the UX.

In a further embodiment, the system enables users to attach AR/VR billboards together in the AR/VR environment—to tile them to make larger surfaces. For example attach a billboard to right edge of a billboard. They can then for example make a passageway formed of billboards facing in that you walk through. It could be an experiential thing—an art exhibit, a sequence of messages. Or a room. Or a maze. Or an entire building, etc.

The system enables these structures to be grouped so that the edges connect and precise angles and they remain that way relative to each other. In further embodiments some other shapes billboards are enabled to be designed customized, or selected—for example, a long rectangle that is as wide as two billboards so you can write a long wide message. A taller one. A triangle shape. A hexagon shape. A sphere. A cube. A rectangular block. These enable lots of billboard structures to be built. Users may be able to generate a non standard shape or design any geometric shape they desire. These become structures users can build. Each surface can have color, texture, and optional content (text or image). This enables AR objects to be built like LEGO. The 2d Wall shape one of many building blocks enabled in the disclosed system/platform.

One embodiment also includes billboard shapes that look like standard sign shapes (like a stop sign shape, a one way shape, etc) and flags that flap in the wind gently. These could have polls holding them up. Billboard shapes also include doorway, archway, window and portal objects shapes too. People can build cool things to see and explore. This enables second life kinda of activities on your own layer. For the public/main layer the real estate game would be necessary to build things that others see. Also note that in a room made of billboard wall objects if it has a floor and a ceiling and four walls it can have a light source inside it.

One embodiment further includes—a billboard or set of billboards that are portable in real space and/or digital space, e.g., that a user can take with them. For example a protest—they can carry them with them. Wherever the user is their billboard can be near them or above them. Other users can see that.

In addition, an object or billboard can be placed in a room so that it always appears in the right part of the room in the right orientation to the room—based on the shape of the room. For example the camera may be able to determine the geometry of the room.

In one embodiment, the system enables users to map spaces for us—crowd sourced—to map or determine the geometry of the room. If I am in my living room and I want to place an object precisely and have it always be oriented that way then to escape the limits of GPS I could map the room—in that mode the user would enter a special mode in the AR/VR environment and would walk the boundaries of the room as well as perhaps take photos from each wall of the room—the software agent or module of the AR/VR environment would learn the room. From this it could then keep 3D objects oriented relative to the shape of the room. The system can build up a database of mapped rooms. And this could improve if more users helped with more perspectives or to fill in missing pieces or missing rooms. The system can also award points to users for doing this.

Embodiments of the present disclosure further include physical stickers which can include stickers visible to the human eye, stickers that are highly reflective of IR and/or stickers that are not visible to the human eye. For example, A user could make stickers that appear transparent/almost invisible to the naked eye but that are highly visible to IR from camera phones—for example, using IR range finding device or sensors that can be built into portable devices. In one embodiment, these invisible stickers can be placed on the walls of rooms to enable devices to triangulate more precise locations in the rooms. In one embodiment, billboards can be configured or selected to be stuck to walls and other surfaces. This could also include taking a photo of the place where it appears to help identify it. Billboards can be transparent as well—so users just see the letters in space or on a wall.

One embodiment includes some special objects like lockable boxes and chests. They can be opened if the user has the key. Or the combination. Or certain required items. The system enables any virtual or digital content to be placed on any surface.

One problem addressed by the disclosed platform is if people build in the same or overlapping locations in their private layers the system decides what is show to users by default (e.g., in the public layer at that location). In one embodiment, the system can show a summary object that says "there are two giant castles here" unless one of them outbids the other to rent that real estate. If they rent the real estate then they can be the default and the other object is in a small orb or container that indicates there are other objects or content there.

One embodiment of the AR environment includes, a standardized container shape—an orb—that is recognizable. It appears wherever the system needs to contain and summarize many objects at a place without showing them. The orb can be identifiable in an iconography as an a special thing. It can have a number on it and could also have an icon for the type of things it contains. A Twitter orb would have the Twitter logo and a badge for the number of Tweets it contains. A MYXR Orb (e.g., an AR/VR orb) would have a MYXR logo and a badge for the number of MYXR or AR/VR objects (billboards, blocks, grouped named structures, it includes.). An example interaction would enable a user to activate an Orb and see an inventory of its contents and then choose the ones to pop out into the environment. They could also pop them all out and then fold them back into the Orb. The size of the Orb could reflect the number of objects it contains as well. In order to not be useful and encourage interaction with it, there could be one Orb per location containing sub orbs per type of collection (Twitter, Videos, Photos, etc).

Orbs can generally be a bit out of the way in any location—they could either float at about 7 feet altitude, or they could be in the heads up display (HUD) rather than objects in the scene. If they are in the HUD then they would basically be alerts that would appear and say "200 Tweets here"—if you tap on that alert then it puts a timeline of Tweets in front of the user and they can then see them all. Or if it says "100 billboards here" then it gives the user a list of them and they can choose which obese to see in the space".

One embodiment also includes balloon objects with messages on them. They float to the ceiling or a specific altitude. A giant hot air balloon even. And a dirigible of any size. A small one could cruise around a mall or office. A giant one could cruise over a park or a city. The system can construct some more building block objects to build structures and shapes with and enable them to be glued together to make structures.

The system deals with multiple objects in the same place from different layers in multiple ways—in the Main or Public view. In one example, the system can summarize them into an Orb, unless there is either <n of them, or they pay to promote. Promoted objects always appear on their own. If multiple or all of them pay they all appear outside the orb but share the location—which could involve them all rotating through the desired location, like a slow orbit. Also note an orb cannot contain only 1 object—so if there is only 1 object left in an orb, the orb goes away and the object becomes first level.

So in one example, a rule can bet, for any location, to avoid clutter if there are >20 virtual objects there, we put them into <20 Orbs (one Orb named for each layer that is represented and that has >2 virtual objects depicted, presented or posted at the location, and for any layers that only have 1 item at the location they go into an orb for Other Layers). An Orb for a layer has the icon or face for that layer on it.

For example, if you posted 5 VOBs to a location that has >20 items, an Orb would be formed for you and would contain your virtual objects; it would have your avatar or face on it, and a badge for "5". Other Orbs would group other virtual objects at the location. Except any sponsored/promoted items would appear outside their Orbs as well. You would want them to be listed inside their Orbs too so that if someone looks inside they are there as well, but they are already popped out of the Orb. So the listing of Orb contents would show them, but the state would indicate that they are already visible outside the Orb.

When objects are placed in a location on a layer, the system will present them in such a manner so as to prevent them from being right on top of each other, or overly overlapping, unless that was intentional (for example building a VOB where you want an emoticon right on the upper right corner of a billboard). When the system presents or depicts the Main or Public views, the system can move VOBs around slowly at the locations they wanted. So They are all orbiting there. There could be multiple billboards (e.g., 3 billboards) from different locations at a certain location—and in the Main or Public views, the system can present them to prevent them from overlapping in space—by orbiting or some other way. Another option would be that there is a marketplace—whoever pays the most points to promote their item gets the location, and then items where paid less are given locations near or around it. This could be a variant on the real-estate game.

When a user makes an item, there is an optional "Promote this item" field where you can pay some of your points, or buy more points, to promote it. The points you pay to promote it are somehow ticked down over time, and have to be refreshed when they run out, unless the user can assign an ongoing auto-pay budget to keep the points allotment at a certain level.

At a given location the objects can be arranged from the desired location of objects based on their points budgets. A user could look and see where their object is appearing in the scene and add more points to push it to the center position, or closer to the center, of a desired location. The distance between objects can be configured as the different in points budgets. For example, if the central object paid 100, and the next object paid 50, and then next paid 40, there would be a greater distance between object 1 and 2 than between 2 and 3.

Examples of Video Objects in Virtual and/or Augmented Reality

A further embodiment of the present disclosure includes video objects in virtual reality and/or augmented reality. One embodiment includes the ability to render or depict a video on a surface or billboard or virtual screen in a mixed reality environment. Similar to picture billboards. The virtual video screen can behave like a 2D or 3D object in the augmented reality scene. It can be a stationary virtual object at a location and the user can walk around it like a physical object. Or it can turn or orient to the user. Users can interact with it to start, stop, rewind, fast forward, mute sound, adjust volume. It can autoplay when a user is in proximity or it can loop. User may also be able to tune the virtual video screen to a channel or a particular content selection. It may also have a hide or directory or search function or playlist.

User Generated and User-Customizable 3D or 2D Virtual Objects

Further embodiments of the present disclosure include user generated and user-customizable 3d or 2d virtual objects. In one embodiment, the system/platform implements 3d or 2d virtual objects that can be user generated and/or user customized. For example, users can choose a virtual object type from a library of types or templates, and then customize it with optional text, formatting, color, fonts, design elements, shapes, borders, frames, illustrations, backgrounds, textures, movement, and other design parameters. They can also choose a template such as a 3D object for a neon sign and customize just the content of the sign in a template, or they can choose a 3D balloon and add customized text to the balloon object. User can also post their own billboards or words, audio or video onto objects.

Interactive Multidimensional Virtual Objects with Media or Other Interactive Content Further embodiments of the present disclosure include interactive multidimensional virtual objects with media or other interactive content. For example, the system can further map video objects or any other interactive, static, dynamic or media content onto any 2D, 3D or multidimensional object. For example, the system supports and implements a media cube such as a video cube, sphere or another shape where each surface or face of the cube (or other shaped object) shows the same or different video/media/interactive/static/dynamic content. The cube or other shaped object face can be of any shape, (round, square, triangular, diamond, etc.). The media cube virtual object can be implemented at a larger scale in pubic arenas (e.g., times square) or concerts or sports games (e.g, Jumbotron large screen technology) to for example, show zoom ins or close ups.

In one embodiment, live video, live streaming video can be depicted or streamed in real time, near real time or replay on the faces of a 2D virtual object (e.g., a billboard) a cube or on a sphere from a camera in a physical location, or from in another app, or from another platform user or any user in some specified or random location in the world. For instance, 360 degree, or panoramic, or other wide angle videos could be depicted in a spherical virtual object (e.g., like a crystal ball). In one embodiment, a user can view at the 360 degree, or panoramic, or other wide angle video from outside the video sphere. The user can further 'go into' the sphere and enter the 360 degree, or panoramic, or other wide angle in a virtual reality or augmented reality experience like video player (360 degree, or panoramic, or other wide angle video player).

Embodiments of the present disclosure include systems, methods and apparatuses of platforms (e.g., as hosted by the host server 100 as depicted in the example of FIG. 1) for deployment and targeting of context-aware virtual objects and/or behavior modeling of virtual objects based on physical laws or principle. Further embodiments relate to how interactive virtual objects that correspond to content or physical objects in the physical world are detected and/or generated, and how users can then interact with those virtual objects, and/or the behavioral characteristics of the virtual objects, and how they can be modeled. Embodiments of the present disclosure further include processes that augmented reality data (such as a label or name or other data) with media content, media content segments (digital, analog, or physical) or physical objects. Yet further embodiments of the present disclosure include a platform (e.g., as hosted by the host server 100 as depicted in the example of FIG. 1) to provide an augmented reality (AR) workspace in a physical space, where a virtual object can be rendered as a user interface element of the AR workspace.

Embodiments of the present disclosure further include systems, methods and apparatuses of platforms (e.g., as hosted by the host server 100 as depicted in the example of FIG. 1) for managing and facilitating transactions or other activities associated with virtual real-estate (e.g., or digital real-estate). In general, the virtual or digital real-estate is associated with physical locations in the real world. The platform facilitates monetization and trading of a portion or portions of virtual spaces or virtual layers (e.g., virtual real-estate) of an augmented reality (AR) environment (e.g., alternate reality environment, mixed reality (MR) environment) or virtual reality VR environment.

In an augmented reality environment (AR environment), scenes or images of the physical world is depicted with a virtual world that appears to a human user, as being superimposed or overlaid of the physical world. Augmented reality enabled technology and devices can therefore facilitate and enable various types of activities with respect to and within virtual locations in the virtual world. Due to the inter connectivity and relationships between the physical world and the virtual world in the augmented reality environment, activities in the virtual world can drive traffic to the corresponding locations in the physical world. Similarly, content or virtual objects (VOBs) associated with busier physical locations or placed at certain locations (e.g., eye level versus other levels) will likely have a larger potential audience.

By virtual of the inter-relationship and connections between virtual spaces and real world locations enabled by or driven by AR, just as there is a value to real-estate in the real world locations, there can be inherent value or values for the corresponding virtual real-estate in the virtual spaces. For example, an entity who is a right holder (e.g., owner, renter, sub-lettor, licensor) or is otherwise associated a region of virtual real-estate can control what virtual objects can be placed into that virtual real-estate.

The entity that is the rightholder of the virtual real-state can control the content or objects (e.g., virtual objects) that can be placed in it, by whom, for how long, etc. As such, the disclosed technology includes a marketplace (e.g., as run by server 100 of FIG. 1) to facilitate exchange of virtual real-estate (VRE) such that entities can control object or content placement to a virtual space that is associated with a physical space.

Embodiments of the present disclosure further include systems, methods and apparatuses of seamless integration of augmented, alternate, virtual, and/or mixed realities with physical realities for enhancement of web, mobile and/or other digital experiences. Embodiments of the present disclosure further include systems, methods and apparatuses to facilitate physical and non-physical interaction/action/reactions between alternate realities. Embodiments of the present disclosure also systems, methods and apparatuses of multidimensional mapping of universal locations or location ranges for alternate or augmented digital experiences. Yet further embodiments of the present disclosure include systems, methods and apparatuses to create real world value and demand for virtual spaces via an alternate reality environment.

The disclosed platform enables and facilitates authoring, discovering, and/or interacting with virtual objects (VOBs). One example embodiment includes a system and a platform that can facilitate human interaction or engagement with virtual objects (hereinafter, 'VOB,' or 'VOBs') in a digital realm (e.g., an augmented reality environment (AR), an alternate reality environment (AR), a mixed reality environment (MR) or a virtual reality environment (VR)). The human interactions or engagements with VOBs in or via the disclosed environment can be integrated with and bring utility to everyday lives through integration, enhancement or optimization of our digital activities such as web browsing, digital (online, or mobile shopping) shopping, socializing (e.g., social networking, sharing of digital content, maintaining photos, videos, other multimedia content), digital communications (e.g., messaging, emails, SMS, mobile communication channels, etc.), business activities (e.g., document management, document procession), business processes (e.g., IT, HR, security, etc.), transportation, travel, etc.

The disclosed innovation provides another dimension to digital activities through integration with the real world environment and real world contexts to enhance utility, usability, relevancy, and/or entertainment or vanity value through optimized contextual, social, spatial, temporal awareness and relevancy. In general, the virtual objects depicted via the disclosed system and platform. can be contextually (e.g., temporally, spatially, socially, user-specific, etc.) relevant and/or contextually aware. Specifically, the virtual objects can have attributes that are associated with or relevant real world places, real world events, humans, real world entities, real world things, real world objects, real world concepts and/or times of the physical world, and thus its deployment as an augmentation of a digital experience provides additional real life utility.

Note that in some instances, VOBs can be geographically, spatially and/or socially relevant and/or further possess real life utility. In accordance with embodiments of the present disclosure, VOBs can be or appear to be random in appearance or representation with little to no real world relation and have little to marginal utility in the real world. It is possible that the same VOB can appear random or of little use to one human user while being relevant in one or more ways to another user in the AR environment or platform.

The disclosed platform enables users to interact with VOBs and deployed environments using any device (e.g., devices 102A-N in the example of FIG. 1), including by way of example, computers, PDAs, phones, mobile phones, tablets, head mounted devices, goggles, smart watches, monocles, smart lens, smart watches and other smart apparel (e.g., smart shoes, smart clothing), and any other smart devices.

In one embodiment, the disclosed platform includes an information and content in a space similar to the World Wide Web for the physical world. The information and content can be represented in 3D and or have 360 or near 360 degree views. The information and content can be linked to one another by way of resource identifiers or locators. The host server (e.g., host server 100 as depicted in the example of FIG. 1) can provide a browser, a hosted server, and a search engine, for this new Web.

Embodiments of the disclosed platform enables content (e.g., VOBs, third party applications, AR-enabled applications, or other objects) to be created and placed into layers (e.g., components of the virtual world, namespaces, virtual world components, digital namespaces, etc.) that overlay geographic locations by anyone, and focused around a layer that has the highest number of audience (e.g., a public layer). The public layer can in some instances, be the main discovery mechanism and source for advertising venue for monetizing the disclosed platform.

In one embodiment, the disclosed platform includes a virtual world that exists in another dimension superimposed on the physical world. Users can perceive, observe, access, engage with or otherwise interact with this virtual world via a user interface (e.g., user interface 104A-N as depicted in the example of FIG. 1) of client application (e.g., accessed via using a user device, such as devices 102A-N as illustrated in the example of FIG. 1).

One embodiment of the present disclosure includes a consumer or client application component (e.g., as deployed on user devices, such as user devices 102A-N as depicted in the example of FIG. 1) which is able to provide geo-contextual awareness to human users of the AR environment and platform. The client application can sense, detect or recognize virtual objects and/or other human users, actors, non-player characters or any other human or computer participants that are within range of their physical location, and can enable the users to observe, view, act, interact, react with respect to the VOBs.

Furthermore, embodiments of the present disclosure further include an enterprise application (which can be desktop, mobile or browser based application). In this case, retailers, advertisers, merchants or third party e-commerce platforms/sites/providers can access the disclosed platform through the enterprise application which enables management of paid advertising campaigns deployed via the platform.

Users (e.g., users 116A-N of FIG. 1) can access the client application which connects to the host platform (e.g., as hosted by the host server 100 as depicted in the example of FIG. 1). The client application enables users (e.g., users 116A-N of FIG. 1) to sense and interact with virtual objects ("VOBs") and other users ("Users"), actors, non-player characters, players, or other participants of the platform. The VOBs can be marked or tagged (by QR code, other bar codes, or image markers) for detection by the client application.

One example of an AR environment deployed by the host (e.g., the host server 100 as depicted in the example of FIG. 1) enables users to interact with virtual objects (VOBs) or applications related to shopping and retail in the physical world or online/e-commerce or mobile commerce. Retailers, merchants, commerce/e-commerce platforms, classified ad systems, and other advertisers will be able to pay to promote virtual objects representing coupons and gift cards in physical locations near or within their stores. Retailers can benefit because the disclosed platform provides a new way to get people into physical stores. For example, this can be a way to offer VOBs can are or function as coupons and gift cards that are available or valid at certain locations and times.

Additional environments that the platform can deploy, facilitate, or augment can include for example AR-enabled games, collaboration, education environment, marketplaces, public information, education, tourism, travel, dining, entertainment etc.

The seamless integration of real, augmented and virtual for physical places/locations in the universe is a differentiator. In addition to augmenting the world, the disclosed system also enables an open number of additional dimensions to be layered over it and, some of them exist in different spectra or astral planes. The digital dimensions can include virtual worlds that can appear different from the physical world. Note that any point in the physical world can index to layers of virtual worlds or virtual world components at that point. The platform can enable layers that allow non-physical interactions.

FIG. 1 illustrates an example block diagram of a host server 100 able to deploy virtual objects for various applications, in accordance with embodiments of the present disclosure.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102A-N can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, a wearable device, a head mounted device, a smart watch, a goggle, a smart glasses, a smart contact lens, and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, or a combination of the above.

The client devices 102A-N, application publisher/developer 108A-N, its respective networks of users, a third party content provider 112, and/or promotional content server 114, can be coupled to the network 106 and/or multiple networks. In some embodiments, the devices 102A-N and host server 100 may be directly connected to one another. The alternate, augmented reality network provided or developed by the application publisher/developer 108A-N can include any digital, online, web-based and/or mobile based environments including enterprise applications, advertising, entertainment, games, social networking, e-commerce, search, browsing, discovery, messaging, chatting, and/or any other types of activities (e.g., network-enabled activities).

In one embodiment, the host server 100 is operable to deploy virtual objects for various applications (e.g., as depicted or deployed via user devices 102A-N). The host server 100 can deploy shareable virtual objects and virtual objects as message objects for presentation to a user 116A-N via a user device 102A-N. The host server 100 can further provide virtual billboarding and collaboration facilitation in an augmented reality environment by users 116a-n. The host server 100 can also deploy rewards object spawning and administer augmented reality commerce platform supporting multiple seller entities.

In one embodiment, the disclosed framework includes systems and processes for enhancing the web and its features with augmented reality. Example components of the framework can include:
  Browser (mobile browser, mobile app, web browser, etc.)
  Servers and namespaces the host (e.g., host server 100 can host the servers and namespaces. The content (e.g, VOBs, any other digital object), applications running on, with, or integrated with the disclosed platform can be created by others (e.g., third party content provider 112, promotions content server 114 and/or application publisher/developers 108A-N, etc.).
  Advertising system (e.g., the host server 100 can run an advertisement/promotions engine through the platform and any or all deployed augmented reality, alternate reality, mixed reality or virtual reality environments)
  Commerce (e.g., the host server 100 can facilitate transactions in the network deployed via any or all deployed augmented reality, alternate reality, mixed reality or virtual reality environments and receive a cut. A digital token or digital currency (e.g., crypto currency) specific to the platform hosted by the host server 100 can also be provided or made available to users.)
  Search and discovery (e.g., the host server 100 can facilitate search, discovery or search in the network deployed via any or all deployed augmented reality, alternate reality, mixed reality or virtual reality environments)
  Identities and relationships (e.g., the host server 100 can facilitate social activities, track identifies, manage, monitor, track and record activities and relationships between users 116A).
  Functions and techniques performed by the host server 100 and the components therein are described in detail with further references to the examples of FIG. 3A-3B.

In general, network 106, over which the client devices 102A-N, the host server 100, and/or various application publisher/provider 108A-N, content server/provider 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 5G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a virtual object repository 130, a behavior profile repository 126, a metadata repository 124, an analytics repository 122 and/or a state information repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to generate, create and/or provide data to be stored in the user repository 128, the virtual object (VOB) repository 130, the rewards object repository 126, the metadata repository 124, the billboard object repository 122 and/or the shareable object and message object repository 132. The user repository 128 can store user information, user profile information, demographics information, analytics, statistics regarding human users, user interaction, brands advertisers, virtual object (or 'VOBs'), access of VOBs, usage statistics of VOBs, ROI of VOBs, etc.

The virtual object repository 130 can store virtual objects and any or all copies of virtual objects. The VOB repository 130 can store virtual content or VOBs that can be retrieved for consumption in a target environment, where the virtual content or VOBs are contextually relevant. The VOB repository 130 can also include data which can be used to generate (e.g., generated in part or in whole by the host server 100 and/or locally at a client device 102A-N) contextually-relevant or aware virtual content or VOB(s).

Similarly, the billboard object repository 122 can store virtual objects that are virtual billboards and any or all copies of virtual billboards. The billboard repository 122 can store virtual billboard content or VOBs that can be retrieved for consumption in a target environment, where the virtual billboard or VOBs can be contextually relevant. The billboard object repository 122 can also include data which can be used to generate (e.g., generated in part or in whole by the host server 100 and/or locally at a client device 102A-N) contextually-relevant or aware virtual content, virtual billboards or other VOB(s).

The rewards object repository 126 can store virtual objects and any or all copies of rewards objects. The rewards object repository 126 can store virtual rewards, rewards objects, virtual points, gifts, prizes, virtual content or VOBs that can be retrieved for consumption in a target environment, where the virtual content or VOBs can bee contextually relevant. The rewards object repository 126 can also include data which can be used to generate (e.g., generated in part or in whole by the host server 100 and/or locally at a client device 102A-N) contextually-relevant or aware virtual content, rewards objects, or other VOB(s).

The shareable object and message objects repository 132 can store virtual objects and any or all copies of message objects, note objects, publication objects, news objects, posts and/or any other shareable VOBs. The shareable object and message objects repository 132 can store v message objects, note objects, publication objects, news objects, posts and/or any other shareable VOBs that can be retrieved for consumption in a target environment, where the virtual content or VOBs can be contextually relevant. The rewards object repository 126 can also include data which can be used to generate (e.g., generated in part or in whole by the host server 100 and/or locally at a client device 102A-N) contextually-relevant or aware virtual content, rewards objects, or other VOB(s).

The metadata repository 124 is able to store virtual object metadata of data fields, identification of VOB classes, virtual object ontologies, virtual object taxonomies, etc. The metadata repository 124 can also store product metadata and/or transaction metadata for VOBs that represent product listings in a marketplace in the AR environment. In addition, the metadata repository 124 can store virtual object metadata of data fields for rewards objects and/or rewards campaigns, rewards campaigns metadata, rewards campaign parameters, etc.

Figure 2A:
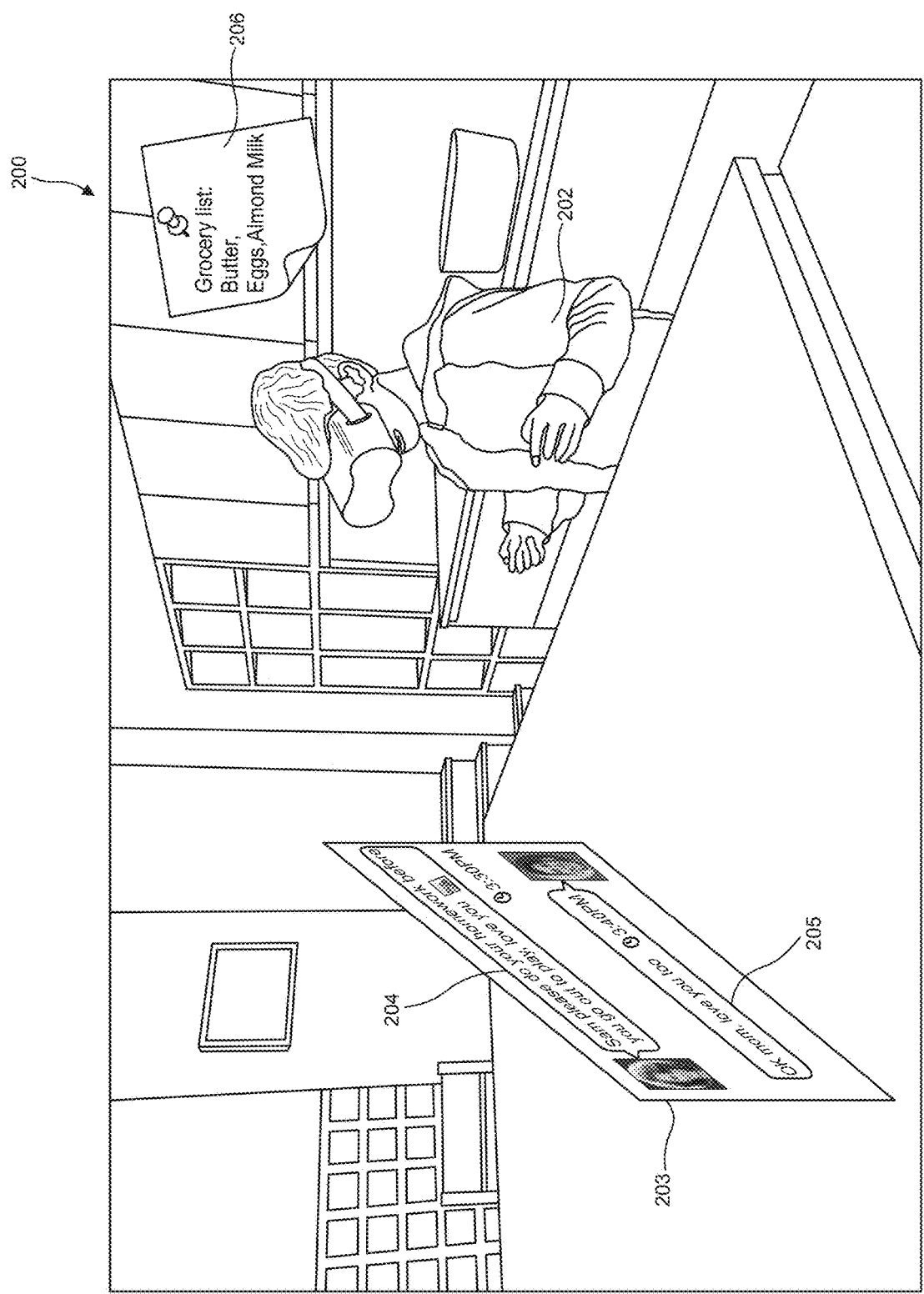
FIG. 2A depicts an example diagram showing an example of a virtual object to facilitate an augmented reality experience including a communications session and an example of a virtual object which includes a shareable note in an augmented reality environment, in accordance with embodiments of the present disclosure.

FIG. 2A depicts an example diagram showing an example of a virtual object 203 to facilitate an augmented reality experience including a communications session and an example of a virtual object 206 which includes a shareable note in an augmented reality environment 200, in accordance with embodiments of the present disclosure.

In the augmented reality environment 200, the son Sam 202 is interacting with the virtual object 203 in his home in his kitchen. The virtual object 203 is, in this example a message object which depicts a message 204 having user generated content. The message 204, for example, includes a note or text from Sam's mom reminding Sam do finish his homework. Note that the message 204 can be sent from mom to Sam at 330 pm in the afternoon and depicted in the VOB 203 when it was sent. The message 204 could also have been preconfigured by mom to appear in the afternoon at 330 pm (e.g., on certain days of the week or each week day afternoon) in the kitchen or wherever Sam is at or around that time.

Sam can also respond to mom's message 204 with a reply 205 in a message object. Note that the message object 203 can also be perceptible or visible to other users at the same or different physical locations. For example, dad who is in the office in the afternoon, may also see mom's message 204 and/or Sam's response 205, Note that Sam can view the VOB 203 through any device (e.g., a head mounted device as illustrated), a mobile phone, or without any devices. The augmented reality environment 200, in this example, also includes a virtual object 206 which is a note associated with a place in the kitchen. The note object can be set to be shown or be perceptible to certain users (e.g., sister Joan or Dad) and/or at certain times to Joan and other times to Dad.

Embodiments of VOB messaging can include sending a message object to a recipient User (e.g., Sam) and it appears in Augmented or Virtual Reality as a VOB. Sam can then respond/reply with text or with text in a VOB. This process can start a VOB communication chain or message thread, for example. In one embodiment, VOBs can be used as Asynchronous messaging objects. Embodiments of the present disclosure include an AR environment having a messaging user interface (e.g., integrated).

In a further embodiment, a relationship in the AR environment, can be initiated for example through a lens and channel feature in a user interface of the AR environment. Through the lens or channel features, users can participate in a private AR interaction (e.g. AR Chatroom). The system can enable adding more people to form groups, and further enable/allow sharing with anyone or everyone. For example, a user group can function as a mailing list in augmented reality with augmented reality features.

A further embodiment of the present disclosure includes avatar-based messaging in an augmented reality environment. For example, a user Tom can send a VOB to the avatar associated with another user Jess. The VOB can include, for example, a message, in text, a text bubble, sound, music or other audio content. Users (e.g., user Jess) can could dress up their avatar or take actions or perform operations to enhance its features, ability, visibility, popularity in the AR environment.

In one embodiment, avatars can appear in an AR environment, for example, in or around the space of a user for instance, as loop or as a recording. Avatars can take on actions or operations in the AR environment. For example, avatars can moving around in circles, in a space, as it is trying to get attention. The avatar can also possess steady state form, shape, animation, or behavior that is present or perceptible before it is activated. Steady state form, shape, animation, or behavior can include a glow, a vibration movement, a pulsating movement, a halo, a cloud, a frame, an outline of the avatar, a color, background sounds or music, a tone, text showing an object exists, an animation, etc. The steady state form, shape, animation, or behavior can be present before the avatar itself is perceptible and can exist to indicate the presence of the avatar. When an avatar is interacted with, the avatar can for example performance/ action/routine, depict some AR features and/or vend some information or associated content.

The augmented reality features associated with an avatar, can include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

In general, the content associated with the virtual object which may be an avatar can include a text message, a post, a chat, a conversation or a graphical message. The content associated with the virtual object can also include digital stickers, GIFs, digital tattoos, emoticons, animations, videos, clips, games, photos, images, a 3D scene or an animated 3D object, music, sound, tone, ultrasonic, or other audible content. The content associated with the virtual object can also include one or more of, works of art, animation, games, scenes, limericks, jokes, a performance, an action, a routine which can be rendered or played in 360 degrees or 3D.

The interaction with the avatar can be initiated by voice, touch, eye, gaze, gesture (body, hand, head, arms, legs, limbs, eyes, torso, etc.), text input and/or other command submitted by a user with respect to the object. For example, a voice command can be used to input a reply to system generated content or user generated content. The interaction can also be initiated through input text, or gestured to specify the text. The interaction can also include a reply to a virtual object where the reply can include emoticon, GIFs, stickers, multimedia content or other attachments. Voice command can also be used to specify attachments or identify other content to be included in an interaction with, action on or in a reply to the VOB. The action, interaction or reply can include another VOB or multiple other VOBs including or without other types of content. Any combination of the above input can be used to interact with and/or respond to the avatar. A user can reply to a VOB with another VOB, comment, or avatar or emoticon etc.

Figure 2B:
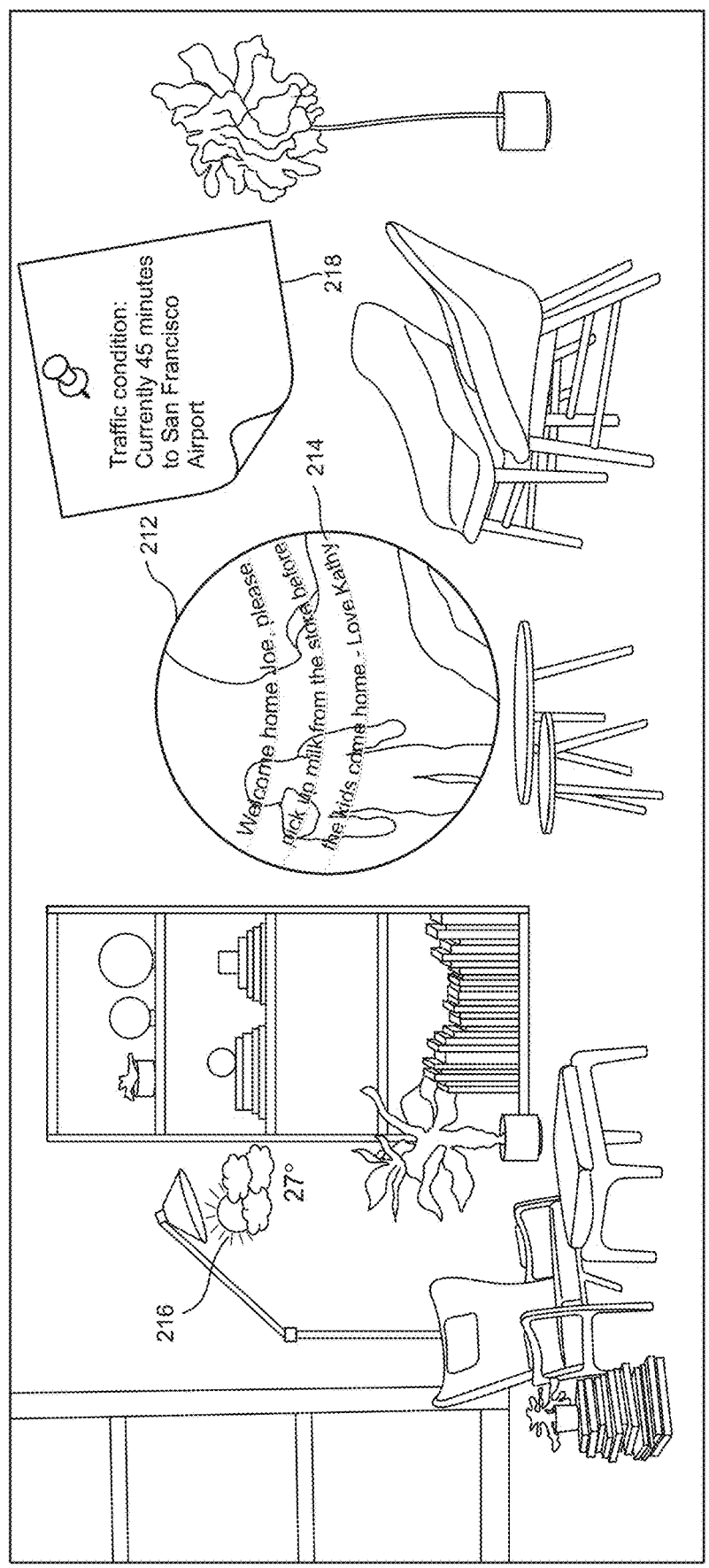
FIG. 2B depicts an example diagram illustrating an example of virtual object posted in an augmented reality environment for a user by another entity, in accordance with embodiments of the present disclosure.

FIG. 2B depicts an example diagram illustrating an example of virtual object 212 posted in an augmented reality environment 210 for a user by another entity, in accordance with embodiments of the present disclosure.

For example, the augmented reality environment 210 is in a living room of user Joe's home (living room) having real elements such as lounge chairs, a coffee table, various plants and lamps. The augmented reality environment also includes virtual objects such as VOB 216 depicting the current weather and temperature, VOB 218 depicted as a note showing nearby traffic conditions and VOB 212 on the coffee table having a message 214 to user Joe from his wife Kathy, The VOB 212 can be configured by Kathy to appear or become perceptible to user Joe each day at a certain time (e.g., 6 pm, a time parameter of a contextual trigger of the VOB 212) and/or continue to be perceptible for a given amount of time. The VOB 212 can also be configured to appear whenever Joe arrives home or sits down in the living room after he comes home from work (activity parameter or event parameter of a contextual trigger for the VOB 212).

Joe can also respond to Kathy's message 214 in the VOB. The response can be sent or provided to Kathy regardless of where she is and when. Or the response can be configured by Joe to be made perceptible or appear to Kathy at a certain time, or at a certain place, or if Kathy is doing something, or any combination of the above. In further embodiments, additional users (e.g., Joe and Kathy's kids) can also participate in the message dialogue in VOB 212.

Embodiments of the present disclosure also include group messages as virtual objects, or a mailing list as a virtual object. User Joe can post a message or a message in a VOB for another user or multiple users. Note that when a user (Joe) posts a VOB for another user (Kathy), the VOB can be world locked, or it can be wherever the recipient user (Kathy) is (user locked). Users and groups can share objects as messages or lock them to locations that only members of a group can see, for example, VOB 212 can be locked to the coffee table location or anywhere in the home of Joe and Kathy such that only their family can see the message contents. In one embodiment, when a VOB is shared with another user, it can default to a relative position and/or locked position. For example, relative locking of a VOB to a recipient user's inbox location can be an example of a default setting.

Figure 2C:
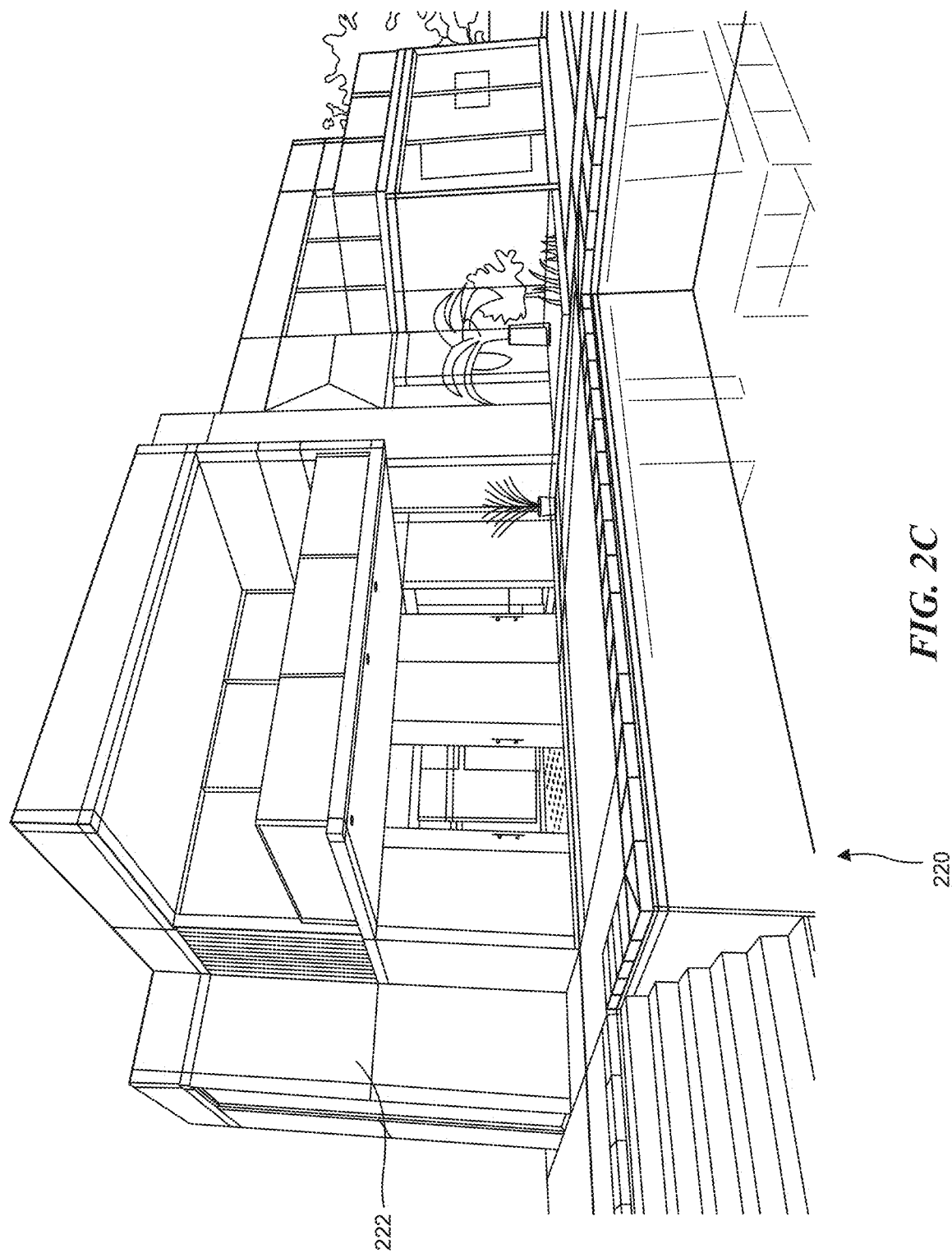
FIG. 2C depicts an example diagram depicting collaboration facilitated through a virtual object in an augmented reality environment, in accordance with embodiments of the present disclosure.

FIG. 2C depicts an example diagram depicting collaboration facilitated through a virtual object 222 in an augmented reality environment 220, in accordance with embodiments of the present disclosure.

Virtual object 222 is an example of an architectural blue print which shows collaborative work of multiple users who may be co-located or who may be remote. Processes relating to collaboration in an AR environment are further described with reference to the example flow charts of FIG. 11-FIG. 12B).

Figure 2D:
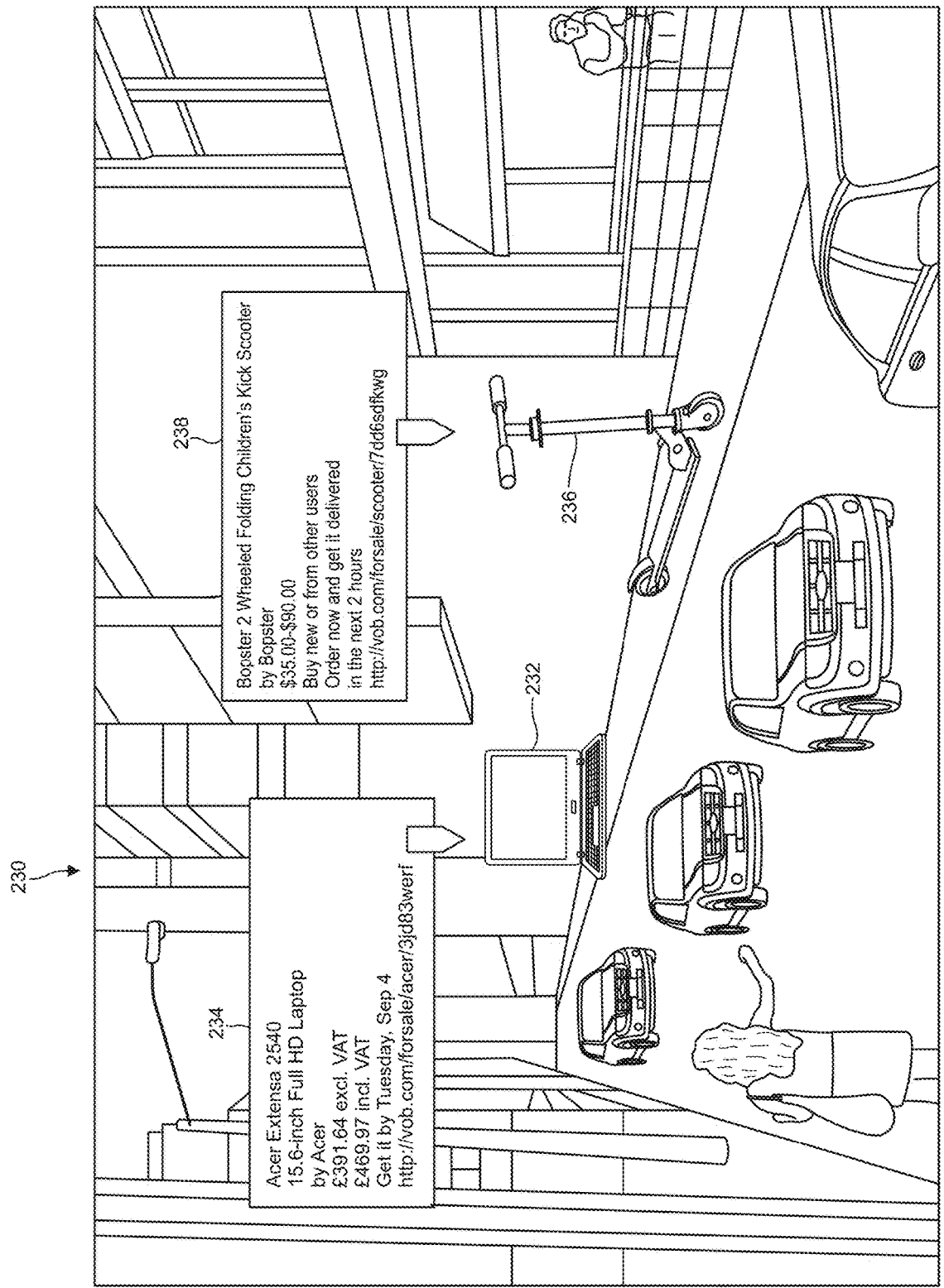
FIG. 2D depicts an example diagram of a marketplace administered in an augmented reality environment, in accordance with embodiments of the present disclosure.

FIG. 2D depicts an example diagram of a marketplace administered in an augmented reality environment 230, in accordance with embodiments of the present disclosure.

The marketplace of AR environment 230 depicts a VOB 232 having a product listing of a laptop and a VOB 236 showing a product listing of a scooter. The objects or virtual objects are generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment 230 and have human perceptible properties to be human discernible or detectable.

In the example AR environment 230, the VOBs 232 and 236 can be associated with the physical location in the real world environment as shown in AR environment 230. The physical location can be a busy street with human and street traffic in a city, for example. Cars or nearby pedestrians can see the VOBs 232 and 236 as they walk by or drive by.

The VOBs 232 and 236 each represent a product offering having real-world utility. For instance VOB 232 depicts and represents a laptop for sale and VOB 236 depicts a scooter for sale. VOB 232 is also associated with listing information 234 and the scooter with listing information 238. The listing information generally includes product metadata and/or transaction metadata which can include product information, product title, technical specifications, price, applicable tax, seller information, seller rating, user reviews, delivery information, availability, etc. The listing information can also include an address (e.g., URI or URL) for the VOB which users can use to access more information about the product or perform some other action (e.g., save it, share it, collect it, put in shopping cart, etc.). For example, the URL or URL can be used to call, locate, summon or trigger virtual objects.

The pedestrians or other humans that pass by can also stop to interact with the VOBs to check out the products. The VOB 232 can include a model or 3D model of an actual laptop and the user can interact with it, to see it from various aspects, see it in laptop mode vs. note book mode, test the keys, etc. The user may also be able to see the laptop in different color finishes (e.g, black or silver or chrome, etc.) and the user may be able to test out any customizable features prior to purchase (e.g., screen resolution, custom color, CPU speed, memory size, etc.), test out various software options etc.

Similarly, VOB 236 can include a model or 3D model of an actual scooter. The user can interact with the VOB 236 by moving it around, changing the color/finish, testing/viewing different available sizes, etc., prior to making a decision on whether to purchase one.

The interaction with the VOB can be initiated by voice, touch, eye, gaze, gesture (body, hand, head, arms, legs, limbs, eyes, torso, etc.), text input and/or other command submitted by a user with respect to the object. For example, a voice command can be used to input a reply to system generated content or user generated content. The interaction can also be initiated through input text, or gestured to specify the text. The interaction can also include a reply to, comment on or review of a virtual object including for example, emoticon, GIFs, stickers, multimedia content or other attachments. Voice command can also be used to specify attachments or identify other content to be included in an interaction with, action on, comment on, action on, review of, or in a reply to the VOB. The action, interaction, comment, review or reply can include another VOB or multiple other VOBs including or without other types of content. Any combination of the above input can be used to interact with and/or respond to the virtual object.

Furthermore, any of the above interaction types can be used to initiate a transaction with products associated with the VOBs 232 or 236. For example a pedestrian passing by the VOB 232 can stop to browse it, test it, interact with the model of it and decide to purchase it. The pedestrian can initiate the purchase through various features of the VOB 232, pay for the laptop represented by the VOB 232 and set a delivery date and provide delivery instructions where applicable.

Further embodiments of the present disclosure include unique identifiers such as URLs or URLs to call, locate, summon, collect, save, send, activate, pull up, and/or trigger virtual objects. For example, system-agnostic, system-compatible, system-specific addressable identifiers or URLs that can launch the platform and allow users to access, view, perceive VOBs (e.g., user locked VOBs).

Ex. http://vober.com/objects/1ga1sf125TAKMm3asbenf251235

For example, by going to a URL or URI, a user device can launch the VOB in the disclosed platform. The link can also prompts a user to download the app to access, perceive or interact with the linked content. Users can tweet the identifier out with a VOB, or mass mail it out—for example, the VOB can include a free gift or virtual toy etc. When users click the link they "get" this object into their Inbox—i.e., it can be transmitted to their inbox.

In general, each VOB and location is associated with an identifier or URL. But not all of these objects or locations are accessible to everyone. It can depend on their read/write permissions and identity. If the object is shared with them, and it is user-locked they can see it wherever they are. Otherwise user may be able to see the VOBs if they are the right location(s) or based on other criteria, or they can't see it at all. The URL for each object can be unguessable and/or cryptic.

Examples of the present disclosure further include bookmarking of locations in AR. One embodiment, enable users to create and share bookmarks to VOBs and/or physical locations in augmented reality. In general, VOBs and/or locations can be addressable with an identifier such as a URL that can be saved, bookmarked, and/or shared.

Figure 2E:
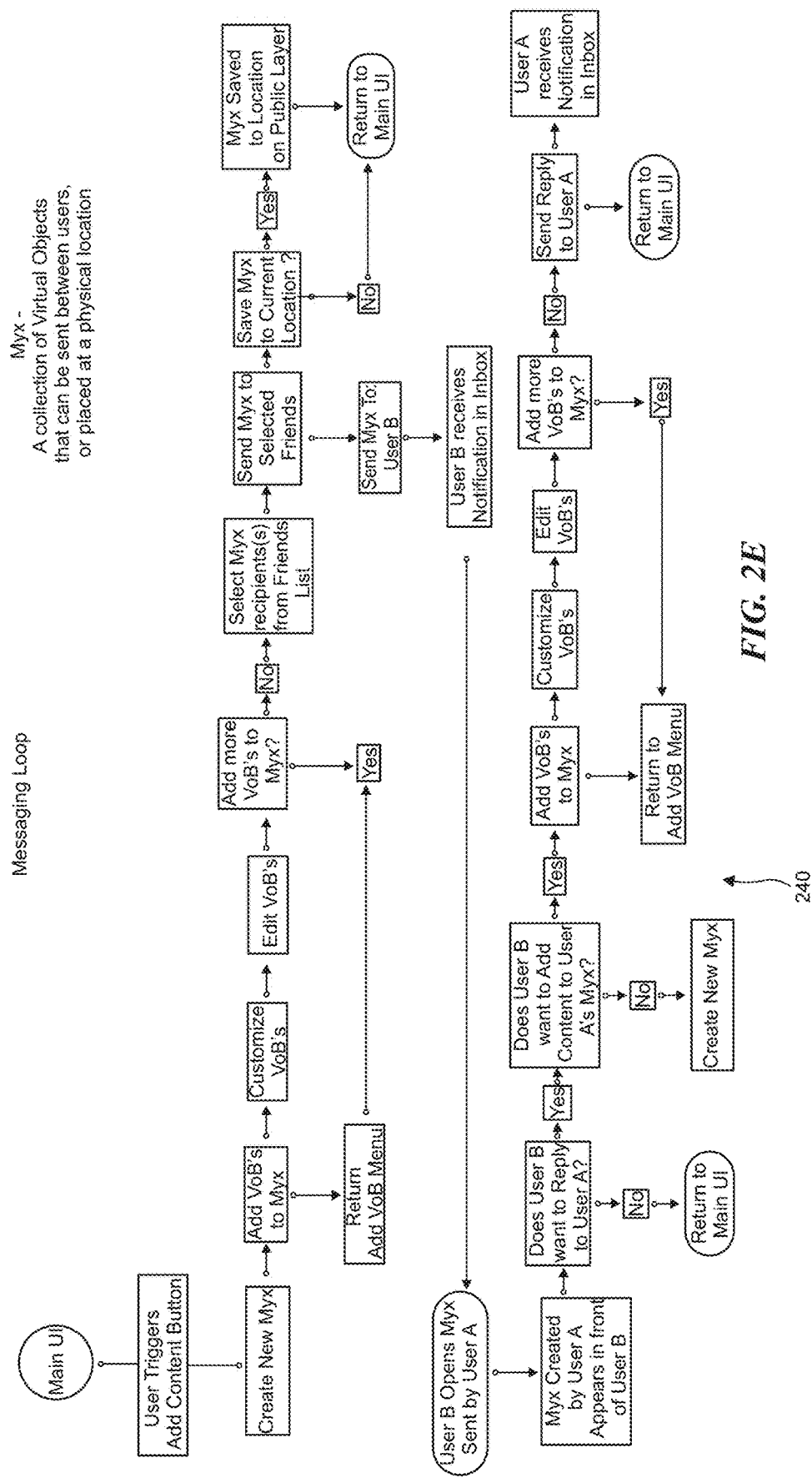
FIG. 2E depicts an example diagram showing an example user experience flow for creating virtual objects, managing a collection of virtual objects, sharing and posting virtual objects or responding to virtual objects, in accordance with embodiments of the present disclosure.

FIG. 2E depicts an example diagram showing an example user experience flow 240 for creating virtual objects, managing a collection of virtual objects (VOBs), sharing and posting virtual objects or responding to virtual objects, in accordance with embodiments of the present disclosure.

Through user interfaces of the present disclosure, a user (e.g., User A) for example, can add content, create a new collection of VOBs, add VOBs to a collection, customize the VOBs, edit the VOBs, or further add additional VOBs. The user can also select recipient(s) from their friend list, send any portion of the VOB collection to selected friends (e.g. to user B). This process is also illustrated with further references to the example user interfaces of FIG. 5C-FIG. 5G. The user can also have the option to save the VOB collection to a current physical location such that the VOB collection is saved to a location in a public layer associated with the physical location.

If the VOB collection is shared with or sent to User B, User B can receive a notification in their inbox. User B can open the VOB collection sent by the User A. The VOB collection created by user A can appear in front of User B. User B can have the option to reply to User A and/or to add content to the VOB collection of User A. If not, User B can create their own collection of VOBs. If the User B adds content to User A's VOB collection, the User B can also customize the VOBs, edit the VOBs, and/or add more VOBs. Once completed, the User B can send a rely to User A, and the User A can receive a notification in their inbox. This process is also illustrated with further references to the example user interfaces of FIG. 5C-FIG. 5G.

Figure 3A:
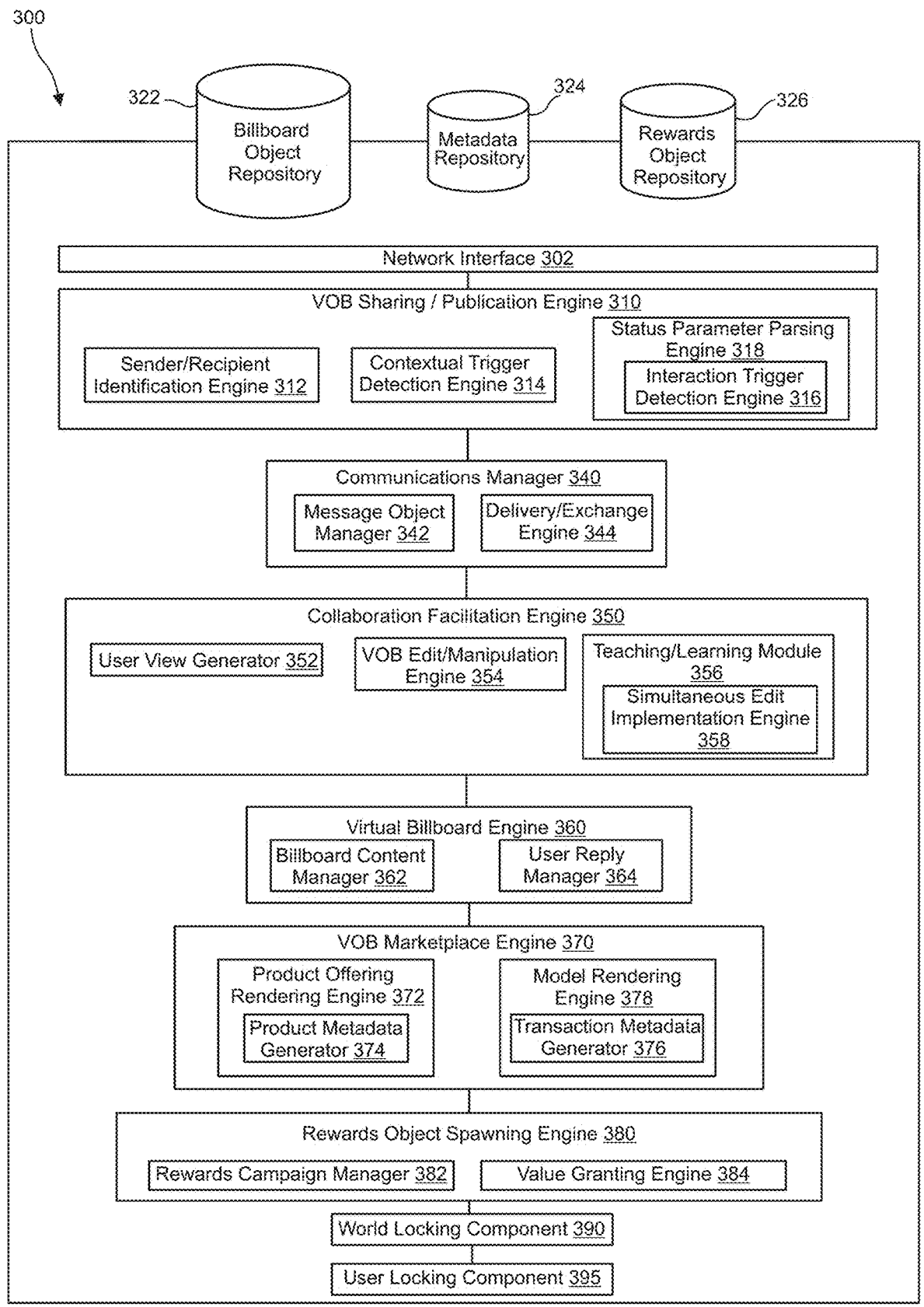
FIG. 3A depicts an example functional block diagram of a host server that deploys and administers virtual objects for various disclosed applications, in accordance with embodiments of the present disclosure.

FIG. 3A depicts an example functional block diagram of a host server 300 that deploys and administers virtual objects (VOBs) for various disclosed applications, in accordance with embodiments of the present disclosure.

The host server 300 includes a network interface 302, a virtual object (VOB) sharing/publication engine 310, a communications manager 340, a collaboration facilitation engine 350, a virtual billboard engine 360, a VOB marketplace engine 370, a rewards object spawning engine 380, a world locking component 390 and/or a user locking component 395.

The host server 300 is also coupled to a billboard object repository 322, a metadata repository 324 and/or a rewards object repository 326. Each of the VOB sharing/publication engine 310, the communications manager 340, the collaboration facilitation engine 350, the virtual billboard engine 360, the VOB marketplace engine 370, the rewards object spawning engine 380, the world locking component 390 and/or the user locking component 395 can be coupled to each other.

One embodiment of the VOB sharing/publication engine 310 includes, a sender/recipient identification engine 312, a contextual trigger detection engine 314 and/or a status parameter parsing engine 318 having an interaction trigger detection engine 316.

On embodiment of the communications manager 340 includes a message object manager 342 and/or a delivery/exchange engine 344. One embodiment of the collaboration facilitation engine 350 includes a user view generator 352, a VOB edit/manipulation engine 354, and/or a teaching/learning module 356 having a simultaneous edit implementation engine 358. One embodiment of the virtual billboard engine 360 includes, a billboard content manager 362 and/or user reply manager 364. One embodiment of the VOB marketplace engine 370 includes a product offering rendering engine 372 having a product metadata generator 374 and/or a model rendering engine having a transaction metadata generator 376. One embodiment of the rewards spawning engine 380 further includes a rewards campaign manager 382 and/or a value granting engine 384.

Additional or less modules can be included without deviating from the techniques discussed in this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 302 can be a networking module that enables the host server 300 to mediate data in a network with an entity that is external to the host server 300, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

One embodiment of the host server 300 includes the VOB sharing/publication engine 310 having the sender/recipient identification engine 312, the contextual trigger detection engine 314 and/or the status parameter parsing engine 318 having the interaction trigger detection engine 316.

The VOB sharing/publication engine 310 can be any combination of software agents and/or hardware modules (e.g., including processors and/or memory units) able to facilitate or manage, posting, saving, editing, sharing, sending, receiving, publishing, transferring, gifting, of virtual objects (e.g., VOBs or objects).

The object or virtual object is generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable The sender/recipient identification engine 312 can determine, identify, a sending entity of a VOB and/or a recipient entity of the VOB. The sending entity of the VOB can include one or more of, an individual user, a user group having multiple users, a foundation, an organization, a corporation, an advertiser, any other user of an AR environment hosted by the host server 300. The sending entity may also be the host server 300.

The recipient entity of the VOB can include one or more of, an individual user, a user group having multiple users, a foundation, an organization, a corporation, an advertiser, any other user of an AR environment hosted by the host server 300.

The recipient entity can be any entity or user who detects, receives, perceives, view, hear, observes, a VOB designated to them by the sender entity. The recipient entity can receive, view, perceive, hear or observe VOBs that are sent to them as a private message object, as a group message object, as a gift, as a greeting card object, as a shared object, as a shared billboard object, or as a post or publication to them privately, or as a post or publication having a larger group of audience, In general, the virtual object can include, a greeting card, where the content of the greeting card can be at least in part specified or designed by the sender entity and designated for the recipient entity. The greeting card includes a template style or template design having 3D features or 3D scenes that are preconfigured, for example, by the host server 300 or a third party. In addition, the virtual object can include a business card, where, the business card is for the sender entity (e.g., includes business information such as company name, company phone number, company address, title, branch, etc.) and designated for the recipient user.

In general, the VOB sharing/publication engine 310 (hereinafter engine 310) can determine that a recipient user is one or more of an intended recipient of a VOB that is shared with the recipient user by the sender entity (of the AR environment). The engine 310 can also determine that the recipient user who is an intended recipient is in a given location in the real world environment which meets a location criteria of the VOB designated for the recipient user.

The engine 310 can then cause to be perceptible, by the recipient user of the augmented reality environment, the virtual object, such that the recipient user is able to engage in the augmented reality experience. The engine 310 can depict such that the recipient user engages in the augmented reality experience via the augmented reality environment hosted by sever 300. The augmented reality experience can include, for example a real time or near real time augmented reality chat session or an augmented reality messaging session. The augmented reality experience can also include asynchronous exchanges of augmented reality messages, augmented reality conversations, augmented reality electronic mail or augmented reality greeting cards. The augmented reality experience can include multiplayer mode gaming experiences where in the gaming experience, the recipient user and the other entity interact with the virtual object.

In one embodiment the engine 310 detects a contextual trigger (e.g., by the contextual trigger engine 314, hereinafter referred to as 'engine 314') and can render or present content associated with the VOB. The contextual trigger occurs (and can be detected by the engine 314) when the recipient user (user parameter) is engaging in a given action or activity (activity parameter) in a given location (location parameter) in the real world environment. In a further example, the contextual trigger can also occur when the recipient user (user parameter) is engaging in a given action or activity (activity parameter) at a given time (time parameter).

In some embodiment, the contextual trigger occurs at predetermined times or time periods (time parameter). The contextual trigger can occur at certain locations (location parameter) in the real world environment. For example, when a given user is shopping and is at this location then show this user a VOB, or every morning at rush hour put this traffic map virtual object near the door to the user's car in his driveway. User in some instances meet minimum qualifications/rank to receive certain object if it is configured this way.

In general, a contextual trigger for a VOB can cause the VOB to take on a certain action, behavior or to present its associated content, The contextual trigger for the VOB can include any one of or any combination of a user parameter, a time parameter, an activity parameter and a location parameter. There can be one or more contextual triggers associated with a given VOB. The contextual triggers relevant to the given VOB can be identified, tracked, managed, updated, and/or detected by the contextual trigger detection engine 314. Contextual triggers can be specified, defined, configured or reconfigured by the sender entity of the VOB. Contextual triggers can also be specified, defined, configured or reconfigured by a creator user of the VOB and/or by the host server 300.

In general, the content associated with the virtual object can include a text message, a post, a chat, a conversation or a graphical message. The content associated with the virtual object can also include digital stickers, GIFs, digital tattoos, emoticons, animations, videos, clips, games, photos, images, a 3D scene or an animated 3D object, music, sound, tone, ultrasonic, or other audible content. The content associated with the virtual object can also include one or more of, works of art, animation, games, scenes, limericks, jokes, a performance, an action, a routine which can be rendered or played in 360 degrees or 3D.

In some instances, the content associated with the virtual object is rendered or depicted during the augmented reality experience includes multiple stages of rendering, for example, by the engine 310. In general, the multiple stages of rendering can include by way of example, one or more of: depiction or presentation of a name, title or subject of the virtual object, depiction of behaviors or animations of the virtual object, depiction of a payload portion of the content. The payload portion of the content can include, for instance, one or more of: a video, a text based message, a game, an experience, a prize and points, audio, an audio message, music, sound track, a sound, a pitch, etc. The multiple stages of rendering can, in one embodiment, be tracked with and identified by a status parameter of or associated with the virtual object, for example by the status parameter parsing engine 318.

In one embodiment, the host server 300 detects an interaction trigger (e.g., via the interaction trigger detection engine 316, hereinafter referred to as 'engine 316') with respect to the virtual object. For instance, the interaction trigger can be detected (e.g., by the engine 316) responsive to the initial rendering or presentation of the content through engagement with the augmented reality experience in the augmented reality environment. Once the interaction trigger has been depicted, the host server can further render or depict the content associated with the virtual object. Note that the interaction trigger can include stimuli detected of the recipient user. For instance, the stimuli can include voice, touch, eye, gaze, gesture (body, hand, head, arms, legs, limbs, eyes, torso, etc.), text input and/or other command submitted by a with respect to the VOB.

In a further embodiment a state of the virtual object after the content has cycled through the multiple stages of rendering can be further determined by the status parameter of the virtual object (e.g., tracked by the status parameter parsing engine 318) The state can include, one or more of: an expire state, a vanish state, a continue state, a pause state, a morph state, and a change state.

Embodiments of the present disclosure also include virtual objects that can be passed down from person to person. For example, some virtual objects cannot be placed or found in the world. Users can only see them or access them in private by receiving them from someone else or via/from a specific entity. In one embodiment, some VOBs can only be passed from person to person. These virtual objects are special and can have value for people to want to do that. These virtual objects can be rewarding or have value to each recipient (free movie premier ticket, coupons, gym passes, etc), that people may share them with friends or other users. A further example includes a VOB equivalent of a chain letter. For instance, this can be a VOB that users can send to their friends. A VOB chain letter can be implemented as a class in the VOB ontology, according to one embodiment.

One embodiment of the host server 300 further includes the communications manager 340 having the message object manager 342 and/or the delivery/exchange engine 344. The communications manager 340 can be any combination of software agents and/or hardware modules (e.g., including processors and/or memory units) able to facilitate or manage, administer, coordinate, enable, enhance, communications sessions between users of the AR environment. The communications sessions can be 1-1, 1-many, many to many, and/or many-1.

The communications manager 340 can determine that a second user of the augmented reality environment, is an intended recipient of a first message object. The communications manager 340 can then, for example, cause to be perceptible, to the second user of the augmented reality environment, the first message object, such that the second user is able to participate in the communications session via the augmented reality environment (e.g., hosted by server 300).

Note that in general, at least a portion of content associated with the first message object includes first user generated content provided by a first user who is a sender entity or sender user, to be consumed by (e.g., viewed, read, heard, interact with, reviewed by, etc.) the second user who is the recipient user for the first message object. The first user generated content and/or the first message object can be created or managed by the message object manager 342.

The communications manager 340 can further receive second user generated content provided by the second user (e.g., the recipient user of the first message object) where the second user generated content is provided by the second user in response to the first user generated content provided by the original sender entity (e.g., the first user) of the first message object. The second user generated content is to be consumed by the first user.

The communications manager 340 (e.g., via the delivery/exchange engine 344) can deliver, to the first user in the augmented reality environment, the second message object having the second user generated content and/or present the second user generated content to the first user in the second message object in the communications session the augmented reality environment.

In one embodiment, the communications session between the first and second users is asynchronous and the first and second message objects are delivered asynchronously, for example, by the delivery/exchange engine 344. An asynchronous communications session, can include, for example, an email session, an SMS session or an asynchronous chat session.

In one embodiment, the communications session between the first and second users is synchronous and the first and second message objects are delivered synchronously, by the delivery/exchange engine 344. The synchronous communication session can include, for example, a chat room session or an instance messaging session.

The communications manager 340 can further detect stimuli by the second user with respect to the first message object and render augmented reality features of the first message object along with depictions of the first user generated content to the second user in the augmented reality environment. The augmented reality features can include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

In a further embodiment, the second message object is delivered to the first user at a given time. The second message object can also be delivered to the first user at a given location in the real world environment. The given time can be specified by the second user. The given location can also be specified by the second user. The delivery criteria associated with a given message object can include any one of and any combination of user, time, location and/or activity parameters and can be managed, tracked, updated, identified and/or detected by the message object manager 342.

One embodiment of the host server 300 further includes the collaboration facilitation engine 350 having the user view generator 352, the VOB edit/manipulation engine 354, and/or the teaching/learning module 356 having the simultaneous edit implementation engine 358. The collaboration facilitation engine 350 can be any combination of software agents and/or hardware modules (e.g., including processors and/or memory units) able to facilitate or manage, administer, coordinate, enable, enhance, collaborations sessions between users of an AR environment through one or more virtual objects (VOBs). In general. the collaborations sessions can be 1-1, 1-many, many to many, and/or many-1.

The virtual object can include, one or more of, a virtual painting, a virtual sculpture, a virtual castle, a virtual snowman, a virtual music piece, a virtual tennis racket, virtual ball, etc. The virtual object can also represent, one or more of, a virtual text book, a virtual novel, a virtual pen, a virtual note pad, a virtual blackboard, a blueprint, a virtual painting, a virtual sculpture, a virtual puzzle, a virtual crossword puzzle, a virtual marker, a virtual exam, a virtual exam problem, a virtual homework, a virtual homework problem, a virtual circuit board, a virtual telescope, a virtual instrument, virtual Lego, virtual building blocks. The object or virtual object is generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable.

In one embodiment, the collaboration facilitation engine 350, can identify a first user and a second user of the augmented reality environment between whom to facilitate the collaboration on the virtual object. The user view generator 352 (hereinafter referred to as 'generator 352') can then render a first user view of the augmented reality environment based on a first physical location associated with the first user in the real world environment. The generator 352 can also render a second user view of the augmented reality environment based on a second physical location associated with the second user in the real world environment The collaboration facilitation engine 350 can then implement a first edit on the virtual object (e.g., via the VOB edit/manipulation engine 354) in the augmented reality environment, where the first edit is made by the first user using the edit function, to generate a first edited version of the virtual object.

The edit function (e.g., provided by the VOB edit/manipulation engine 354) of the virtual object can be accessible by the first user via a first user view (e.g., generated by the user view generator 352) of augmented reality environment. The collaboration facilitation engine 350 can further cause to be perceptible, the first edited version of the virtual object, to the second user, via a second user view (e.g., generated, rendered, updated, adjusted by the user view generator 352) of the augmented reality environment. The augmented reality environment generally depicts the virtual object amongst elements physically present in the real world environment The collaboration facilitation engine 350 can further implement (e.g., by the VOB edit/manipulation engine 354) a second edit on the virtual object in the augmented reality environment, where the second edit is made by the second user using the edit function, to generate a second edited version of the virtual object.

The edit function (e.g., provided by the VOB edit/manipulation engine 354) can be accessible by the second user in the second user view (e.g., generated by the user view generator 352) of augmented reality environment. The collaboration facilitation engine 350 can cause to be perceptible, the second edited version of the virtual object, to the first user, via the first user view (e.g., generated by the user view generator 352) of the augmented reality environment. The collaboration facilitation engine 350 can further cause to be perceptible, the second edited version of the virtual object, to a third user, via a third user view (e.g., generated by the user view generator 352) of the augmented reality environment. Additional users can also be supported.

In one embodiment, the user view generator 352 can adjust or update the first user view based on changes to the first physical location, or changes in orientation of the first user in the real world environment. The user view generator 352 can also reorient reorienting depiction of the virtual object in the first user view based on changes to the first physical location, or changes in orientation of the first user in the real world environment. The user view generator 352 can also adjust or update the second view based on changes to the second physical location or changes in orientation of the second user in the real world environment and further reorient depiction of the first edited version of the virtual object in the second user view based on changes to the second physical location, or changes in orientation of the second user in the real world environment.

In one embodiment, the user view generator 352 renders the first user view and the second user view to include at least some shared visible elements of the real world environment. the first user view and the second user view can be rendered to include at least some shared perceptible elements of the real world environment, for example, responsive to determining that the first user and second user are physically co-located in the real world environment. In general, the first user and second user are physically co-located if and when at least part of a field of view of the first user and a field of view of the second user at least partially overlaps.

If the first user and second user are physically co-located in the real world environment, the virtual object and implementation of the first edit on the virtual object by the first user to generate the first edited version of the virtual object is accessible by the second user through the second user view of the augmented reality environment. In addition, a position or orientation of the first edited version of the virtual object in the second user view is adjusted by the user view generator 352, for example, in response to: completion of the implementation of the first edit on the virtual object, and/or detection of a share request of the virtual object with the second user, initiated by the first user.

If the first user and the second user are not physically co-located in the real world environment, the first user view can be generated by the user view generator 352 to include first real elements of the first physical location and the second user view can be generated by the user view generator 352 to include second real elements of the second physical location. If the first user and the second user are not physically co-located in the real world environment the first real elements are generally distinct from the second real elements. Moreover, the first edited version of the virtual object is made perceptible in the second user view by the user view generator 352 in response to: completion of the implementation of the first edit on the virtual object, and/or detection of a share request of the virtual object with the second user, initiated by the first user.

The augmented reality environment can include a collaborative learning environment where, the virtual object facilitates learning by the first user and teaching by the second user or learning by the first user and learning by the second user (e.g., via the teaching/learning module 356). In one embodiment, the collaboration facilitation engine 350 deploys a virtual object in the augmented reality environment. In this example, the virtual object can facilitate interaction between a first user and a second user of the augmented reality platform, to engage in the educational experience in the real world environment (e.g., via the teaching/learning module).

The virtual object can include, one or more of, a virtual painting, a virtual sculpture, a virtual castle, a virtual snowman, a virtual music piece, a virtual tennis racket, virtual ball, etc. The virtual object can also represent, one or more of, a virtual text book, a virtual novel, a virtual pen, a virtual note pad, a virtual blackboard, a blueprint, a virtual painting, a virtual sculpture, a virtual puzzle, a virtual crossword puzzle, a virtual marker, a virtual exam, a virtual exam problem, a virtual home work, a virtual homework problem, a virtual circuit board, a virtual telescope, a virtual instrument, virtual Lego, virtual building blocks.

In accordance with embodiments of the present disclosure, the virtual object is enabled for interaction with or action on, simultaneously by the first user and the second user, for example, by the simultaneous edit implementation engine 358 (hereinafter referred to as the 'SEI engine 358'). The SEI engine 358 can implement a first manipulation of the virtual object in the augmented reality environment, where the first manipulation is made by the first user via a first user view of the augmented reality platform. The collaboration facilitation engine 350 can cause to be perceptible, the virtual object and first changes to the virtual object in the implementing of the first manipulation on the virtual object, to the second user, from a second user view of the augmented reality environment.

The collaboration facilitation engine 350 can further cause to be perceptible, the virtual object and the first changes to the virtual object in the implementing of the first manipulation on the virtual object, to a third user, from a third user view (e.g., as generated by the user view generator 352) of the augmented reality environment. In one embodiment, the VOB edit/manipulation engine 354 can further implement a second manipulation of the virtual object in the augmented reality environment, where the second manipulation being made by the second user via the second user view of augmented reality platform. The collaboration facilitation engine 350 can then further cause to be perceptible, the implementing of the second manipulation on the virtual object, by the first user, via the first user view of the augmented reality environment.

Note that in one embodiment, at least a part of the second manipulation made by the second user, is implemented on the virtual object simultaneously in time (e.g., by the SEI engine 358), with the implementing of the first manipulation of the virtual object, made by the first user. The collaboration facilitation engine 350 can further cause to be simultaneously perceptible, to the first user and the second user, second changes to the virtual object in the implementing the second manipulation and the first changes to the virtual object in the implementing of the first manipulation. In addition, the collaboration facilitation engine 350 can further to be simultaneously perceptible, to the first user, second user and the third user, the second changes to the virtual object in the implementing the second manipulation and the first changes to the virtual object in the implementing of the first manipulation, via the third user view (e.g., as generated by the user view generator 352) of the augmented reality environment.

One embodiment of the host server 300 further includes the virtual billboard engine 360 having, the billboard content manager 362 and/or the user reply manager 364. The virtual billboard engine 360 can be any combination of software agents and/or hardware modules (e.g., including processors and/or memory units) able to facilitate or manage, administer, coordinate, enable, enhance, the posting, sharing, configuring, designing, placing, showing, rendering of virtual objects that are virtual billboards. The virtual billboard engine 360 can also facilitate, manage, depict, render, replies, comments, feedback, ratings, reviews of virtual billboards and/or associated content.

The virtual billboard can include one or more of, a note, a review, an offer, an ad, a promotion. A virtual billboard object can be a seed for threaded discussions or interactions. In general, virtual billboards can be placed in space, pinned to a user or a moveable object, or can be pinned to a physical surface at a physical location. Virtual billboards are illustrated with references the examples of FIG. 7 and FIG. 8. The virtual billboard engine 360 can associate the virtual billboard with the physical location in the real world environment. The virtual billboard can be associated with the physical location such that the virtual billboard is rendered in an augmented reality environment, at or in a vicinity of the physical location or is rendered in the augmented reality environment to appear to be located at or in the vicinity of the physical location.

The virtual billboard engine 360 can also depict content associated with the virtual billboard, at or in the vicinity of the physical location (e.g., via the billboard content manager 362) and further depict user replies to the content with the virtual billboard, at or in the vicinity of the physical location (e.g., via the user reply manager 364 of the virtual billboard engine 360). In one embodiment, the virtual billboard engine 360 can create the virtual billboard responsive to a request of a creator user. The physical location with which the virtual billboard is associated can be specified in the request of the creator user.

In one embodiment, the virtual billboard is world-locked, for example, by the world locking component 390. In world locking the virtual billboard, the virtual billboard can be associated with the physical location in the real world environment and the virtual billboard is perceptible to a user, if and when the given user is physically at or in a vicinity of the physical location. For a world locked virtual billboard, the virtual billboard engine 360 can enable the virtual billboard to be interacted with by the user if and when the user is at or in a vicinity of the physical location.

In a further embodiment, the virtual billboard is user-locked, for example, by the user locking component 395. In user locking the virtual billboard, the physical location with which the virtual billboard is associated, includes a physical space around a user, where the physical space around the user is moveable with movement of the user in the real world environment. Moreover, in user-locking the virtual billboard, the virtual billboard engine 360 can render the virtual billboard in the augmented reality environment to move with or appear to move with the user in the augmented reality environment.

In one embodiment, the host server 300 can detect the movement of the user in the real world environment and identify changes in location of the physical space around the user due to the movement of the user in the real world environment. The virtual billboard engine 360 can render the virtual billboard to move in the augmented reality environment in accordance with the changes in location of the physical space around the user such that the virtual billboard moves with or appears to move with the user in the augmented reality environment.

Furthermore, the host server 300 can detect interaction with the virtual billboard by a user and further render augmented reality features embodied in the virtual billboard in the augmented reality environment. In one embodiment, the augmented reality features can include the user replies depicted as a 3D thread associated with the virtual billboard. In addition, the augmented reality features embodied in the virtual billboard can further include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

One embodiment of the host server 300 further includes the VOB marketplace engine 370 having a product offering rendering engine 372 having the product metadata generator 374 and/or a model rendering engine having the transaction metadata generator 376. The VOB marketplace engine 370 can be any combination of software agents and/or hardware modules (e.g., including processors and/or memory units) able to facilitate or manage, administer, provision a marketplace via an AR environment.

The VOB marketplace engine 370 can associate a virtual object with a physical location in a real world environment. The VOB can be associated with the physical location, such that the virtual object is rendered in the marketplace in the augmented reality environment, at the physical location or is rendered in the augmented reality environment to appear to be located at the physical location, for example, by the product offering rendering engine 372. The VOB marketplace engine 370 can enable the physical location with which the virtual object is associated, to be specified by a seller entity. Note that the seller entity can include a platform hosted by a third party entity (e.g., third party marketplace, ecommerce platform, retailer, reseller, broker, agent, manufacturer, direct seller, etc.). The seller entity can also be an individual user (e.g., individual trader, or someone selling used goods, such as used clothes or old furniture, etc.). The host server 300 can also be a seller entity who lists products for sale through the disclosed marketplace.

The virtual object can represent a product offering having real-world utility. In one embodiment, the virtual object includes product metadata and transaction metadata. The transaction metadata (e.g., generated by the transaction metadata generator 376) can facilitate a transaction with respect to the product offering and can include, one or more of, price, loan term, rent or lease term, license terms. The product metadata (e.g., generated by the product metadata generator 374) can include, for example, one or more of, delivery price, delivery date, product name, product brand, user reviews, critic reviews, product features, product material, manufacturing location, seller ID, seller rating, seller reviews.

In a further embodiment, the model rendering engine 372 can render a model of the product offering, associated with, in or within the virtual object at the physical location in the real world environment. The VOB marketplace engine 370 can enable user interaction with the model of the product offering via the virtual object and further update updating the rendering of the model of the product offering (e.g., via the model rendering engine 378), in the augmented reality environment, in response to the user interaction. In one embodiment the model of the product offering depicted in the virtual object is rendered in 3D or substantially in 360 degrees by the model rendering engine 378. Moreover the virtual object can enable a user to enter the model of the product offering to explore internals of the product offering.

The transaction can be initiated responsive to detection of a transaction request with respect to the virtual object in the augmented reality environment. The VOB marketplace engine 370 can facilitate the transaction with respect to the product offering in the augmented reality environment and further fulfilling the transaction with respect to the product offering in the real world environment.

In a further embodiment, the VOB marketplace engine 370 can also a second virtual object with a second physical location in the real world environment, such that the second virtual object is rendered (by the product offering rendering engine 372) in the marketplace in the augmented reality environment, at the second physical location or is rendered in the augmented reality environment to appear to be located at the second physical location. The second virtual object can represent a second product offering having real-world value The physical location with which the second virtual object is associated, can also be specified by a second seller entity.

In general, the marketplace in the augmented reality environment includes multiple virtual objects representing different product offerings. Each of the multiple product offerings can be listed by the same or different seller entities. Specifically, multiple seller entities can provide product offerings having real-world value in the marketplace to be transacted on via the augmented reality environment.

For example, multiple virtual objects are rendered by the product offering rendering engine 372 to represent each of the product listings in the augmented reality environment. One of the multiple virtual objects can be associated with a given physical location in the real world environment. The given physical location can be specified by one of the seller entities who listed a given product offering associated with the one of the multiple virtual objects associated with the given physical location. The given virtual object can then be rendered (e.g., by the product offering rendering engine 372) in the marketplace in the augmented reality environment, at the given physical location or is rendered in the augmented reality environment to appear to be located at the given physical. Location.

In one embodiment, the VOB market place engine 370 world locks (e.g., by the world locking component 390) the virtual object to the physical location of the real world environment. In world locking, the physical location is fixed in physical space in the world and the VOB marketplace engine 370 can caused the virtual object to be perceptible to a user, if and when the given user is physically at or in a vicinity of the physical location. In addition, the virtual object can be enabled to be interacted with by the user if and when the user is at or in a vicinity of the physical location and the transaction with respect to the product offering is enabled, if and when the user is at or in a vicinity of the physical location.

In an alternative embodiment, the VOB market place engine 370 user locks (e.g., by the user locking component 395) the virtual object to the physical location of the real world environment. In user locking, the physical location with which the virtual object is associated, includes a physical space around a user. The physical space around the user is generally moveable with movement of the user in the real world environment and not fixed in physical space. As such the virtual object is rendered (e.g., by the user locking component 395 and/or the product offering rendering engine 372) in the augmented reality environment to move with or appear to move with the user in the augmented reality environment.

Further embodiments include, detecting the movement of the user in the real world environment, identifying changes in location of the physical space around the user due to the movement of the user in the real world environment and/or rendering the virtual object to move in the augmented reality environment in accordance with the changes in location of the physical space around the user such that the virtual object moves with or appears to move with the user in the augmented reality environment. Moreover, the transaction with respect to the product offering is enabled by the VOB market place engine 370, if and when a second user is at or in a vicinity of the physical space around the user. Interaction with the virtual object representing the product offering can be detected and augmented reality features embodied in the virtual object in the augmented reality environment can be rendered. The augmented reality features can include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

The interaction with the object can be initiated by voice, touch, eye, gaze, gesture (body, hand, head, arms, legs, limbs, eyes, torso, etc.), text input and/or other command submitted by the given user with respect to the object. For example, a voice command can be used to input a reply to the first generated content. The interaction can also be initiated through input text or gestured to specify the text. The interaction can also include a reply to the object where the reply can include emoticon, GIFs, stickers, multimedia content or other attachments. Voice command can also be used to specify attachments or identify other content to be included in the reply to the object. The reply can include another VOB or multiple other VOBs including or without other types of content. Any combination of the above input can be used to interact with and/or respond to the object.

One embodiment of the host server 300 further includes the rewards spawning engine 380 having a rewards campaign manager 382 and/or a value granting engine 384. The rewards spawning engine 380 can be any combination of software agents and/or hardware modules (e.g., including processors and/or memory units) able to create, generate, allocate, assign give, sent, gift rewards objects in an AR environment and manage the purchase of points to be associated with a rewards object. Generally, a rewards object can include, one or more of, virtual currency, digital currency, cryptocurrency, virtual money, crystals, gems, points, credits, gold, silver. The system can include support and/or generate 3D objects for: coins, pile of coins, silver coins, gold coins, gems of various styles and colors, power up crystals, etc. Some rewards objects or treasures include power ups. Power up objects can enable users to see hidden treasures, see more VOBs in their view of the AR environment, get a higher spawn rate for rewards objects for a while, and/or have bigger rewards for their rewards objects. Other power ups can make avatars of users glow brighter or appear more special in a group for a while —stand out, be more popular.

One embodiment includes rewards that are treasures that provide points, power-ups that enhance user game play. For example, power-ups allow or enable users can see VOBs in the AR environment that were not visible to others, perform operations or actions in the AR environment that others cannot. A rewards object can also include, a limited edition virtual object. The limited edition virtual object is collectible by the user. In some instances only specific number of them (e.g., 1000, 10000, etc.) were made and the authenticity of the limited edition virtual object can be authenticated via a ledger of distributed ledger (block chain) to certify their authenticity. The disclosed marketplace can be used in trading or exchanging or buying the limited edition VOBs.

In one embodiment, the rewards object spawning engine 380 (hereinafter referred to as the 'ROS engine 380') is able to spawn one or more rewards objects in the augmented reality platform. The rewards object can be associated with a physical location in the real world environment, such that the virtual object is rendered in the digital in the augmented reality platform, at the physical location or is rendered in the augmented reality platform to appear to be located at the physical location.

The ROS engine 380 can detect activation of the rewards object in the augmented reality platform, by the user at or in a vicinity of the physical location in the real world environment and as a result, grant the value of reward associated with the rewards object to the user (e.g., by the value granting engine 384). Once granted to the user, the value of reward can be used by the user for exchange or transaction in the augmented reality platform or in the real world environment.

In one embodiment, the ROS engine 380 can assign a value of reward to the rewards object, for example, based on the value of reward specified in the rewards campaign associated with the rewards object. The rewards campaign can be configured by the owner, sender or creator user of the rewards object and managed by the rewards campaign manager 382. The rewards campaign can be configured by a friend of the user in the real world environment if the rewards object is left for or given to the user by the friend. The rewards campaign can also be configured by a third party advertiser and the value of the rewards object can be purchased by a third party advertiser from the host (e.g., host server 300) of the augmented reality platform.

For example, the ROS engine 380 can associate the rewards object with an advertisement having interactive content. The rewards object can be activated in response to detecting interaction with the advertisement by the user in the augmented reality platform. The interaction with the object can be initiated by voice, touch, eye, gaze, gesture (body, hand, head, arms, legs, limbs, eyes, torso, etc.), text input and/or other command submitted by the given user with respect to the object. For example, a voice command can be used to input a reply to the first generated content. The interaction can also be initiated through input text or gestured to specify the text. The interaction can also include a reply to the object where the reply can include emoticon, GIFs, stickers, multimedia content or other attachments. Voice command can also be used to specify attachments or identify other content to be included in the interaction with the object. Any combination of the above input can be used to interact with and/or respond to the object.

Additionally, the interaction with the interactive content can include one or more of, a collection action, a view or playback action or a share action. As a result of user interaction, the ROS engine 380 can render augmented reality features embodied in the rewards object in the augmented reality environment. The augmented reality features can include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

Moreover, the rewards campaign (e.g., as generated, managed, or implemented by the rewards campaign manager 382) can also identify a set of users or criteria to identify the set of users to whom the rewards object is perceptible in the augmented reality platform. The rewards campaign can also identify a contextual trigger causing the spawning of the rewards object in the augmented reality environment.

The rewards campaign can also define a probability that the rewards object is spawned in the augmented reality environment relative to another rewards object, the probability that the rewards object is spawned in the augmented reality environment relative to another rewards object is specified for a given time or time period, the probability that the rewards object is spawned in the augmented reality environment relative to another rewards object is specified for the physical location in the real world environment, and/or the probability that the rewards object is spawned in the augmented reality environment relative to another rewards object is specified for the user.

In a further embodiment, the ROS engine 380 can assign a time-to-live or expiration time to the rewards object. In response to determining that the rewards object has expired or reached its time to live, the ROS engine 380 can expire or cause to be, unperceptible, the rewards object in the augmented reality environment. Note that the time to live can be specified in a rewards campaign associated with the rewards object.

Figure 3B:
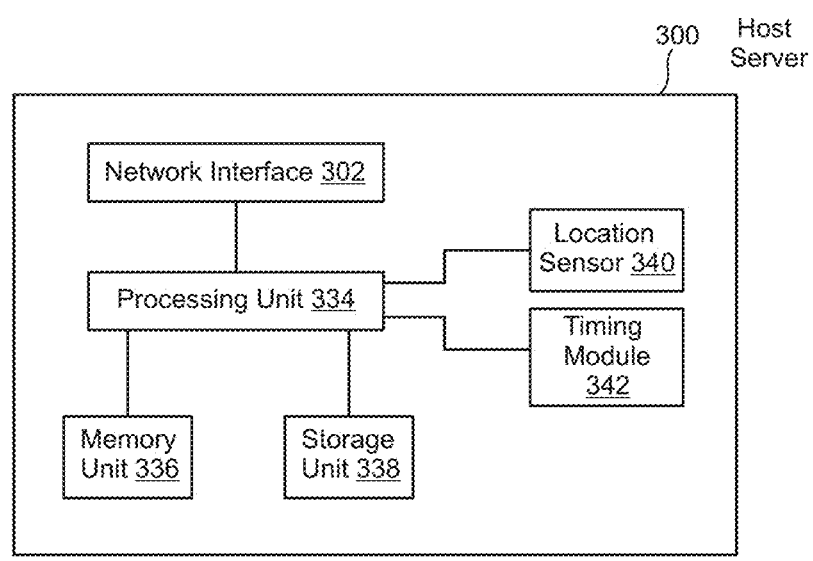
FIG. 3B depicts an example block diagram illustrating the components of the host server that deploys and administers virtual objects for various disclosed applications, in accordance with embodiments of the present disclosure.

FIG. 3B depicts an example block diagram illustrating the components of the host server 300 that deploys and administers virtual objects for various disclosed applications, in accordance with embodiments of the present disclosure In one embodiment, host server 300 includes a network interface 302, a processing unit 334, a memory unit 336, a storage unit 338, a location sensor 340, and/or a timing module 342. Additional or less units or modules may be included. The host server 300 can be any combination of hardware components and/or software agents to deploy and administer virtual objects for various disclosed applications. The network interface 302 has been described in the example of FIG. 3A.

One embodiment of the host server 300 includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 includes a memory unit 336 and a storage unit 338. The memory unit 335 and a storage unit 338 are, in some embodiments, coupled to the processing unit 334. The memory unit can include volatile and/or non-volatile memory. In virtual object deployment, the processing unit 334 may perform one or more processes related to targeting of context-aware virtual objects in AR environments. The processing unit 334 can also perform one or more processes related to behavior modeling of virtual objects based on physical principles or physical laws.

In some embodiments, any portion of or all of the functions described of the various example modules in the host server 300 of the example of FIG. 3A can be performed by the processing unit 334.

Figure 4A:
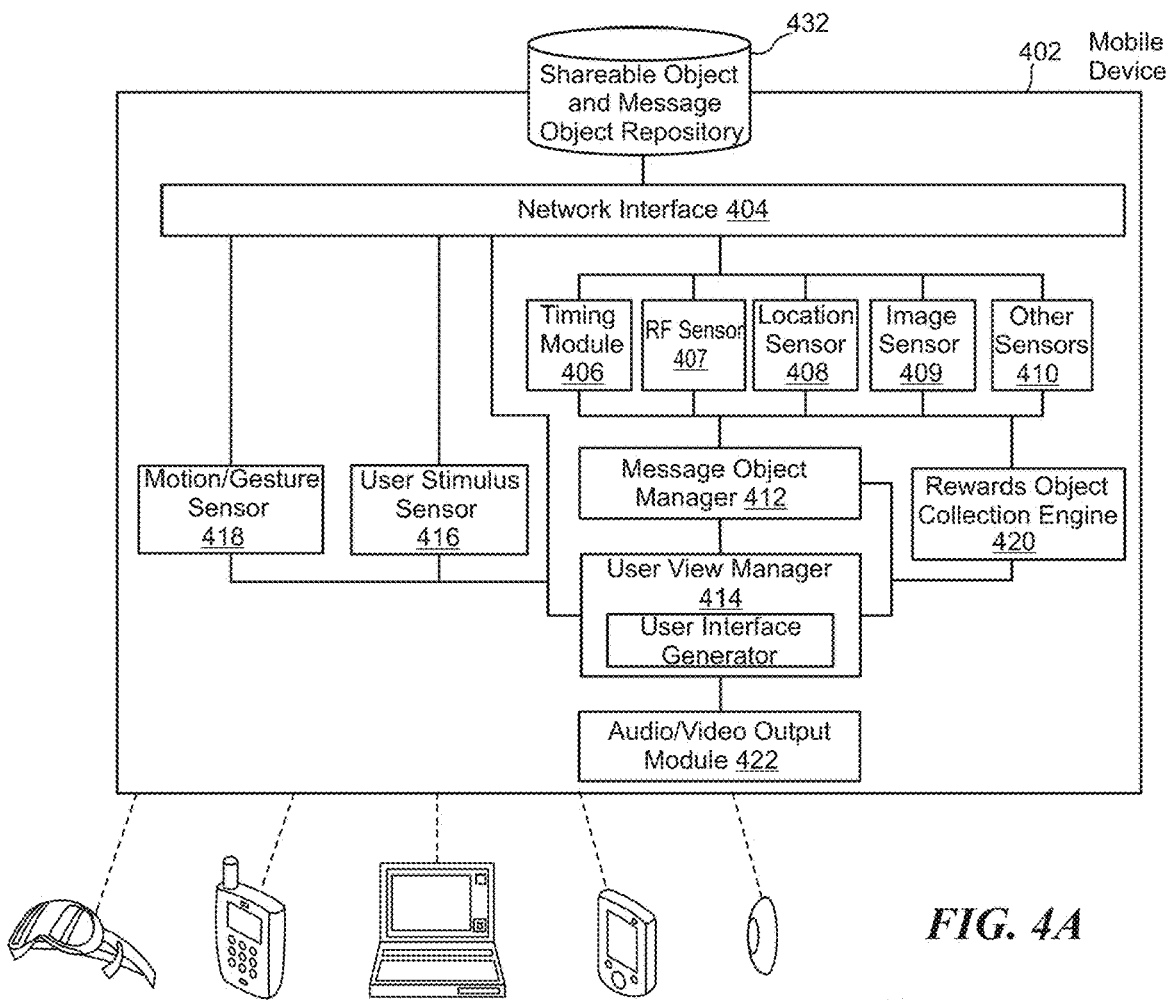
FIG. 4A depicts an example functional block diagram of a client device such as a mobile device that enables virtual object manipulation and/or virtual object collection for various disclosed applications, in accordance with embodiments of the present disclosure.

FIG. 4A depicts an example functional block diagram of a client device 402 such as a mobile device that enables virtual object manipulation and/or virtual object collection for various disclosed applications, in accordance with embodiments of the present disclosure The client device 402 includes a network interface 404, a timing module 406, an RF sensor 407, a location sensor 408, an image sensor 409, a message object manager 412, a user view manager 414, a user stimulus sensor 416, a motion/gesture sensor 418, a rewards object collection engine 420, an audio/video output module 422, and/or other sensors 410. The client device 402 may be any electronic device such as the devices described in conjunction with the client devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, smart lens, monocles, smart glasses/goggles, wearable computer such as mobile enabled watches or eyewear, and/or any other mobile interfaces and viewing devices, etc.

In one embodiment, the client device 402 is coupled to a shareable object and message object repository 432. The shareable object and message object repository 432 may be internal to or coupled to the mobile device 402 but the contents stored therein can be further described with reference to the example of the shareable object and message object repository 132 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the client device 402 to mediate data in a network with an entity that is external to the host server, through any known and/or convenient communications protocol supported by the host and the external entity. The network interface 404 can include one or more of a network adapter card, a wireless network interface card, a router, an access point, a wireless router, a switch, a multi-layer switch, a protocol converter, a gateway, a bridge, bridge router, a hub, a digital media receiver, and/or a repeater.

According to the embodiments disclosed herein, the client device 402 can enables virtual object manipulation and/or virtual object collection for various disclosed applications. The AR workspace can also be rendered at least in part via one or more of, a mobile browser, a mobile application and a web browser, e.g., via the client device 402. Note that the marketplace environment can be rendered in part of in whole in a hologram, for example, in 3D and in 360 degrees, via the client device 402.

The client device 402 can provide functionalities described herein via a consumer client application (app) (e.g., consumer app, client app. Etc.). The consumer application includes a user interface that generates views of AR environments (e.g., via the user view manager 414) in accordance with various disclosed applications, enables virtual object manipulation (e.g., via the message object manager 412) and/or virtual object collection (e.g, via the rewards object collection engine 420) for various disclosed applications.

Figure 4B:
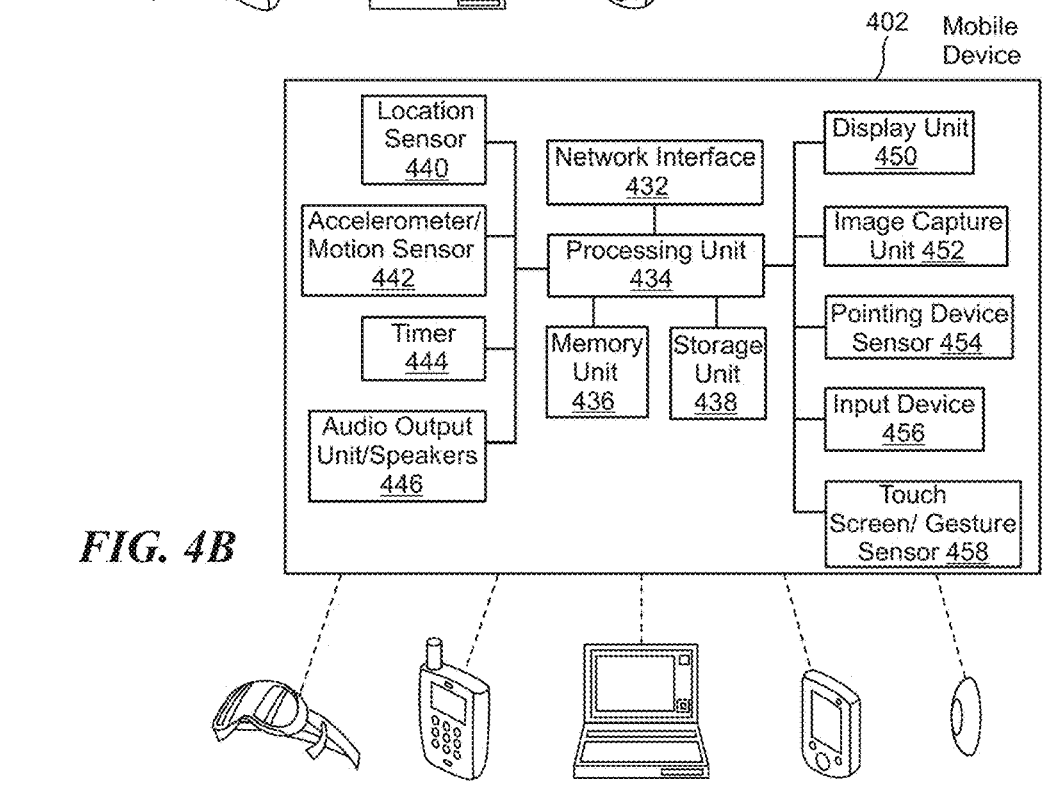
FIG. 4B depicts an example block diagram of the client device, which can be a mobile device that enables virtual object manipulation and/or virtual object collection for various disclosed applications, in accordance with embodiments of the present disclosure.

FIG. 4B depicts an example block diagram of the client device 402, which can be a mobile device that enables virtual object manipulation and/or virtual object collection for various disclosed applications, in accordance with embodiments of the present disclosure.

In one embodiment, client device 402 (e.g., a user device) includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, an input device 456, and/or a touch screen sensor 458. Additional or less units or modules may be included. The client device 402 can be any combination of hardware components and/or software agents that generate views of AR environments (e.g., via the user view manager 414) in accordance with various disclosed applications, enable virtual object manipulation (e.g., via the message object manager 412) and/or virtual object collection (e.g, via the rewards object collection engine 420) for various disclosed applications. The network interface 432 has been described in the example of FIG. 4A.

One embodiment of the client device 402 further includes a processing unit 434. The location sensor 440, accelerometer/motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the client device 402 for example, via the image capture unit 452, pointing device/sensor 554, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In rendering or presenting an augmented reality environment, the processing unit 434 can perform one or more processes related to administering an augmented reality workspace in a physical space where a user interface element of the augmented reality workspace is rendered as being present in the physical space and able to be interacted with in the physical space.

In some embodiments, any portion of or all of the functions described of the various example modules in the client device 402 of the example of FIG. 4A can be performed by the processing unit 434. In particular, with reference to the mobile device illustrated in FIG. 4A, various sensors and/or modules can be performed via any of the combinations of modules in the control subsystem that are not illustrated, including, but not limited to, the processing unit 434 and/or the memory unit 436.

Figure 5A:
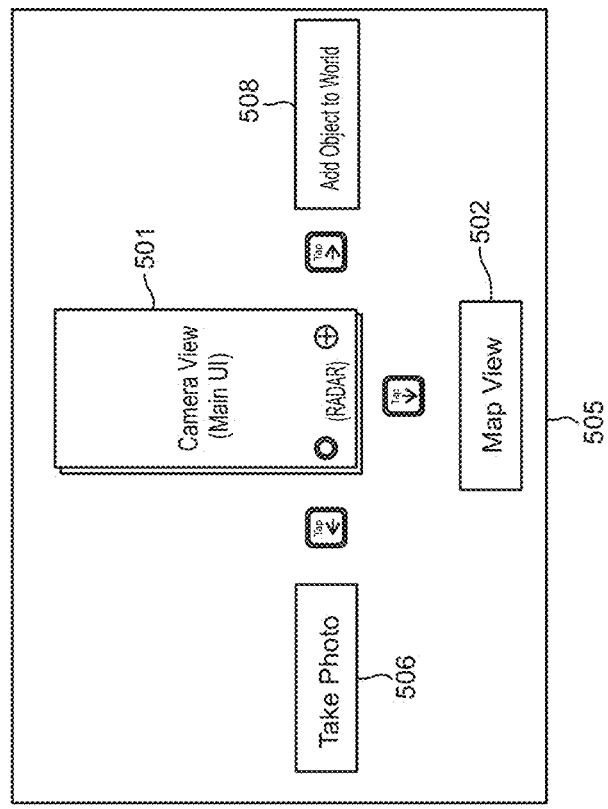
FIG. 5A graphically depicts diagrammatic examples showing user experience flows in navigating an example user interface for accessing, viewing or interacting with an augmented reality environment, in accordance with embodiments of the present disclosure.
Figure 5A:
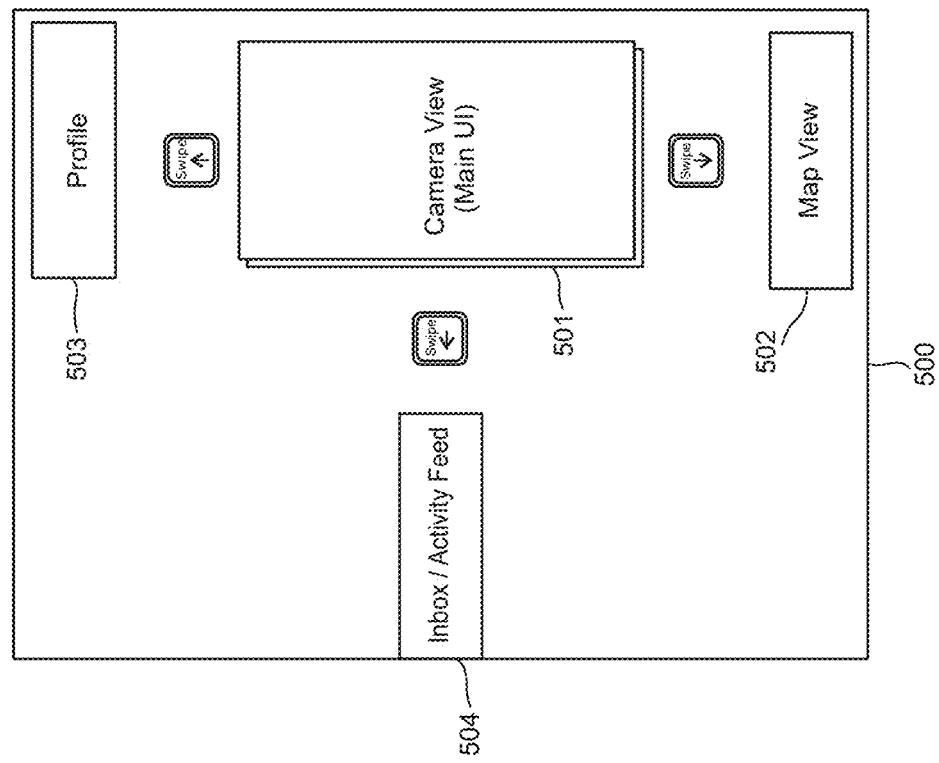

FIG. 5A graphically depicts diagrammatic examples showing user experience flows in navigating an example user interface for accessing, viewing or interacting with an augmented reality environment, in accordance with embodiments of the present disclosure.

For example, in 510, from a camera view 501 (e.g., or a main user interface), the user can access their profile 503, access a map view 502 and/or access their inbox and/or activity feed 504. In example 505, via a camera view 501 can include a radar of virtual objects in the nearby physical location. The user can also access a map view 502, take a photo 506 and/or add a VOB to the world at or near the physical location 508. Examples of camera and/or map views are illustrated with further reference to the example screenshots of FIG. 5D.

Figure 5B:
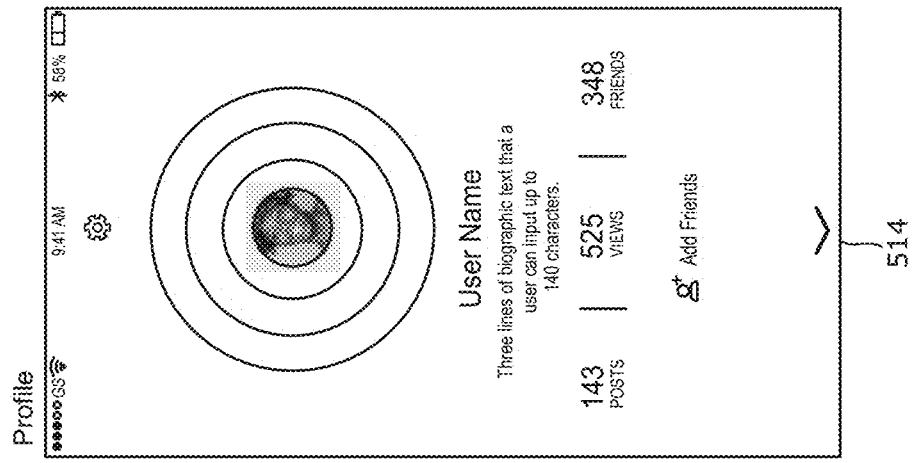
FIG. 5B graphically depicts example user interfaces for logging in to, signing up for and viewing a user profile in an augmented reality environment, in accordance with embodiments of the present disclosure.
Figure 5B:
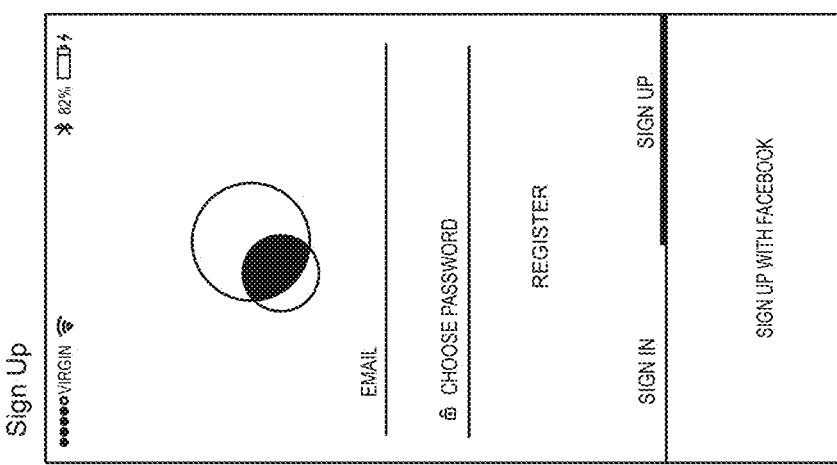
Figure 5B:
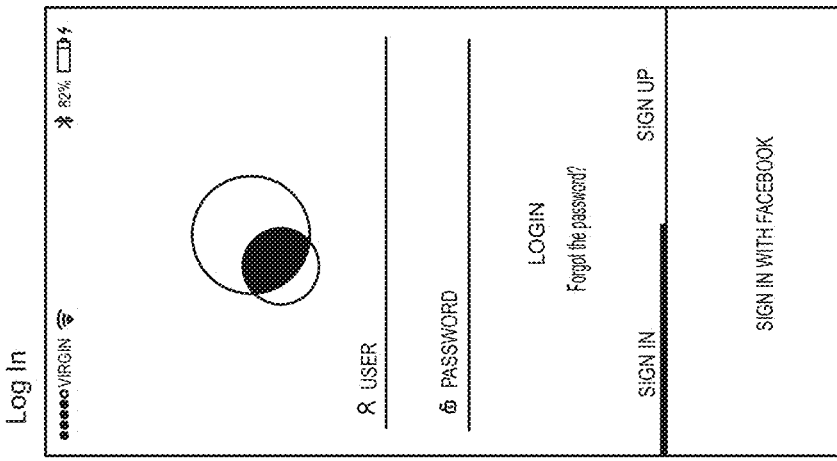

FIG. 5B graphically depicts example user interfaces for logging in to, signing up for and viewing a user profile in an augmented reality environment, in accordance with embodiments of the present disclosure. For example, the user can log into the AR environment via user interface 510, sign up for or register for the AR environment via user interface 512. The user can access their user profile, edit their user profile and/or add friends to their network in the AR environment via user interface 514.

Figure 5C:
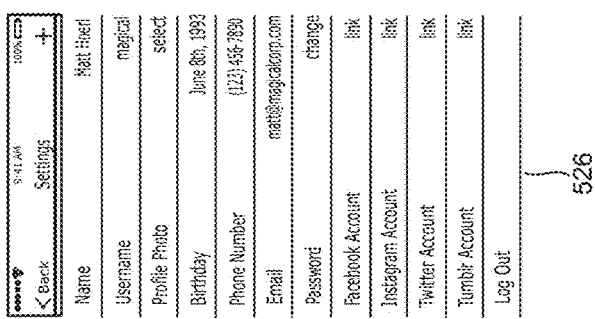
FIG. 5C graphically depicts example user interfaces for managing friends in an augmented reality environment and an example user interface to manage application settings, in accordance with embodiments of the present disclosure.
Figure 5C:
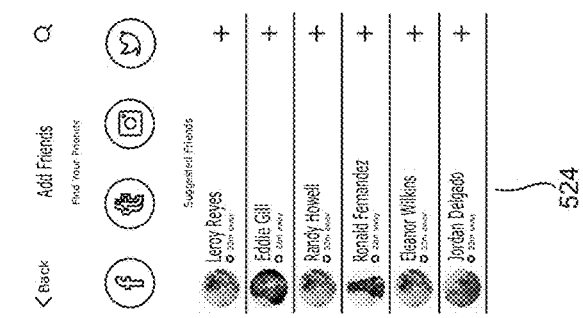
Figure 5C:
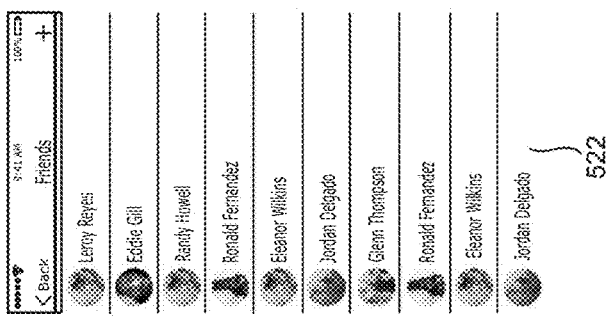
Figure 5C:
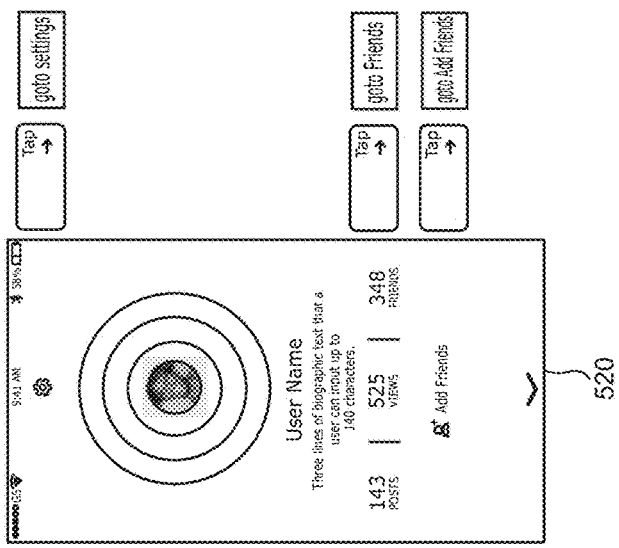
Figure 5D:
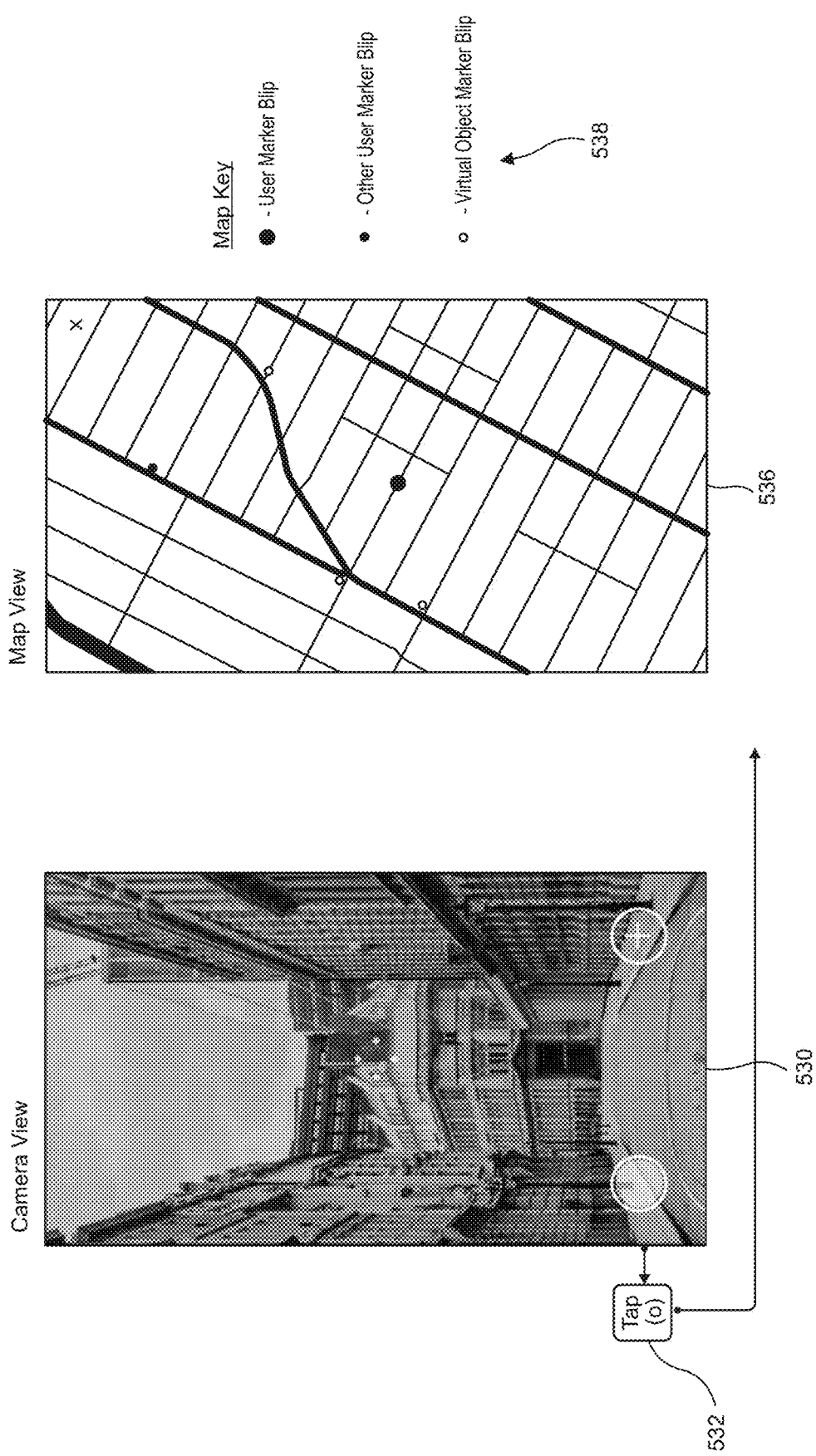
FIG. 5D graphically depicts example user interfaces of an augmented reality environment showing a camera view and a map view, in accordance with embodiments of the present disclosure.

FIG. 5C graphically depicts example user interfaces for managing friends in an augmented reality environment and an example user interface to manage application settings, in accordance with embodiments of the present disclosure. For example, in user interface 510, the user can go to a user interface 522 to manage/view their friends. The user can also enter user interface 524 to add friends and connect to various third party platforms. The user from user interface 510 can also FIG. 5D graphically depicts example user interfaces of an augmented reality environment showing a camera view 530 and a map view 536, in accordance with embodiments of the present disclosure. In the camera view 530, the user can select element 532 to enter into or switch over to the map view 536. In the map view 536, the user interface can also depict various markers which represent VOBs or other users or avatars that are in the mapped area. The legend 538 shows a key showing what is represented by various markers in the map view 536. Additional embodiments of the present disclosure further include a 3d Radar for augmented reality. Embodiments include an object locator in 3d space that can pinpoints the x,y, and z coordinates of a VOB. The object locator can further depict the VOB with altitude and/or GPS coordinates. The object locator can also include a compass Further embodiments of the present disclosure include a live activity feed of augmented reality content. One embodiment includes a live view on a display device (phone, TV, glasses, specialized screen etc) located at a physical location in the real world environment. The view on the display device that shows the present AR activity or level of AR activity in an augmented reality or virtual reality application and/or data layer associated with the physical location. The live view can display for example, statistics and/or visualizations about the AR or virtual activity for the physical location to users.

The live view can also render or depict a live streaming video or software interface of the virtual layers of activity at the physical location. This enables a user who is physically in or around the physical location to determine whether it is worth it to engage with the AR environment or any other virtual data layers associated with the physical location. This can for example entice users in viewing the associated virtual components (a layer of data associated with the physical location) using their own device (their phone, glasses, goggles, contact lenses, wearables, implants etc).

In one embodiment, the displays can be small screens like tablets—or little stickers with live displays on them (e.g., holographic displays). The displays and/or the views rendered can also include a location indicator—like a bar code or QR code etc that appears. They show you what is happening in the augmented layer of the physical place, and if you scan it you can zoom right to that location in the augmented layer. Note the virtual data layer or VOBs or virtual elements associated with the physical location can be advertised and advertising revenue can be driving from the live views of AR activity associated with the physical location.

Furthermore, analytics for a user's layer or a user's VOBs or virtual content are generally available to the user. The system can generate statistics, metrics, and trends for a physical location and/or the VOBs, AR activity, virtual data of a physical place. Analytics of VOBs, AR data, AR content and/or of the augmented reality environment can enable users to view activity and other statistics about engagement with the augmented reality content or apps for any physical location or set of locations in the real world environment.

Figure 5E:
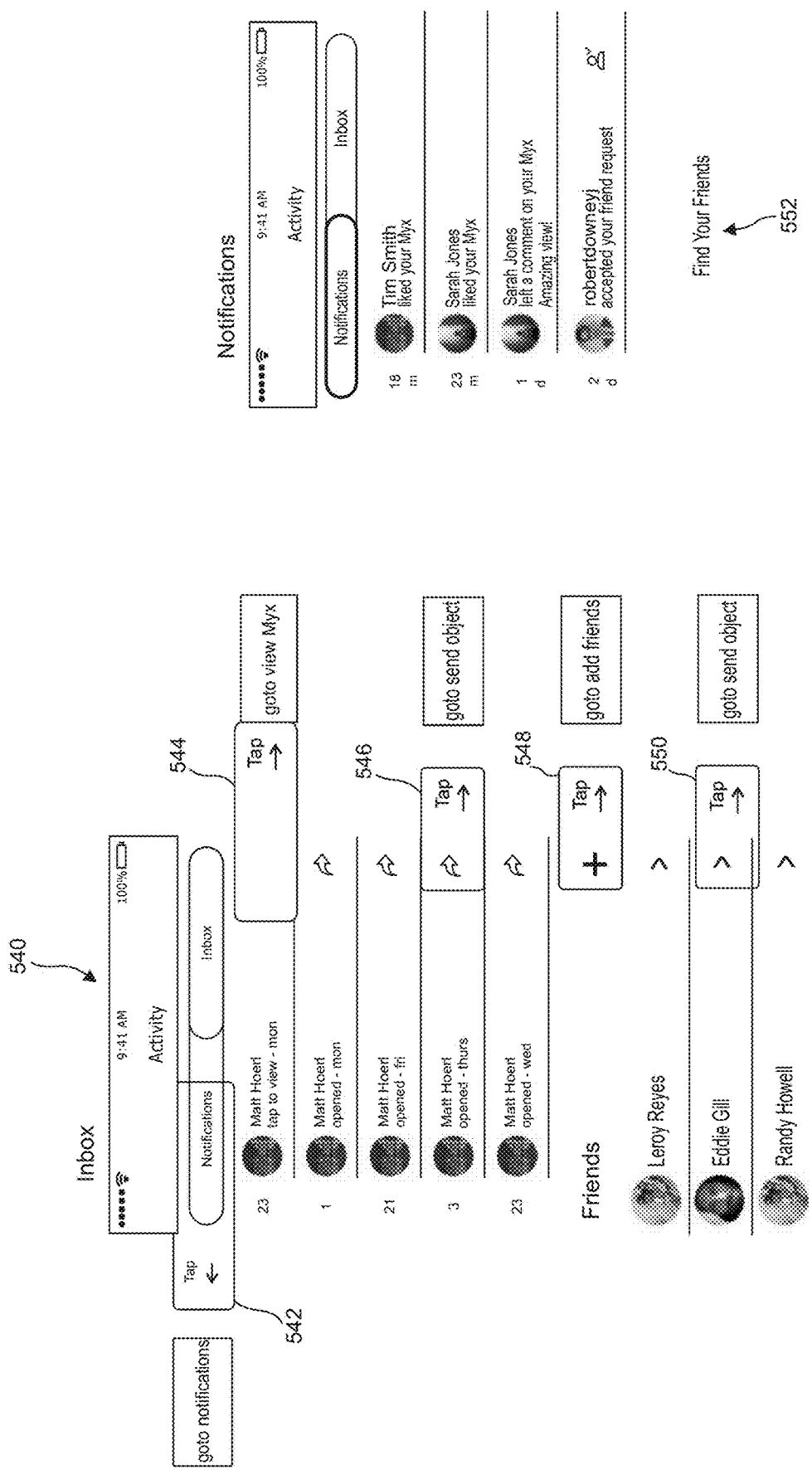
FIG. 5E graphically depicts example user interfaces for viewing notifications in an augmented reality environment, in accordance with embodiments of the present disclosure.

FIG. 5E graphically depicts example user interfaces for viewing notifications in an augmented reality environment, in accordance with embodiments of the present disclosure.

For example, in user interface 540, a user can view their activities including their notifications, friends and their inbox. From user interface 540, the user an activate element 542 to open and access notifications (e.g., user interface 552). From 540, the user can also tap 544 to view their VOB collection, tap 546 to send VOBs, tap 548 to add friends and/or tap 550 to send VOBs.

FIG. 5F graphically depicts example user interfaces for placing a virtual object at a physical location and example user interfaces for sharing a virtual object (VOB) with another user via an augmented reality environment, in accordance with embodiments of the present disclosure.

For example, from a camera view 560, a user can select 561 to select a VOB in 562. The user can tap 563 to select the VOB and in 564 the user can place the VOB to associate the VOB with the physical location. In 566 the user can select a friend from panel 567. In 568 the user can select the friend and hit send 569 to send to that friend. Example embodiments of Virtual Object Exchange Between Users can include ways for users to give VOBs to other users. For example, user A gives user B a VOB, or a copy of a VOB, that User A possesses. A user can select the VOB in their inventory and then select the share action on it, and then select a person to share it with. This can be the process if the person you are sharing with is not near you.

In one embodiment, the list of people you know can include a section "People near you" for the user to select people near you. Alternatively the user can select a person near them by activating the person in AR viewing mode and then selecting the "Share" action and choosing an object to share with them, for example, either from a list, or using a targeting reticle—so first you select and lock a user, then you select and lock an object to share, and then it is shared when you commit the action.

The disclosed system includes a selector, or reticle, that when targeting a VOB can be adjusted to compensate for depth. This selector allows users to target and select VOBs which may be hidden or covered by VOBs in the forefront. For instance, users can aim the selector and pinch to zoom using hand gestures in front of a camera and also on a touch screen input method. This allows the user to shuffle through virtual objects to select the object they would like to target and select. This could be in the vein of a missile tracking system.

Figure 5G:
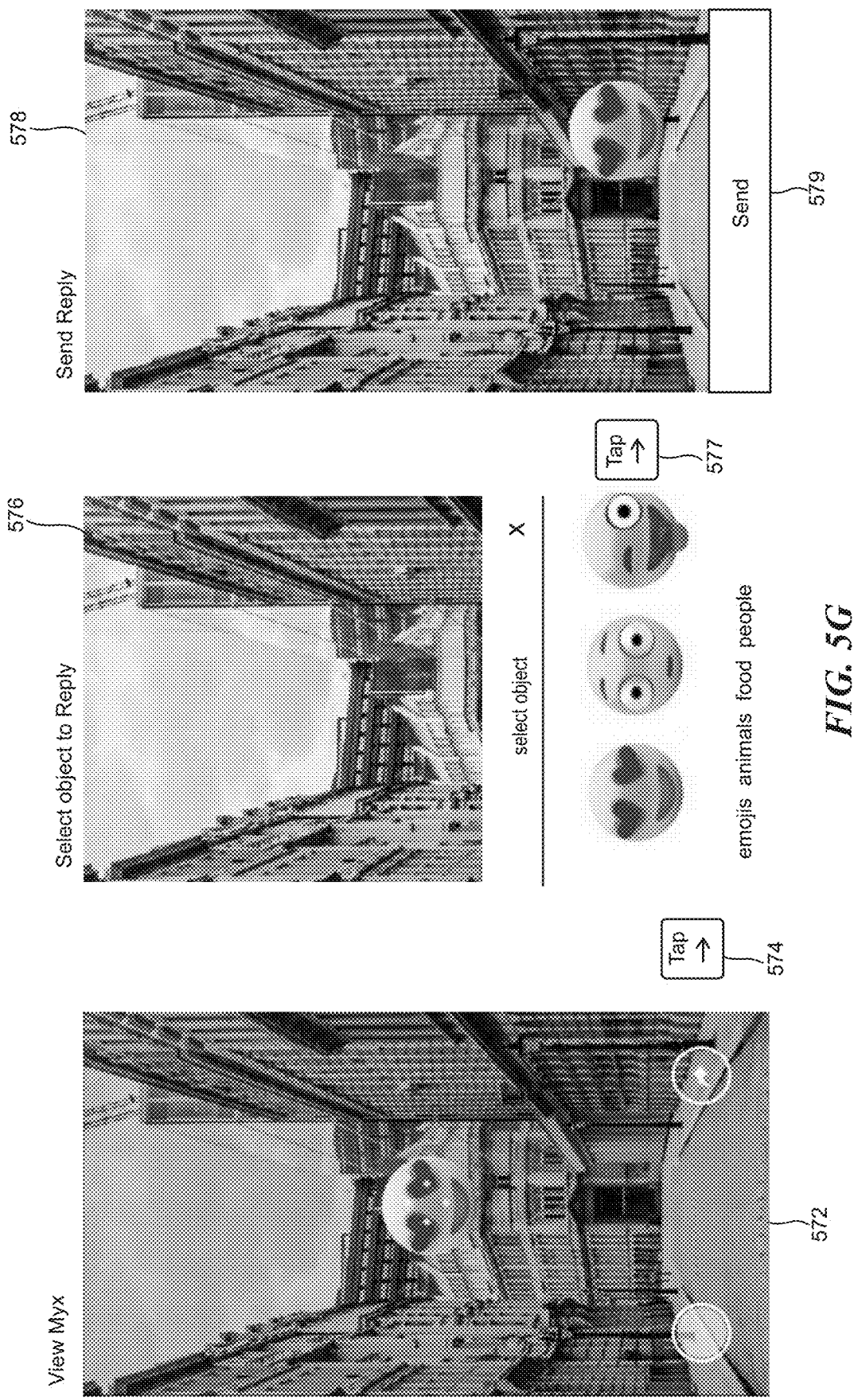
FIG. 5G graphically depicts example user interfaces for responding to a message or a virtual object with another virtual object via an augmented reality environment, in accordance with embodiments of the present disclosure.

FIG. 5G graphically depicts additional example user interfaces for responding to a message or a virtual object with another virtual object via an augmented reality environment, in accordance with embodiments of the present disclosure. For example, in 576 the user can select a VOB to be used in a response or as a reply. In selecting 577, the VOB is selected an in 578, the reply can be sent through hitting send in 579.

Figure 6A:
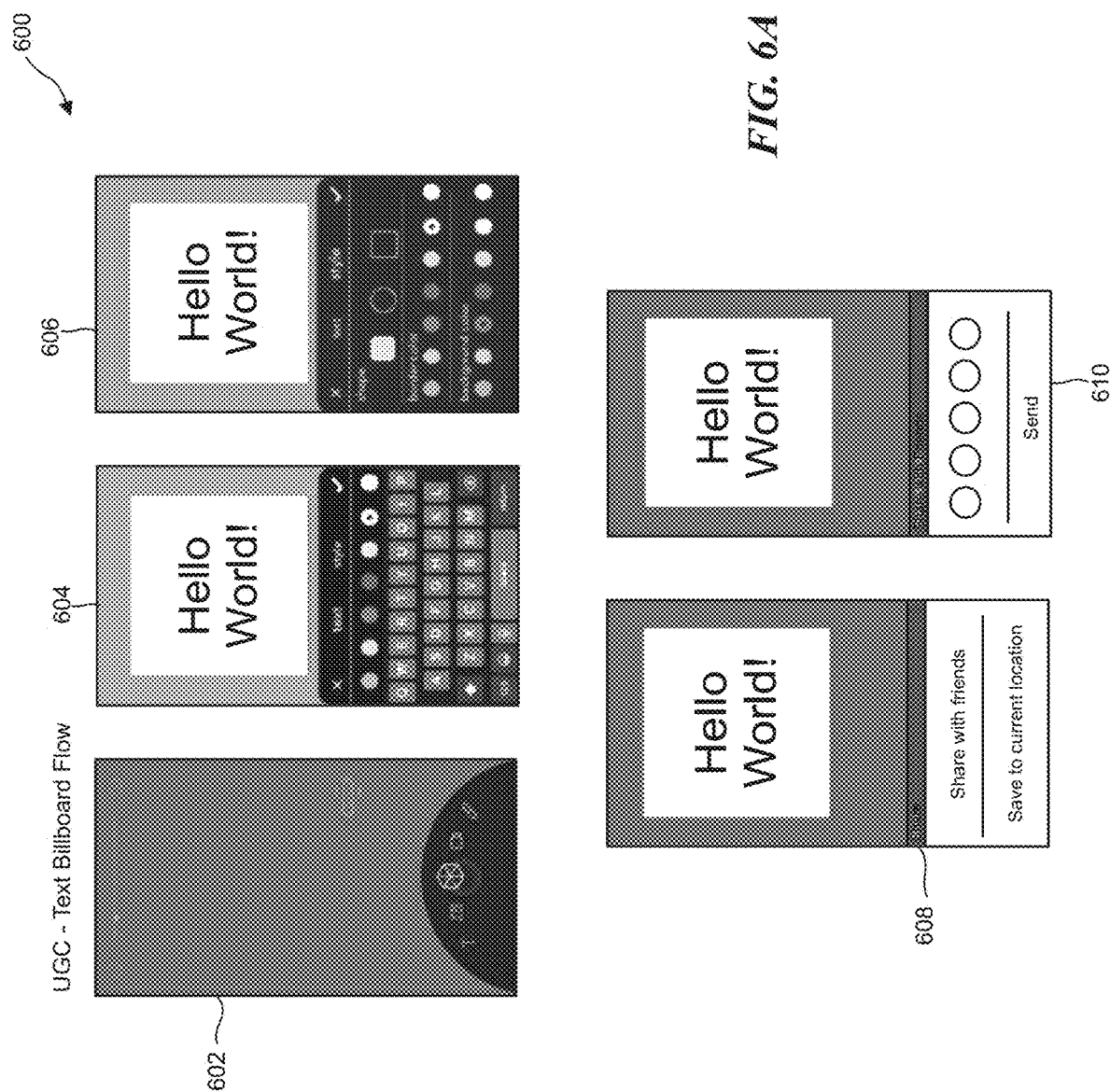
FIG. 6A graphically depicts example user interfaces for creating, posting and/or sharing a virtual billboard object having text content, in accordance with embodiments of the present disclosure.

FIG. 6A graphically depicts example user interfaces 600 for creating, posting and/or sharing a virtual billboard object having text content, in accordance with embodiments of the present disclosure.

Figure 6B:
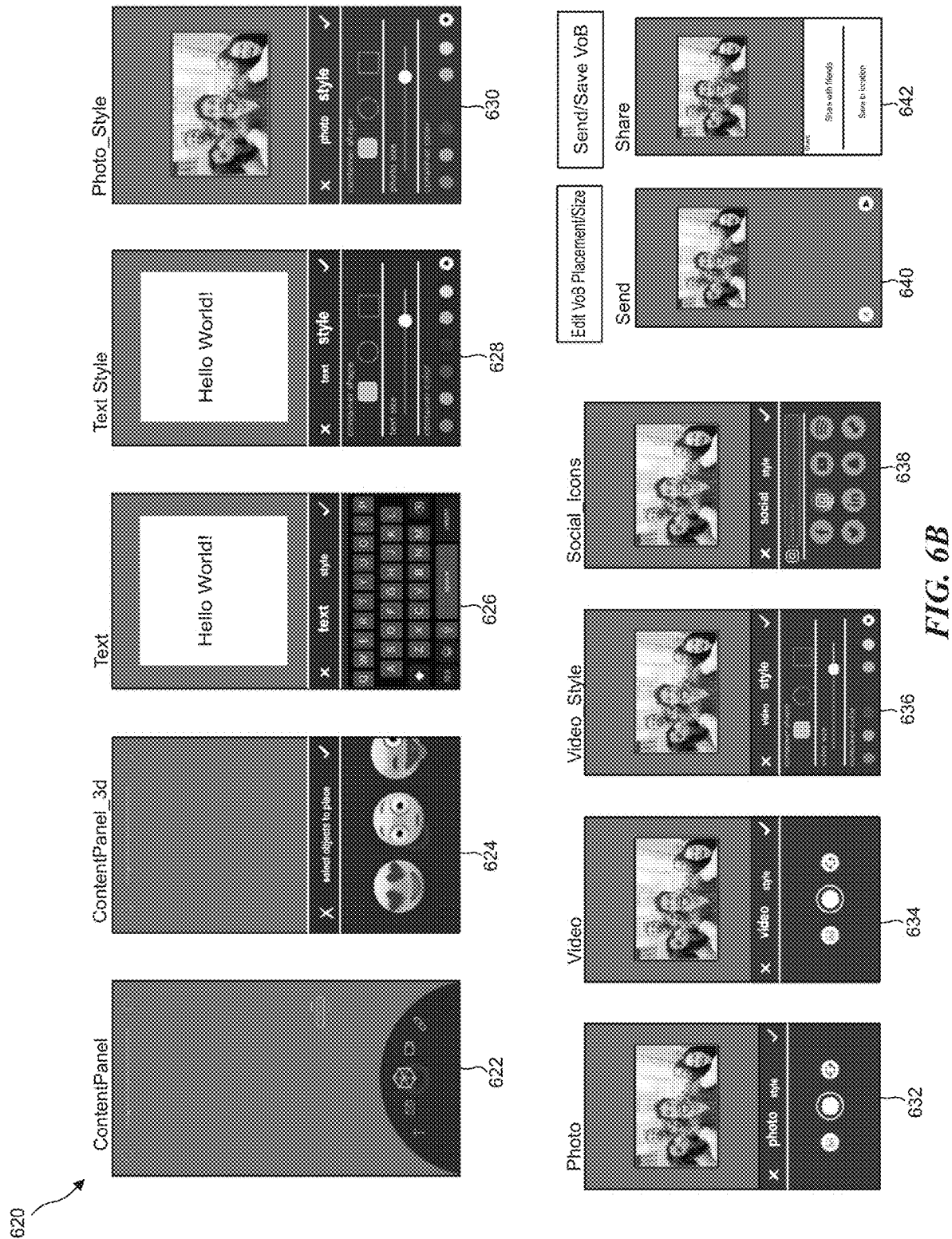
FIG. 6B graphically depicts additional example user interfaces for creating, posting and/or sharing a virtual object s having multimedia content in accordance with embodiments of the present disclosure.

For example, in 602 the user can select the text icon to create or design a billboard with text. In 604, the user can specify the text, and in 606 the user can apply a design or style (shape, color) to the text and the billboard. In 608, the user can select to share the virtual billboard object with friends or to save it to a current physical location. In 610, the virtual billboard can be sent or placed at the physical location. FIG. 6B graphically depicts additional example user interfaces 620 for creating, posting and/or sharing a virtual object s having multimedia content in accordance with embodiments of the present disclosure.

Figure 6C:
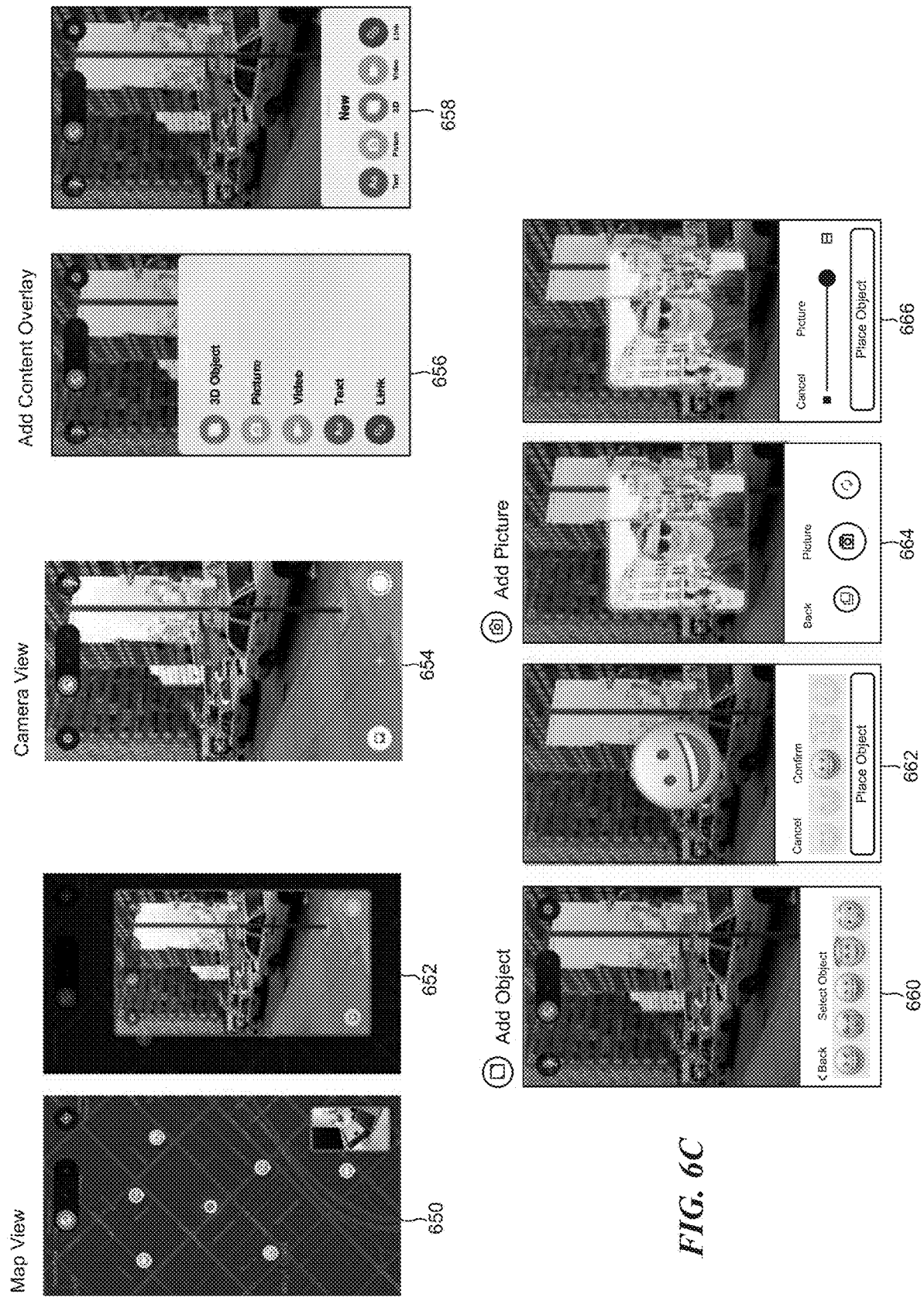
FIG. 6C graphically depicts example user interfaces for creating a virtual object, posting a virtual object and placing a virtual object at a physical location, in accordance with embodiments of the present disclosure.

FIG. 6C graphically depicts additional example user interfaces for creating a virtual object, posting a virtual object and placing a virtual object at a physical location, in accordance with embodiments of the present disclosure. The VOB that is posted can include, a 3D object, pictures, videos, text and/or link and selected in 656 or 658. A VOB can be selected in 660 and placed in a physical location in 662. Similarly, in 664 a photo can be selected and placed at the physical location in 666.

Figure 7:
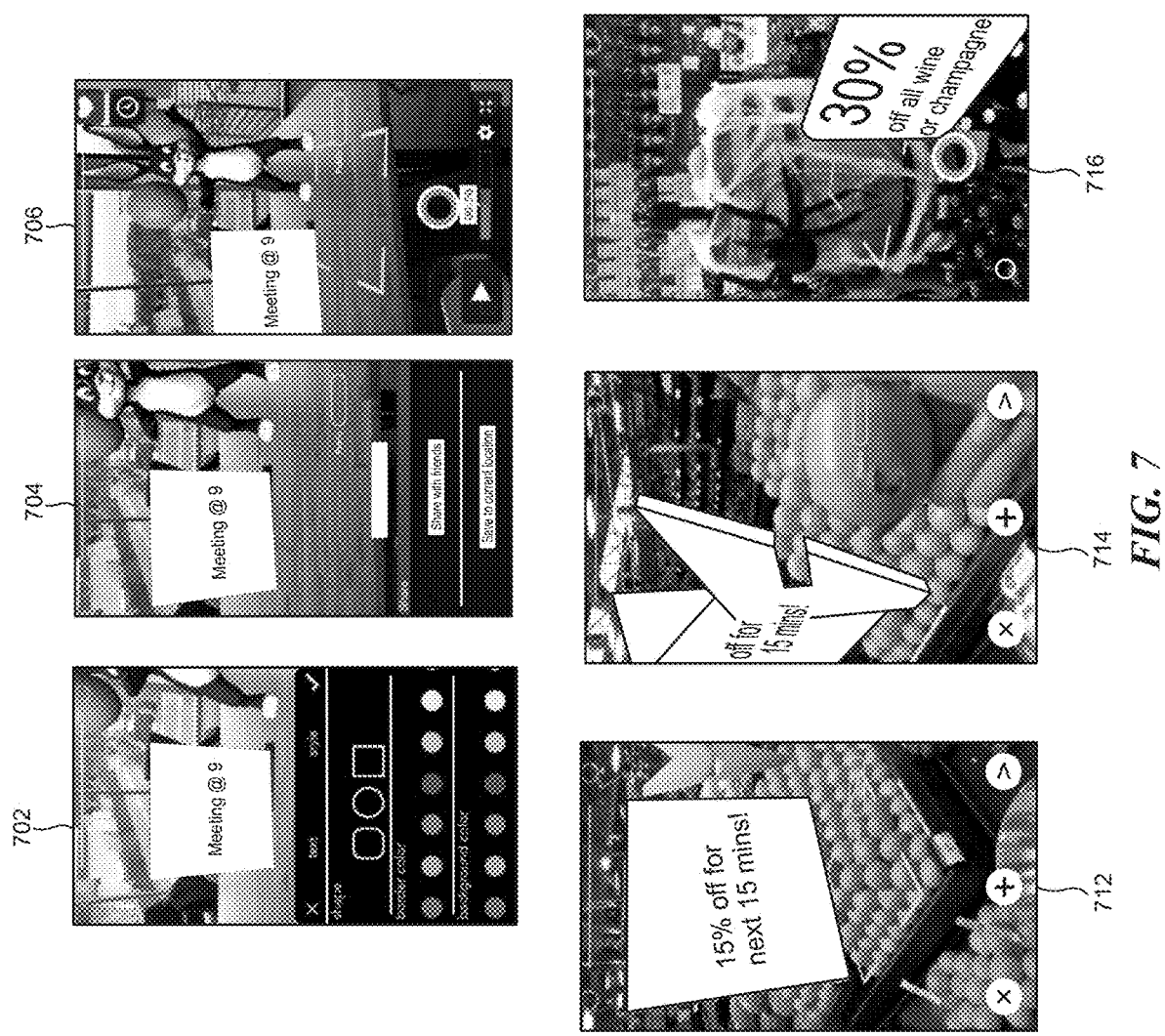
FIG. 7 graphically depicts example user interfaces for creating a virtual billboard, posting a virtual billboard at a physical location, sharing the virtual billboard and views of examples of virtual billboard objects placed at physical locations, in accordance with embodiments of the present disclosure.

FIG. 7 graphically depicts example user interfaces for creating a virtual billboard, posting a virtual billboard at a physical location, sharing the virtual billboard and views of examples of virtual billboard objects placed at physical locations, in accordance with embodiments of the present disclosure.

For example, in 702, a 'Meeting @ 9' virtual billboard is created and designed. In 704, the user can select to share the virtual billboard with friends or to save it at the current physical location, as shown in the example of 706. In 712, a virtual billboard stating '15% off for the next 15 minutes!' is associated with a shelf stocking oranges in a super market. 714 depicts another view of the same virtual billboard. In 716, a wine promotion virtual billboard is associated with the wine section in a store or with a certain wine shelf in a wine store.

Figure 8:
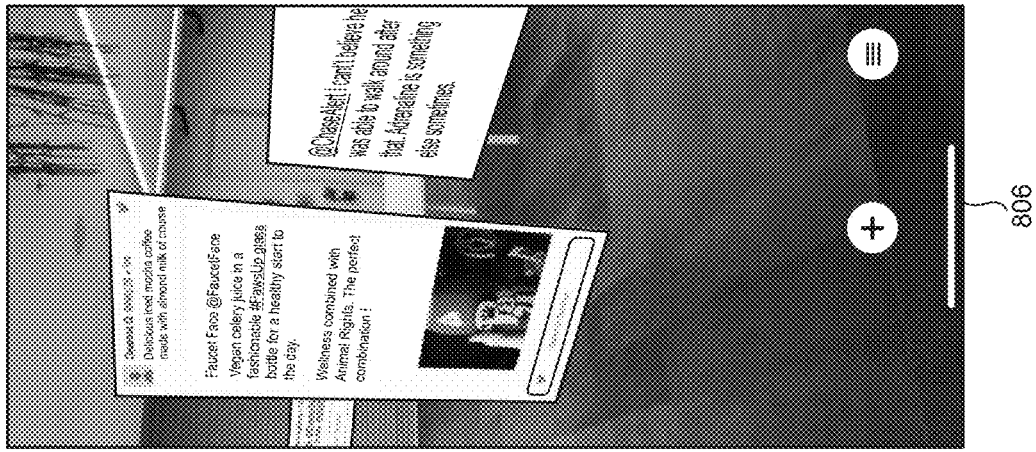
FIG. 8 graphically depicts views of examples of virtual objects associated with a physical location, in accordance with embodiments of the present disclosure.
Figure 8:
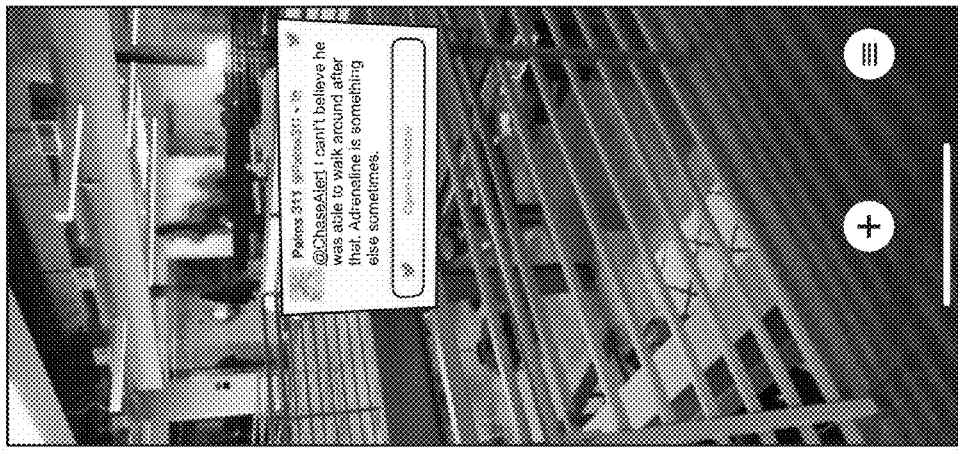
Figure 8:
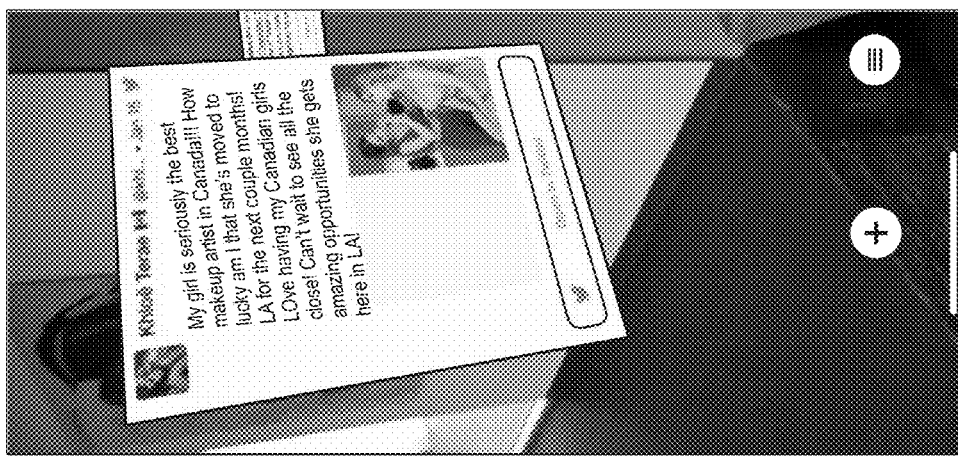

FIG. 8 graphically depicts views of examples of virtual objects associated with a physical location, in accordance with embodiments of the present disclosure. User interfaces 802, 804 and 806 depict various views of virtual objects showing user generated content (e.g., tweets). The virtual objects are associated with the physical location (e.g., office space). Note that users can reply to the VOBs, either as a tweet or as feedback, comment, like, of the VOB itself. The user response(s) can be shown or depicted with the VOBs in the physical location.

Figure 9A:
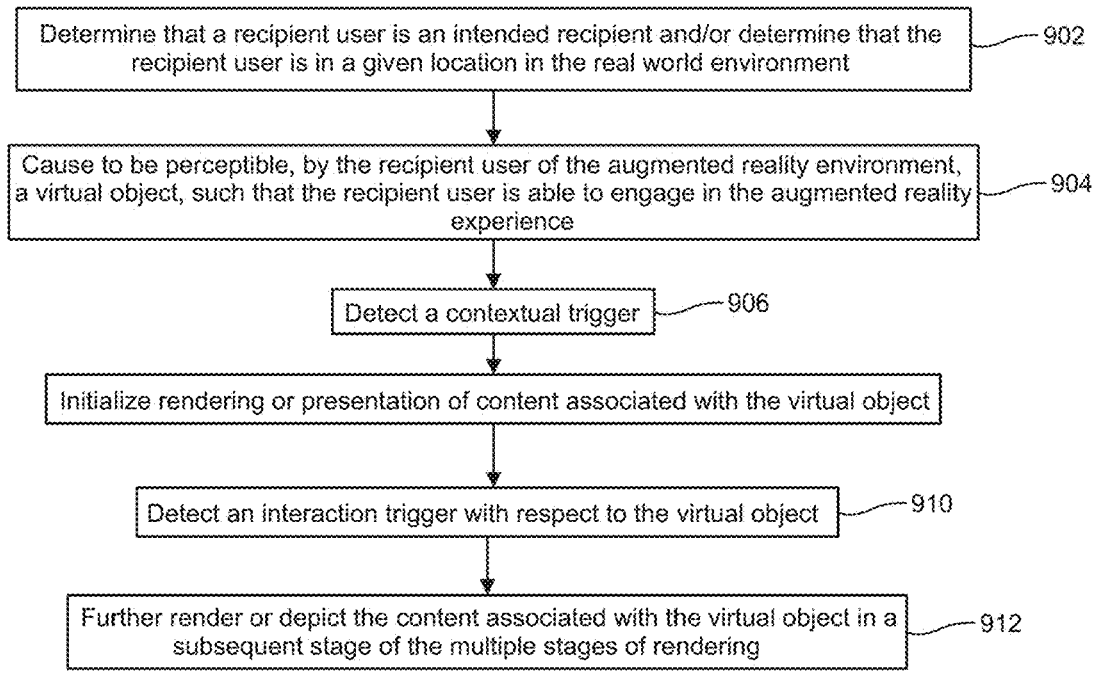
FIG. 9A depicts a flow chart illustrating an example process to share a virtual object with a recipient user, in accordance with embodiments of the present disclosure.

FIG. 9A depicts a flow chart illustrating an example process to share a virtual object (VOB) with a recipient user, in accordance with embodiments of the present disclosure.

In process 902, it is determined that a recipient user is an intended recipient of a virtual object. It can also be determined that the recipient user, for example the recipient user who is an intended recipient is in a given location in the real world environment. In general, the virtual object can be shared with the recipient user by another entity that uses the augmented reality (AR) environment. The other entity can be an individual user, a user group, an organization, and/or a company.

In response to the determination of process 902, in process 904, a virtual object is caused to be perceptible by the recipient user of the augmented reality environment. The virtual object is depicted such that the recipient user can engage in the augmented reality experience via the augmented reality environment. The augmented reality experience can include, for example, a real time or near real time augmented reality chat session or an augmented reality messaging session.

For example, the AR chat session or AR messaging session can include message objects rendered as virtual objects in the AR environment. The message object can be or can include content created or generated by a sender user and sent or delivered to a recipient. The recipient can include an individual recipient user or multiple recipient users or a user group or an entity or an organization. The augmented reality experience can also include asynchronous exchanges of augmented reality messages, augmented reality conversations, augmented reality electronic mail, gifting in augmented reality or augmented reality greeting cards.

For example, the system (e.g., server 100 of FIG. 1, server 300 of FIG. 3A) can enable a user to give their friends or any other user virtual objects as gifts. The VOBs can include messages. The VOBs can include texts, comments, rewards, reviews, other messages and gift cards, as virtual objects in AR. Users can also pay to skin the VOBs, for example, as a duck or an airplane or a Buddha or anything else. The system (e.g., server 100 of FIG. 1, server 300 of FIG. 3A) can reward users to engage participation, for example, by giving them points or a chance to win points if user interact with VOBs or VOBs gifted or shared with them.

The augmented reality experience can include a multi-player mode gaming experiences (e.g., 2 player games, 2-5 player games and games for more users). The recipient user and the other entity interact with the virtual object. Sharing an object is also an example way of how two or more players join a multiplayer game in the augmented reality platform. One user shares the game object with each player. They can interact with the same object and any resulting AR game experiences in multiplayer mode. Two person games can include, 2 person tennis or air hockey, 2 person dodgeball or ping pong, 2 person shooter, etc., Users can learn to play an AR game with a friend.

Some games can be launched by players who find them in the AR environment. Some games can be shared virally between users. For example, some games are exclusive and spread by invite only. Someone connects you and shows you how to play. Some examples of AR games include a live game that is enabled for both players that re in the same or similar place. An AR game can be a remote AR game that is live or asynchronous.

In process 906, a contextual trigger is detected. The contextual trigger includes one or more of, a user trigger, an event trigger or an activity trigger, a time trigger, a location trigger, or any combination of the above. The contextual trigger can be associated with the virtual object and can specify the conditions under which the virtual object is caused to be perceptible. Any or all of the parameters of the contextual trigger can be defined or specified by a sender entity of the virtual object.

In one embodiment, the contextual trigger occurs when the recipient user is engaging in a given action or activity in a given location at a given time in the real world environment and can be detected by the platform (e.g., the platform hosted by host server 100 of FIG. 1, host server 300 of FIG. 3A-FIG. 3B).

For example, the virtual object can be configured to appear when a child (user trigger) opens the cupboard (e.g., activity trigger) at home (location trigger) in the afternoon (time trigger). The virtual object can render a message that tells the child to not to eat/access the cookies before dinner time. Contrastingly, when dad (user trigger) opens the cupboard (activity trigger) in the afternoon (time trigger), a virtual object can render message (messages can include any combination of, video, image, text, audio, music, songs, animation, multimedia content) that reminds the dad to not drink beer in the afternoon. In another example, a virtual object can be configured to appear before sunset (time trigger) on ski slopes (location trigger) to indicate to the skiers, the current time, time to sunset, time of last lift, current conditions, any hazards or warnings, etc.

The contextual trigger can also occur when the recipient user is engaging in a given action or activity at a specific time/time frame at any location, and be detected by the platform. For example, when a user is driving in the morning (time trigger) regardless of where the user is, a virtual object can depict directions or route to closest coffee shop/Starbucks to the user.

The contextual trigger can also occur when the recipient user is engaging in a given action or activity at any time or any location and be detected by the platform. For example, when a user turns on the vehicle ignition, starts driving, or enters their vehicle (activity trigger), a virtual object can be made perceptible to indicate the current weather, traffic conditions to the user. Note generally the virtual object includes visual and audio components and the content can be communicated, rendered, depicted or otherwise made perceptible to the recipient visually and/or via audio.

In another example, any time a user is shopping online, or physically shopping for merchandise (e.g., clothes, boots, skis, etc), virtual objects having ads for certain merchandise (e.g., such merchandise related to what the user is shopping for) can be made to be perceptible. Moreover, anytime a user is browsing or searching for content (e.g., ski resorts, flights to Whistler, etc.), virtual objects having ads for certain merchandise (e.g., skis boots, gloves, ski jackets, or any such merchandise related to what the user is browsing) can be made to be perceptible.

The contextual trigger can also occur when the recipient user is at a given location at a given time and be detected by the platform. The contextual trigger can also occur when the recipient user is at a given location at any time and be detected by the platform.

The platform can also detect a contextual trigger which occurs at predetermined times or time periods. Such a contextual trigger can for at a given time for any user, all users, or a specific group or type of users. For instance, a virtual object having an advertisement for McDonald's or other restaurants can appear during meal times or set to appear a certain amount of time before, during or after meal times for which the restaurant serves. Such a virtual object can be set to be perceptible to any and all users of the AR environment.

The contextual trigger can also occur at certain locations in the real world environment and be detected by the platform. Such a contextual trigger can be a given location, regardless of the time, for any user, all users, or a specific group or type of users. A virtual object having a weather or conditions warning (e.g., hurricane warning, avalanche warning, heat warning) can be configured to appear or be activated at the relevant location(s) when the warnings are relevant or in effect. This warning can be presented or caused to be perceptible regardless of who the recipient user is and is made perceptible to all users at the given location while the warning is in effect.

In process 908, rendering or presentation of content associated with the virtual object is initialized. In one embodiment, the content associated with the virtual object is rendered or depicted during the augmented reality experience includes multiple stages of rendering. The different stages of rendering can be presented or rendered after different levels or instances of interactions by the user (e.g., the recipient user of the VOB or other users or nearby users).

The multiple stages of rendering can include, for example, one or more of: depiction or presentation of a name, title or subject of the virtual object, depiction of behaviors or animations of the virtual object, depiction of a payload portion of the content. The payload portion of the content can include, for instance, one or more of: a video, a text based message, a game, an experience, a prize and points, audio, an audio message, music, sound track, a sound, a pitch, etc. The VOB can also possess steady state form, shape, animation, or behavior that is present or perceptible before it is activated. Steady state form, shape, animation, or behavior can include a glow, a vibration movement, a pulsating movement, a halo, a cloud, a frame, an outline of the VOB, a color, background sounds or music, a tone, text showing an object exists, an animation, etc. The steady state form, shape, animation, or behavior can be present before the VOB itself is perceptible and can exist to indicate the presence of the VOB.

The steady state can be one of the stages of rendering or it can be considered a constant phase of the VOB that is present before the multiple stages of rendering. In one embodiment, the multiple stages of rendering can be tracked with and identified by a status parameter of the virtual object.

Once activated or made perceptible, the VOB can render its initial stage of rendering. In one example, the virtual object can present all stages of rendering when it is initially made perceptible. The virtual object may present an initial or first stage of rendering after it is initially made perceptible to a user in the AR environment. The rendering may automatically progress to the subsequent stage or stages. In another example, the subsequent stage may not be presented or rendered until detection of a trigger. The trigger can be the detection of another triggering event or condition. The trigger can also be an interaction trigger from user interaction with the virtual object.

The stage of rendering of a VOB can be tracked by the status parameter of the VOB. The status parameter can include multiple components which can also track the number of stages that are in the rendering of the VOB. The status parameter can be expressed as a matrix of data. For example, the status parameter can indicate which stages or levels of rendering has completed for a given instance of rendering of the VOB. Each VOB instance can have its own status parameter data matrix. The status parameter can also set and track the trigger(s) required (if any) to progress the VOB rendering to a given state or states. The status parameter can also be adjusted by a platform host, a creator entity of the VOB (e.g., sender entity) and/or the recipient use.

In process 901, an interaction trigger with respect to the virtual object is detected. For example, the interaction trigger can include stimuli detected of the recipient user or any other user(s).

The interaction trigger can be detected in response to the initial rendering or presentation of the content associated with the VOB. The rendering or presentation of the content of the VOB can be through engagement with the augmented reality experience in the augmented reality environment, by the recipient user. The rendering or presentation can also be part of the VOB's steady state. In process 912, the content associated with the virtual object in a subsequent stage of the multiple stages of rendering is further rendered or depicted.

In general, the content associated with the virtual object can include, a text message, a conversation or a graphical message. The content associated with the virtual object can also include a 3D scene or an animated 3D object, a GiF, an emoticon, a sticker in 2D or 3D, a photo, image, video, drawing, etc. The content associated with the virtual object can also music, a track, background music, foreground music, a tone, a sound, a speech, a conversation, or other audible content. The content associated with the virtual object can also include one or more of, works of art, animation, games, scenes, limericks and jokes. Any combination of different types of content can be associated with the VOB and be rendered, arrange, played back in any order.

In one embodiment, the subsequent stage of rendering can be identified based on one or more of, the status parameter associated with the VOB or the interaction trigger. Further stages of rendering of the VOB can also be identified and rendered based on the status parameter and/or the interaction trigger. In one embodiment, a state of the virtual object after the content has cycled through the multiple stages of rendering is further determined by the status parameter of the virtual object. The state can include, one or more of: an expire state, a vanish state, a continue state, a pause state, a morph state, and a change state. For example, if James wanted to leave permanent review of a place for his sister Jolene, James can set the VOB states to 'continue.' James can set it to disappear if review is for a place that is a pop-up eatery or a show with a limited run.

In one example, the content associated with the virtual object includes a business card. The business card is for the other entity (e.g., the business card contains business information or data for he other entity) and designated for the recipient user. Users can choose from various styles and designs, or add their own custom object to serve as their business card which shows their branding.

In another example, the virtual object includes an electronic or digital greeting card (e.g., AR greeting cards, electronic greeting cards in augmented and/or virtual reality, etc.). The virtual object can be of a 'card' type object. The content of the greeting card can at least in part specified or designed by the other entity and designated for the recipient user. For example, the other entity can specify, create or design the text, the message, or the audio (track).

The greeting card can include, a template style or design having 3D features or 3D scenes which can be predetermined or preconfigured (e.g., by the system or platform host or by a third party) or designed, configured, specified by the sending entity.

Embodiments of the present disclosure further includes a library of parts, accessories, and skins that enable users to customize VOBs, avatars or other participants of AR environment.

For example, the system (e.g., server 100 of FIG. 1, server 300 of FIG. 3A) can populate or automatically generate or create AR messages/experiences suitable for or adapted to greeting cards or messages. Examples of greeting genres: Holidays, Birthdays, Life Events, Seasonal, Spiritual, Sports Themed, Humor, etc.

Users can give each other VOBs that are or include greeting cards which can render an AR scene that plays out with music, an audible and/or visible text or graphical message, and/or with interactivity (e.g. via gesture or pointing actions). These can include works of art or funny animations, games or jokes or scenes that play out. They can be created by peers, other users, artists, companies, organizations, foundations, or offshore for all kinds of events or reasons for giving a card. AR greeting cards can be exchanged asynchronously. AR or virtual greeting cards can have animated 3D objects and/or 3D scenes which are in some embodiments interactive.

One embodiment of the present disclosure includes AR or VR virtual greeting cards that come in the form of an augmented reality or virtual reality experiences, encapsulated in a virtual object or set of virtual objects, that one user sends or gives to another user, or that one user sends or gives to a group of other users. The recipient can interact with the content of the virtual greeting card object by going into an augmented reality or virtual reality view on their device and interacting with the greeting card content in AR or VR mode. Users or machines can then engage in the experience associated with that virtual, electronic, or AR greeting card, message, or other type of content—for example they can get access to a game or a reward or exclusive content.

Figure 9B:
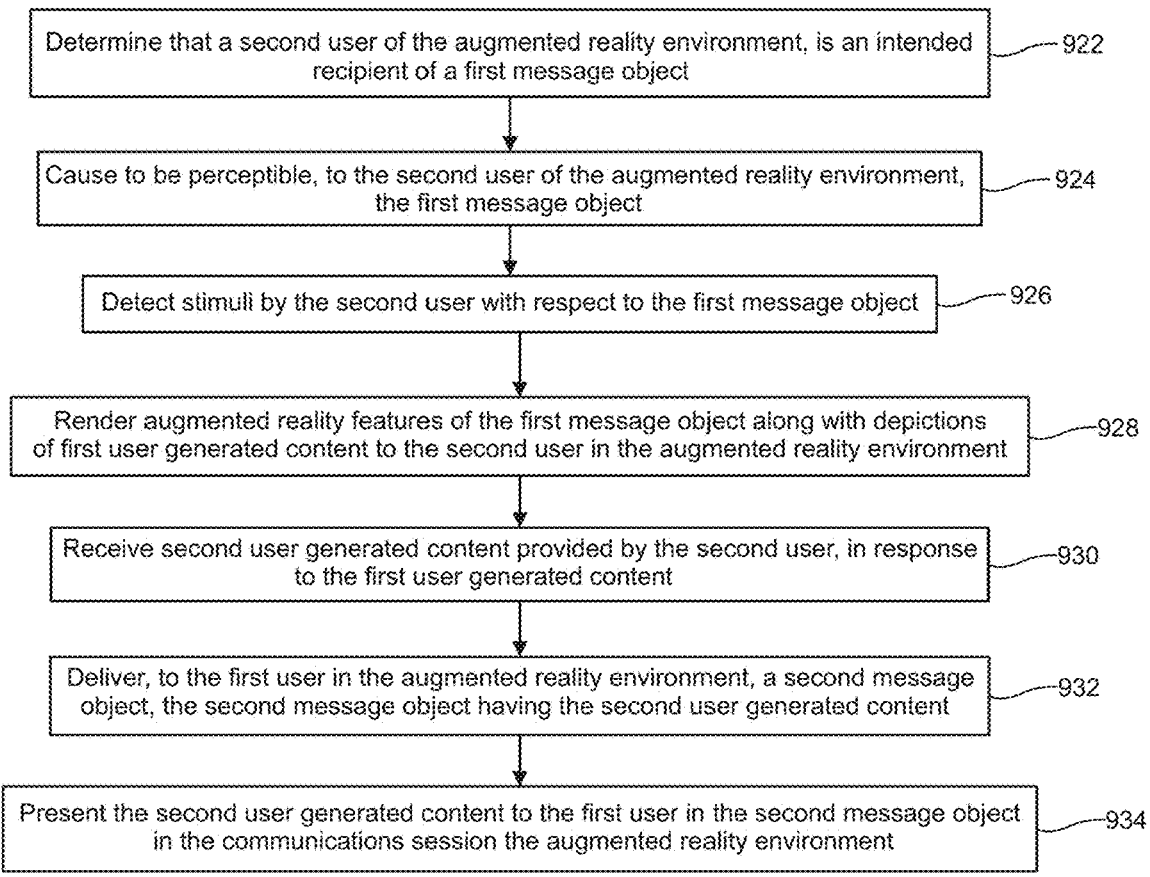
FIG. 9B depicts a flow chart illustrating an example process to facilitate a communications session in a real world environment via an augmented reality environment, in accordance with embodiments of the present disclosure.

FIG. 9B depicts a flow chart illustrating an example process to facilitate a communications session in a real world environment via an augmented reality environment, in accordance with embodiments of the present disclosure.

In process 922, it is determined that a second user of the augmented reality environment, is an intended recipient of a first message object. In process 924, the first message object is caused to be perceptible, to the second user of the augmented reality environment. The first message object is presented or made perceptible to the second user such that the second user can participate in the communications session via the augmented reality environment. Not that there could be additional intended recipients of the first message object.

The first message object can be provided, generated and/or sent by a first user (e.g., individual user, user group, an organization, a corporation, an advertiser, or other entity) to the second user. In general, at least a portion of content associated with the first message object includes first user generated content. The first user generated content can be provided (e.g., input, specified, configured, designed) by a first user. For example, the user generated content can include an encrypted file, a project, a file, a document, a folder, a photo, a photo album, a to do list, a birthday message, a thank you note, a reminder, a note, a video, a conversation, a song, etc. The first user generated content (e.g., user generated content 203 in message object 204 in the example AR environment 200 of FIG. 2A, user generated content 214 in object 212 in the example AR environment 210 of FIG. 2B) can for example, be provided by the first user specifically to be consumed by the second user or a set of users, or any other designated entity.

The second user can participate in the communications session through consuming content embodied in the first message object, interacting with the first message object and/or responding to content in the first message object to communicate with the other participant or participants of the communications session. In process 926, stimuli by the second user with respect to the first message object is detected. The stimuli can include voice, touch, eye, gaze, gesture (body, hand, head, arms, legs, limbs, eyes, torso, etc.), text input and/or other command submitted by the second user with respect to the first message object.

For example, a voice command can be used to input a reply to the first generated content. The reply can also be typed in by text or gestured to specify the text. The reply can also include multimedia content or other attachments. Voice command can also be used to specify attachments or identify other content to be included in the reply to the first message object. The reply can include another VOB or multiple other VOBs including or without other types of content. Any combination of the above inputs can be used to generate second user content in response to the first user generated content.

In a further embodiment, in process 928, augmented reality features of the first message object are rendered along with depictions of first user generated content to the second user in the augmented reality environment. The augmented reality features can include, for example, stickers, GIFs, emoticons, animations, videos, clips, games, objects or scenes rendered in 360 degrees or 3D and/or music, sounds, tones. The augmented reality features can also include one or more of, a performance, an action, a routine rendered or played in 360 degrees or 3D.

In process 930, second user generated content provided by the second user is received, in response to the first user generated content. The second user generated content is to be consumed by the first user and designed, created or generated by the second user. The second user generated content may also have additional intended recipients (users, user groups, organizations, corporations, etc.).

The process 932, a second message object, is delivered, to the first user in the augmented reality environment. The second message object can include the second user generated content (e.g., user generated content 205 in message object 204 in the example AR environment 200 of FIG. 2A). The first message object and/or the second message objects are generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable.

Note that the second message object can be delivered to the first user at a given time. The given time is, in one embodiment, specified by the second user. For example, Bob (e.g., second user) can specify that the recipient Mary (e.g., the first user) receives the second message object at 7 pm on Mary's birthday. In another example, Margaret can specify that the recipient Tom receives the message object each day at 530 pm.

Note that the second message object can be delivered to the first user at a given location in the real world environment and at a specific time or at any time. The given location is, in embodiment specified by the second user. For example, Bob (e.g., second user) can specify that the recipient Mary (e.g., the first user) receives the message object at her front door (the message object may include some roses with a birthday card). In another example, Margaret can specify that the recipient Tom receives the message object at 330 pm each Saturday afternoon near their front door (the message object may include a grocery shopping list).

In process 934, the second user generated content is presented to the first user in the second message object in the communications session the augmented reality environment. Note that the communications session conducted between the first and second users (and potentially other users or groups) in the AR environment, can be asynchronous where the first and second message objects are delivered asynchronously. An asynchronous communication session can include, for example, an email session, an SMS session or an asynchronous chat session, newsgroups, listservs, blogs, a feed, etc. A message object in an asynchronous communication session can include, for example, a post, a blog post, and social media content.

The communications session between the first and second users (and potentially other users or groups) in the AR environment, can also be synchronous or otherwise occurring in real time or near real time. In a synchronous communication, the first and second message objects are delivered synchronously, substantially synchronously, or delivered to the participating parties in real time or near real time. A synchronous communication session that is synchronous can include, a chat room session (may to many, 1-many) or an instance messaging session (1-1), a teleconference (1-1, 1 to many, many to many), video conferencing (1-1, 1 to many, many to many), and/or multi-user-domains, etc.

In one example, the first message object and/or the second message object can include objects with video, voice and/or text, for example, in use in a teleconference or video conferencing session occurring in real time or near real time. For example, the first message object can include a 3D rendering (e.g., a video, or other photorealistic rendering) of the first user or an avatar of the first user with live graphics depicting the first user engaged in a call, conference or video conference with the second user. The first message object can be depicted to the second user while the second user is engaged in such communications session with the first user. The first message object, therefore provides the second user with a simulated experience of a face to face conference with the first user.

Similarly, the second message object can include a 3D rendering (e.g., a video, or other photorealistic rendering) of the second user or an avatar of the second user with live graphics depicting the second user engaged in a call, conference or video conference with the first user. The second message object can be depicted to the first user while the first user is engaged in such communications session with the second user. The second message object, therefore provides the first user with a simulated experience of a face to face conference with the second user.

Figure 10A:
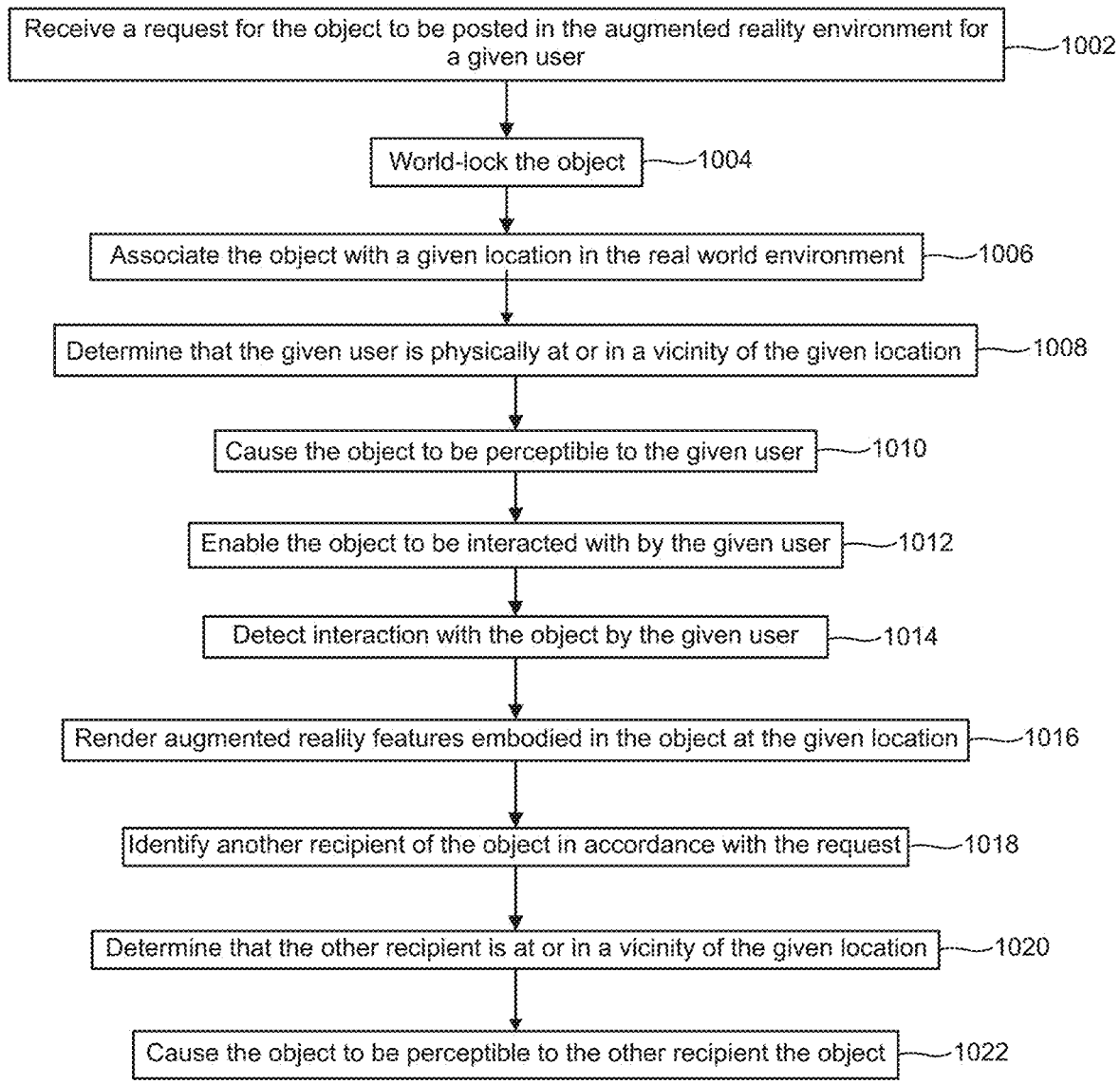
FIG. 10A-10B depict flow charts illustrating example processes of posting virtual objects that are world locked and user locked, in accordance with embodiments of the present disclosure.
Figure 10B:
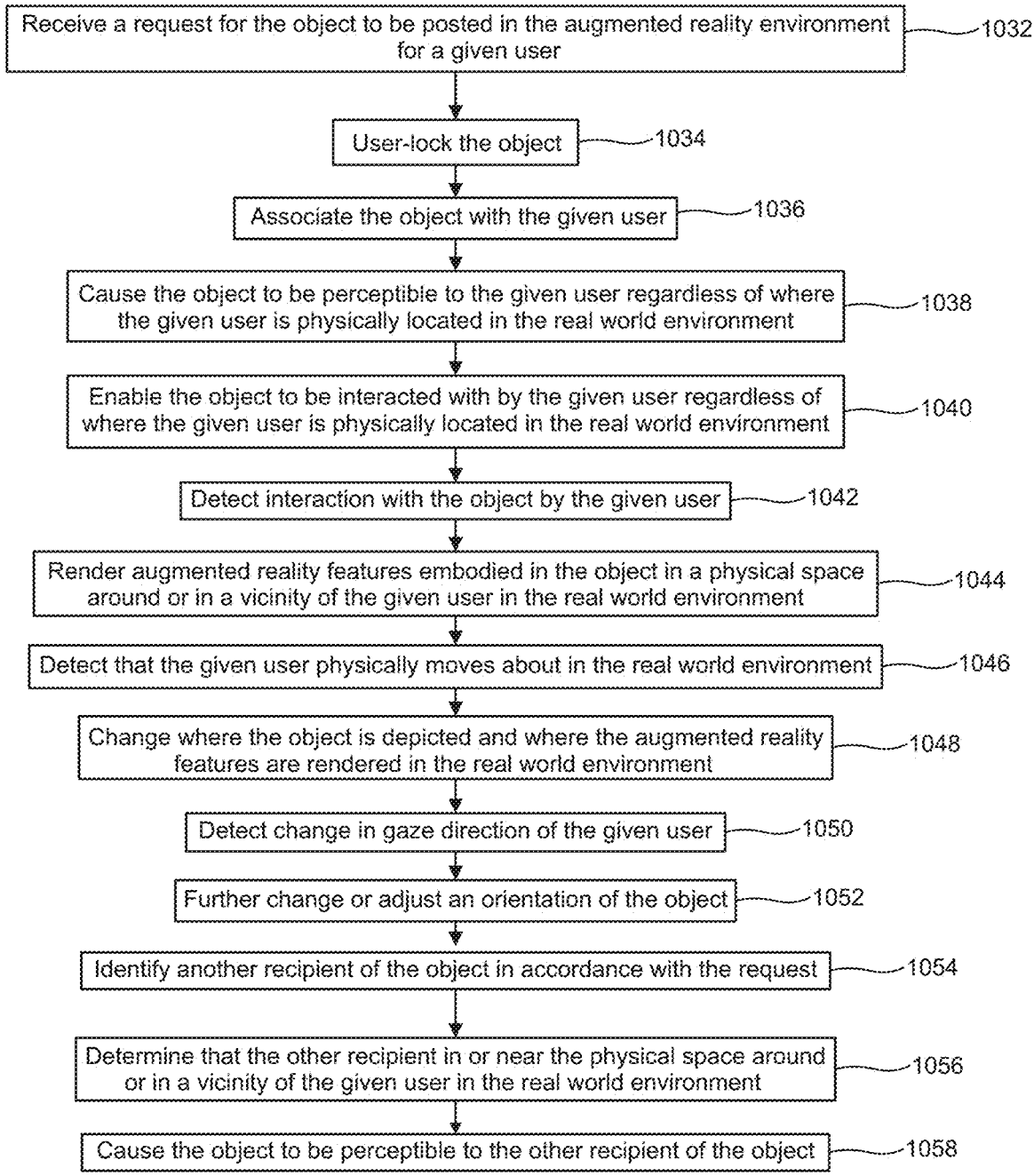

FIG. 10A-10B depict flow charts illustrating example processes of posting virtual objects (e.g., objects or VOBs) that are world locked and/or user locked, in accordance with embodiments of the present disclosure.

In process 1000, a request for the object to be posted in the augmented reality environment for a given user. The object (e.g., VOB) can include a message, a chat, an email, a note, a post, a news item, or any other types of VOBs as disclosed herein. The given user is generally a recipient user which can include multiple recipient users or user groups or organizations or corporations.

In general, in accordance with the request, the virtual object is adjusted to be world locked or user locked by preference of the given user.

In process 1002, the object is world-locked. For example, the VOB can be fixed or locked to a geolocation which can include a place or a region. In process 1006, the object is associated with a given location in the real world environment, in world locking the object. In this manner the VOB can be affixed to or sticky at the physical location to which it is fixed. The VOB can also be fixed to multiple physical locations. For instance, the object can be locked to one or more locations where the recipient(s), friends or larger group can see when they are at those locations.

For example, a virtual object that is a private note can be posted as a world-locked object—for example the VOB can be sent to a user Bob such that it appears in the doorway of their house in a locked position as a sticky note or other type of AR message to Bob. In addition, Bob can get alerted when he is near a place with a private note to him. Private notes can be locked to positions in the world for people so they see them when they are there. They can also be timed to start and end at certain dates and times, or only when certain conditions are met (not on a weekend, when you are about to go grocery shopping, etc.). Other users may be able to see it when in that place, dependent on permissions and other contextual parameters.

There can be further criteria for fixing or associating the VOB with the given location for the given user. The criteria can include a time parameter and/or a context parameter. For example, the time parameter can state that the VOB is to be permanently fixed at the given location or temporarily fixed, and temporarily fixed for how much time, and when, or under what context (e.g. if the user is swimming, if the user is on their way to work, etc.). The context criteria can indicate any activity or circumstance which can cause the VOB to be fixed at the given location.

For example, the VOB (e.g., including a card and a virtual rose) can be configured to be fixed to Mary's living room table for a day each year on Valentine's day. A VOB showing current events and current technology news can be fixed to Roger's kitchen counter top each morning from 7-9 am and each evening from 7 pm-8 pm. A VOB from Mary to Bob reminding Bob to buy milk and eggs is configured to be fixed to the front door each Saturday morning. A VOB with a McDonald's ad can be associated with or fixed to exit 21 off the 280 Freeway permanently for example, In process 1008, it is determined that the given user is physically at or in a vicinity of the given location. In process 1010, the object is caused to be perceptible to the given user, if and when the given user is physically at or in a vicinity of the given location.

In general, the vicinity of the given location can be specified or defined by a location criteria parameter in the request. For example, the vicinity of the given location can include areas within a radius or distance of the given location where the given location is still within a person's field of view. The vicinity can also be defined as a few centimeters, a few meters to hundreds of metres from the given location (e.g., 0.5 m, 1 m, 2 m, 5 m, 5-10 m, up to 50 m, up to 100 m, up to 200 m, up to 500 m, for example . . . ). The vicinity can be system defined (e.g., by the host server 100 of FIG. 1 or host server 300 of FIG. 3A) or defined by the user who created, generated or sent the VOB. The system or sender user or creator user can also redefine or reconfigure the definition of the vicinity.

In addition, in process 1012, the object is enabled to be interacted with by the given user. For example, the given user can interact with the object, if the given user is at or in the vicinity of (e.g., near) the given location, and if the object is still at or near the given location, when the given user is there.

The interaction with the object can be imitated by voice, touch, eye, gaze, gesture (body, hand, head, arms, legs, limbs, eyes, torso, etc.), text input and/or other command submitted by the given user with respect to the object. For example, a voice command can be used to input a reply to the first generated content. The interaction can also be initiated through input text or gestured to specify the text. The interaction can also include a reply to the object where the reply can include multimedia content or other attachments. Voice command can also be used to specify attachments or identify other content to be included in the reply to the object. The reply can include another VOB or multiple other VOBs including or without other types of content. Any combination of the above input can be used to interact with and/or respond to the object.

As such, in process 1014, interaction with the object by the given user is detected. In process 1016, augmented reality features embodied in the object can be rendered at the given location, for example, in response to the interaction with the object. The augmented reality features can include, by way of example, not limitation, stickers, GIFs, emoticons, animations, videos, clips, games, objects or scenes rendered in 360 degrees or 3D and/or music, sounds, tones.

Note that the given user is one example of a recipient of the object. The object can have additional recipients where the object can be associated with or affixed to different locations for different recipients. The object can also be associated with or affixed to the same given location for some of the recipients and different for others.

In process 1018, another recipient of the object is identified in accordance with the request. In process 1020, it is determined that the other recipient is at or in a vicinity of the given location. Alternatively, for the other recipient, the object may be fixed or associated with a different location that the location for the given user.

In process 1022, the object is caused to be perceptible to the other recipient, for example, when the other recipient is at or near the given location (e.g. or another applicable location as specified by the object, object metadata and/or the request), and if the object is still associated with or affixed to the given location (or another location) when the other recipient is there.

In another example, in process 1034, a request for the object to be posted in the augmented reality environment for a given user is received. In general, in accordance with the request, the virtual object is adjusted to be world locked or user locked by preference of the given user. In process 1036, the object is user-locked.

In user locking the object, the object is placed in relative to the user's location or the object can be wherever the user is. In process 1038, the object is caused to be perceptible to the given user regardless of where the given user is physically located in the real world environment. For example, users and groups can share objects (e.g., objects as messages) that appear around a user wherever the user is and when the user is physically travelling in any direction or moving around.

In process 1040, the object is enabled to be interacted with by the given user regardless of where the given user is physically located in the real world environment. Interaction with the object by the given user is detected, in process 1042.

For example, a VOB from Mary to Bob reminding Bob to pick up the kids is configured to pop up each week day when Bob is driving home. Bob can also respond to the VOB while Bob is in his car (ie at a stop light) or walking around to communicate with Steve the son and/or Mary to determine where to pick Steve up. Steve's location updates can also be sent automatically to Bob via the VOB. The VOB can send a message (or another VOB) to Mary once son Steve has been picked up.

In process 1044, augmented reality features embodied in the object are rendered in a physical space around or in a vicinity of the given user in the real world environment, in response to detection of interaction with the object by the given user. The interaction with the object can be imitated by voice, touch, eye, gaze, gesture (body, hand, head, arms, legs, limbs, eyes, torso, etc.), text input and/or other command submitted by the given user with respect to the object. For example, a voice command can be used to input a reply to the first generated content. The interaction can also be initiated through input text, or gestured to specify the text. The interaction can also include a reply to the object where the reply can include multimedia content or other attachments. Voice command can also be used to specify attachments or identify other content to be included in the reply to the object. The reply can include another VOB or multiple other VOBs including or without other types of content. Any combination of the above input can be used to interact with and/or respond to the object.

In process 1046, it is detected that the given user physically moves about in the real world environment. In process 1048, it is changed, where the object is depicted and where the augmented reality features are rendered in the real world environment.

The augmented reality features can include, for example, stickers, GIFs, emoticons, animations, videos, clips, games, objects or scenes rendered in 360 degrees or 3D and/or music, sounds, tones. the augmented reality features can also include one or more of, a performance, an action, a routine rendered or played in 360 degrees or 3D.

In process 1050, change in gaze direction of the given user is detected. In process 1052, an orientation of the object is changed or adjusted. For example, the orientation of the object can be changed or adjusted to maintain a substantially constant relative orientation with respect to the gaze direction.

In one embodiment, at least part of the physical space around or in the vicinity of the given user in the real world environment is designated as an inbox of the given user in the augmented reality environment. The object can be depicted and rendered in the inbox of the given user. In one embodiment, in a user's inbox there can be objects that are for sale or that enable them to buy things. The inbox can include the space around a user. For example, the inbox can be indicated as a bubble around a user that is generally positioned or oriented relative to user's frame or location wherever they are and wherever they look.

In process 1054, another recipient of the object is identified in accordance with the request. In process 1056, it is determined that the other recipient in or near the physical space around or in a vicinity of the given user in the real world environment. In process 1058, the object is caused to be perceptible to the other recipient of the object.

For example, the object can be shared with additional users in the augmented reality environment. In one embodiment, the object can be published to a profile of the given user in the augmented reality environment and shown in or near the physical space around the given user. The object or other information published to the profile of the user can be visible to connections of the user in the AR environment. For example, the object in the profile can be perceptible by followers, friends or other connections of the given user. In some instances, the object in the profile of the given user can be interacted with or acted on by the followers' friends or other connections in the AR environment.

In another example, when Tom, a recipient user receives a VOB like a cool sticker (e.g., which can AR features including interactive features), Tom can to publish it to his profile so his followers see it in his profile and/or around him in physical space. Tom can also choose not to publish it. From Tom's profile, other users can share the object that Tom posted. For example, there can be viral objects that pass from person to person and may or may not be published or shared more broadly and/or in accordance to certain criteria or permissions.

In some embodiments, users can obtain or request VOBs and stickers from the system or other people who have them. For example, if Tom's VOB in his profile is visible to other users but other users cannot collect or share them, the other users can obtain Tom's permission to do so. For example, if a user Jane shows something in their profile or halo/cloud around Jane, that another user Jerry is searching for or desires, Jerry may have to request it. Jerry then can give, gift or transfer the item to another. It may transfer automatically from Jerry to another user or from Jane to Jerry.

Embodiments of the present disclosure include social game such as putting things in each other's houses or workspaces—for example, little surprises or easter eggs for your friends. James can go into their front yard and find an Easter egg for them on Easter weekend with a surprise message depicted when he interacts with it. A user can put virtual flowers with a real box of chocolates for his girlfriend.

Figure 11:
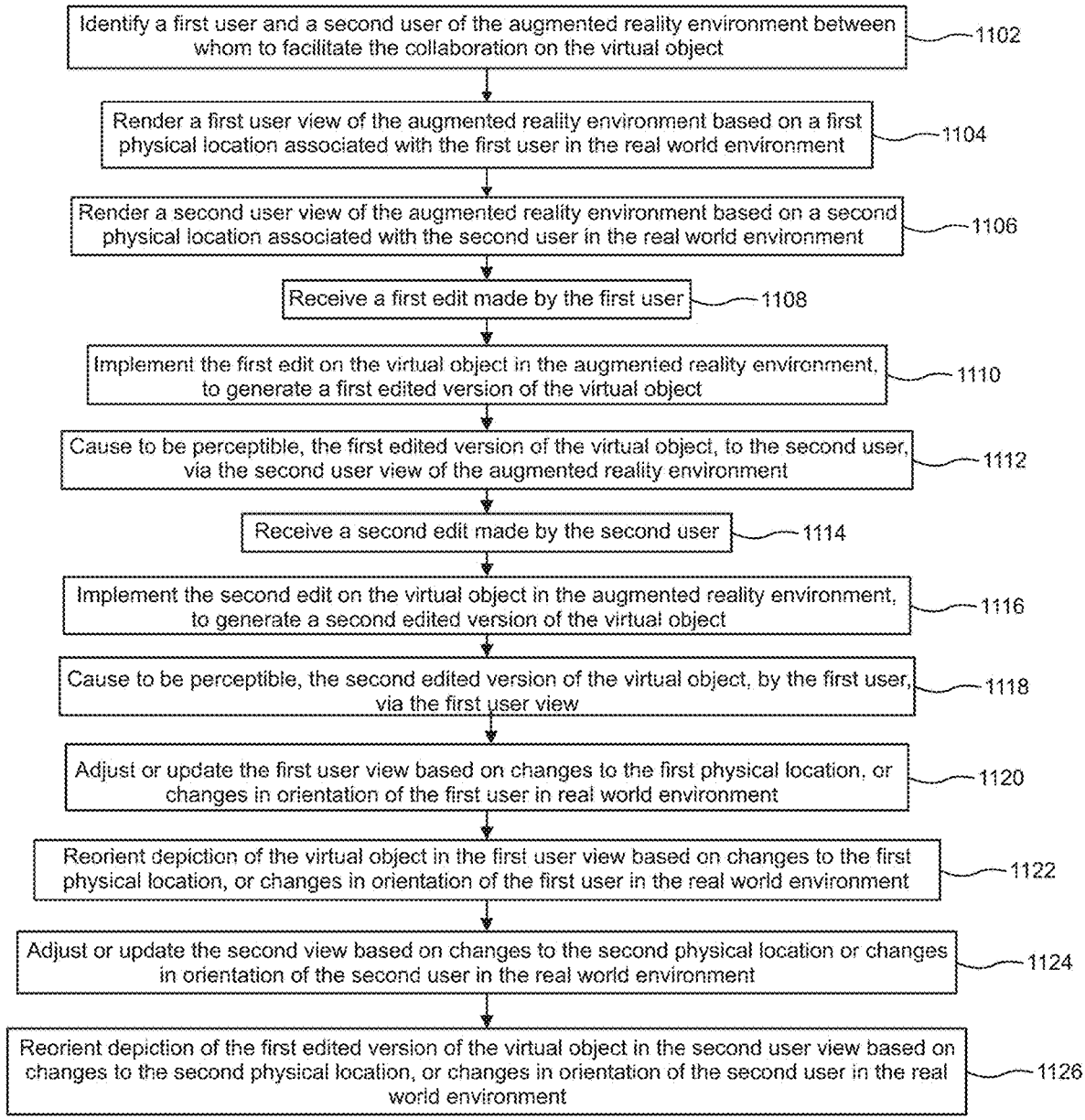
FIG. 11 depicts a flow chart illustrating an example process to facilitate collaboration in an augmented reality environment through a virtual object, in accordance with embodiments of the present disclosure.

FIG. 11 depicts a flow chart illustrating an example process to facilitate collaboration in an augmented reality environment through a virtual object (VOB), in accordance with embodiments of the present disclosure.

In process 1102, a first user and a second user of the augmented reality environment between whom to facilitate the collaboration on the virtual object are identified. The first user can include an individual user, a user group having multiple users, an organization or corporation. The second user can also be an individual user, a user group having multiple users, an organization or corporation.

The virtual object can be, for example, a collaborative project (e.g., art, music, architecture, other collaborative or social activity, etc.) constructed in collaboration by the first user and the second user (e.g., an architectural blue print object 222 shown in the example AR environment 220 of FIG. 2C). The virtual object can include, one or more of, a virtual painting, a virtual sculpture, a virtual castle, a virtual snowman, a virtual music piece, a virtual tennis racket, virtual ball, etc. The virtual object can also represent, one or more of, a virtual text book, a virtual novel, a virtual pen, a virtual note pad, a virtual blackboard, a blueprint, a virtual painting, a virtual sculpture, a virtual puzzle, a virtual crossword puzzle, a virtual marker, a virtual exam, a virtual exam problem, a virtual home work, a virtual homework problem, a virtual circuit board, a virtual telescope, a virtual instrument, virtual Lego, virtual building blocks.

The augmented reality environment can also include a collaborative learning environment. The virtual object facilitates learning by the first user and teaching by the second user. The virtual object can alternatively facilitate learning by the first user and learning by the second user.

In one example, the collaboration can be initiated by the first user who invites the second user, or vice versa. For example, a first teacher user Albert can initiate a blackboard session to teach Newtons law and invites his student Ana, the second user to join the collaboration session via the AR environment. The collaboration session can thus begin, at a prescribed or predetermined time (e.g., at class start time), when Ana is invited, and/or when Ana accepts the invitation.

Note that the second user can include a group of students including Ana, experiencing Albert's via the same view of the AR environment. The group of students may jointly participate in the same session. There may be additional student users participating in Albert's physics class via distinct sessions occurring simultaneously and rendered through views of the AR environment distinct from Ana's view.

In this example, the VOB can be a virtual apple where teacher Albert illustrates the effect of gravity. The student user Ana can also interact with the virtual apple to visualize the effect of gravity. Albert and Ana can generally participate in the collaborative learning environment simultaneously, in real time or near real time, such that Ana can observe the effect on the VOB based on Albert's interaction with it, and Albert can observe Ana's interactions with Newton's apple. The AR environment can be configured to simulate a gravitational field of the Earth and also of no gravity or gravity-less environment so students can visualize the effect of gravity on Newton's apple via the VOB or other items.

Note that in general, the participants of the AR-enabled collaborative session may or may not be co-located in the same physical location or area. For example, teacher user Albert may be teaching from the school classroom and Ana may be a home-schooled student. There may be additional students (e.g., students Thomas and Edison) participating in the same session in the same physical school classroom where teacher Albert is teaching. The students participating from the same physical class room can share the same AR session, or some can have distinct AR sessions with distinct views.

In process 1104, a first user view of the augmented reality environment is rendered based on a first physical location associated with the first user in the real world environment, In process 1106, a second user view of the augmented reality environment is rendered based on a second physical location associated with the second user in the real world environment. For example, teacher Albert's view (e.g., first user view) of the AR collaboration session (e.g., teaching session) can be rendered based on the physical school class room and student Ana's view (e.g., second user view) of the AR collaboration session (e.g., learning session) can be rendered based on Ana's home.

A first edit made by the first user is received, in process 1108. The edit function of the virtual object can be accessible by the first user via a first user view of augmented reality environment. The edit function, for example can be used to change an appearance of the virtual object. The edit function can also be used to manipulate, move or interact with the virtual object.

The first edit is implemented on the virtual object in the augmented reality environment, to generate a first edited version of the virtual object, in process 1110. The first edited version of the virtual object, is caused to be perceptible, to the second user, via the second user view of the augmented reality environment, in process 1112.

For example, teacher Albert (e.g., first user) can edit the VOB by dropping the virtual apple in a gravity field through his view (first user view) of the AR environment. Student Ana (e.g., second user) can observe the outcome of the virtual apple being dropped in a gravity field through her view (second user view) of the AR environment. The collaboration session is generally a synchronous one or a substantially synchronous one (e.g., factoring in any applicable network related delays) such that Ana through her view can observe the edit or operation made on the VOB by the teacher user Albert. Ana can also immediate witness the effect of the edit, manipulation or other operation on the VOB, made by the teacher user Albert.

A second edit made by the second user (e.g., student Ana) is received, in process 1114. The edit function is accessible by the second user in the second user view of augmented reality environment. The edit function can be used to change an appearance of the VOB, to manipulate it, move it about, interact with it or otherwise operate on it. The second edit is implemented on the virtual object in the augmented reality environment, to generate a second edited version of the virtual object, in process 1116. The second edited version of the virtual object is caused to be perceptible, to the first user, via the first user view, in process 1118.

For example, student Ana (e.g., second user) can pick the virtual apple up after it was dropped by the first user teacher Albert in the gravity field. Student Anna can toss the virtual apple ball up in the air and see what happens to it via the AR-enabled collaborative environment through her view (second user view). Teacher Albert can observe the same manipulation and the effect of such manipulation on the virtual apple through his view (first user view).

In addition, the second edited version of the virtual object, can be caused to be perceptible, to a third user, via a third user view of the augmented reality environment. For example, student Thomas can observe what happens to the virtual apple after Ana tosses it up in the air through his view (third user view) of the AR enabled collaborative environment. Student Edison, being in the same physical classroom as student Thomas can observe the same effect from Ana's operation of the virtual apple, via either Thomas's view (e.g., the third user view, through a same device, ie shared screen, projection device, hologram) or through his own view (e.g., a fourth user view, ie, through a distinct device, such as another laptop, an eye piece, his headmounted device, a mobile phone, etc.).

Note that the augmented reality environment generally depicts the virtual object amongst elements physically present in the real world environment. The first user view is adjusted or updated based on changes to the first physical location, or changes in orientation of the first user in the real world environment, in process 1120. Depiction of the virtual object is reoriented in the first user view based on changes to the first physical location, or changes in orientation of the first user in the real world environment, in process 1122. For example, teacher Albert's AR environment view (first user view) can include renderings of things or people in the physical classroom and is adjusted as Albert moves around. The virtual apple can also be moved or reoriented as Albert moves around in his physical environment (the physical classroom).

Similarly, the second view is adjusted or updated based on changes to the second physical location or changes in orientation of the second user in the real world environment, in process 1124. Depiction of the first edited version of the virtual object is reoriented in the second user view based on changes to the second physical location and/or changes in orientation of the second user in the real world environment, in process 1126.

For example, student Ana's view can include renderings (e.g., photo realistic renderings) of things or people in Ana's room or house or study. The renderings can be adjusted as Ana moves around. The virtual apple can also be moved or reoriented as Ana moves around in her physical environment (the home or study).

In one embodiment, the first user view and the second user view are rendered to include at least some shared perceptible elements of the real world environment responsive to determining that the first user and second user are physically co-located in the real world environment. For example, teacher Albert and student Thomas are co-located in the physical classroom. Albert's view of the AR environment and Thomas's view of the AR environment may include some shared elements in the physical class room (e.g., a desk and/or a chair). Depending on Albert's location and Thomas's location in the physical classroom, the perspective of the desk or the chair may be different in their views of the AR environment of the collaboration environment. There may be certain elements of the physical space that are rendered in Albert's AR view that are not rendered in Thomas's and vice versa.

In one example, the first user and second user can be physically co-located if and when at least part of a field of view of the first user and a field of view of the second user at least partially overlaps. In addition, the virtual object and implementation of the first edit on the virtual object by the first user to generate the first edited version of the virtual object is accessible by the second user through the second user view of the augmented reality environment, Therefore, in the situation that the first user and second user are physically co-located in the real world environment, a position or orientation of the first edited version of the virtual object in the second user view can be adjusted (e.g., automatically) in response to completion of the implementation of the first edit on the virtual object and/or detection of a share request of the virtual object with the second user, initiated by the first user.

For example, when teacher Albert is editing the virtual apple (e.g., writes on the virtual apple or draws a face on the apple), the student Edison, being also in the physical classroom sees Albert drawing on the virtual apple through his view (but does not see what Albert writes on it). When Albert is finished editing the virtual apple (ie finishes writing or drawing on it) the virtual apple can be rotated or reoriented such that the written portion of the virtual apple is now facing Edison in Edison's view of the AR enabled collaborative environment. The system can reorient the virtual apple when it detects that Albert has finished editing it. The system can also reorient or reposition the virtual apple (e.g., such that it is facing Edison or appears closer to Edison in the AR environment) if Albert triggers a share request of the virtual apple.

For first and second users who are not physically co-located in the real world environment, their views generally will not include renderings of same physical elements, as in the case of teacher Albert and student Ana. In one embodiment responsive to determining that the first user and the second user are not physically co-located in the real world environment, the first user view is rendered to include first real elements of the first physical location and the second user view is rendered to include second real elements of the second physical location. The first real elements are generally distinct from the second real elements. Similarly, the first edited version of the virtual object is made perceptible in the second user view in response to: completion of the implementation of the first edit on the virtual object and/or detection of a share request of the virtual object with the second user, initiated by the first user.

As such the collaborative shared experience when people are near each other (co-located) can be different than the experience when they are remote (not co-located). Note that when two users are near each other in or near the same place indicators of both users can be depicted in the AR environment. In one embodiment, for close proximity (e.g., co-located user), user interaction can be achieved when 1) user can see distance in km of friends next to their friends' name on the friends list. 2) users can see friends on map (this feature could be disabled in settings). If user taps on friend icon on map, and they were close enough to them, they could activate AR mode and then search for them using a GPS arrow. Embodiments of the present disclosure include social togetherness enabled by the augmented reality environment. Social togetherness can include, for example, giving each other objects, exploring each other's space in an augmented reality world, etc.

In one embodiment, when Sam gives Rob a VOB (e.g., a message object) and is near or co-located with Rob, they both see the message object—Sam gives it to Rob and it moves from Sam to Rob, or at least Sam sees it appear near Rob. Then Sam can see Rob's response or response objects, and then Sam's response objects to Rob's response—the message thread can be a message thread object in space that users share and see when users are near each other (e.g., like a channel between Sam and Rob), versus two separate personal layer objects that Sam and Rob each only see privately. This is another way that users can build something together in a place through an AR environment.

In a further example, Rob and Sam build an object together (e.g., a virtual airplane) in a collaborative AR environment, e.g., in a Friendship layer (a group of 2 or more). Rob or Sam, or another member of the thread can share the object with other groups, or with the public. The object can exist on more than one layer at the same time for example.

Figure 12A:
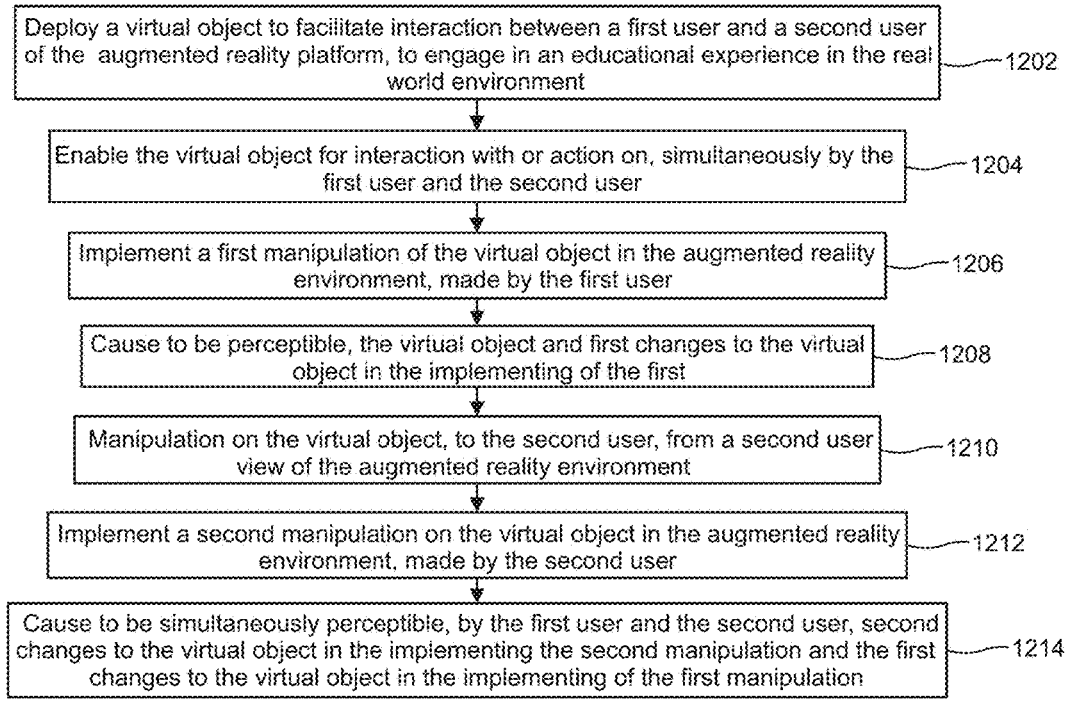
FIG. 12A depicts a flow chart illustrating an example process to provide an educational experience via an augmented reality environment, in accordance with embodiments of the present disclosure.

FIG. 12A depicts a flow chart illustrating an example process to provide an educational experience via an augmented reality environment, in accordance with embodiments of the present disclosure.

A virtual object is deployed to facilitate interaction between a first user and a second user of the augmented reality platform, to engage in an educational experience in the real world environment, in process 1202. The virtual object represents, one or more of, a virtual text book, a virtual novel, a virtual pen, a virtual note pad, a virtual blackboard, a blueprint, a virtual painting, a virtual sculpture, a virtual puzzle, a virtual crossword puzzle, a virtual marker, a virtual exam, a virtual exam problem, a virtual homework, a virtual homework problem. The virtual object can also represent, one or more of, a virtual circuit board, a virtual telescope, a virtual instrument, virtual Lego, virtual building blocks.

The virtual object is enabled for interaction with or action on, simultaneously by the first user and the second user, in process 1204. For example, two uses, Lana and Susan can simultaneously, via their own devices, or via a shared device, work on an architectural blue print (e.g., 3d virtual blue print 222 of the example AR environment 220 of FIG. 2C). Lana and Susan, can be remote from each other (e.g, not co-located) and their edits, manipulation, other operations and their effects can be made simultaneously on the virtual object and be presented to one another.

As such, in one embodiment a first manipulation (e.g., draw, paint, erase, etc.) of the virtual object (e.g., the virtual 3d blue print) is implemented in the augmented reality environment, in process 1206. The first manipulation is made by or initiated by the first user (e.g., Lana). The virtual object (e.g., the virtual 3d blue print) and first changes to the virtual object in the implementing of the first manipulation on the virtual object, are caused to be perceptible, to the second user (e.g. Susan), from a second user view of the augmented reality environment, in process 1208.

There can be multiple project collaborators. For example, another user Jim can collaborate on the virtual blueprint as a VOB with Lana and Susan. As such, the virtual object and the first changes to the virtual object (e.g., the virtual 3d blue print) in the implementing of the first manipulation (e.g., draw, paint, erase, etc.) on the virtual object, can also be made perceptible, to a third user (Jim), from a third user view of the augmented reality environment.

Susan can also make changes to the virtual blueprint in the collaboration. Susan can make the changes or manipulate the virtual blueprint simultaneously with Lana. As such, in one embodiment, at least a part of the second manipulation made by the second user, is implemented on the virtual object simultaneously in time, with the implementing of the first manipulation of the virtual object, made by the first user. The effect on the VOB of the simultaneous operation and the performing or initiation of the operations themselves can also be depicted or rendered to Susan and Lana to provide a real time or near real time collaborative AR experience.

As such, a second manipulation (e.g., made by the second user) of the virtual object is implemented in the augmented reality environment, in process 1210. Second changes to the virtual object in the implementing the second manipulation and the first changes to the virtual object in the implementing of the first manipulation, are caused to be simultaneously perceptible, to the first user and the second user, in process 1212.

One embodiment further includes, further causing to be simultaneously perceptible, to the first user, second user and the third user, the second changes to the virtual object in the implementing the second manipulation and the first changes to the virtual object in the implementing of the first manipulation, via the third user view of the augmented reality environment. In one embodiment, the first user view and the second user view are rendered to include at least some shared perceptible elements of the real world environment responsive to determining that the first user and second user are physically co-located in the real world environment.

In an alternative embodiment, it is determined that the first user and the second user are not physically co-located in the real world environment. The first user view of the augmented reality environment is rendered based on a first physical location associated with the first user in the real world environment. The first user view includes first real elements of the first physical location.

The virtual object can be rendered in the first user view among the first real elements. A first perspective of the virtual object can be adjusted in the first user view based changes in position or orientation of the first user in the first location.

Similarly, the second user view of the augmented reality environment can be based on a second physical location associated with the second user in the real world environment. The second user view can include, for example, second real elements of the second physical location. Where the first and second users are not physically co-located, the first real elements are generally distinct from the second real elements. The virtual object can be rendered in the second user view among the second real elements. Moreover a second perspective of the virtual object can be rendered in the second user view based on changes in position or orientation of the second user in the second location.

Figure 12B:
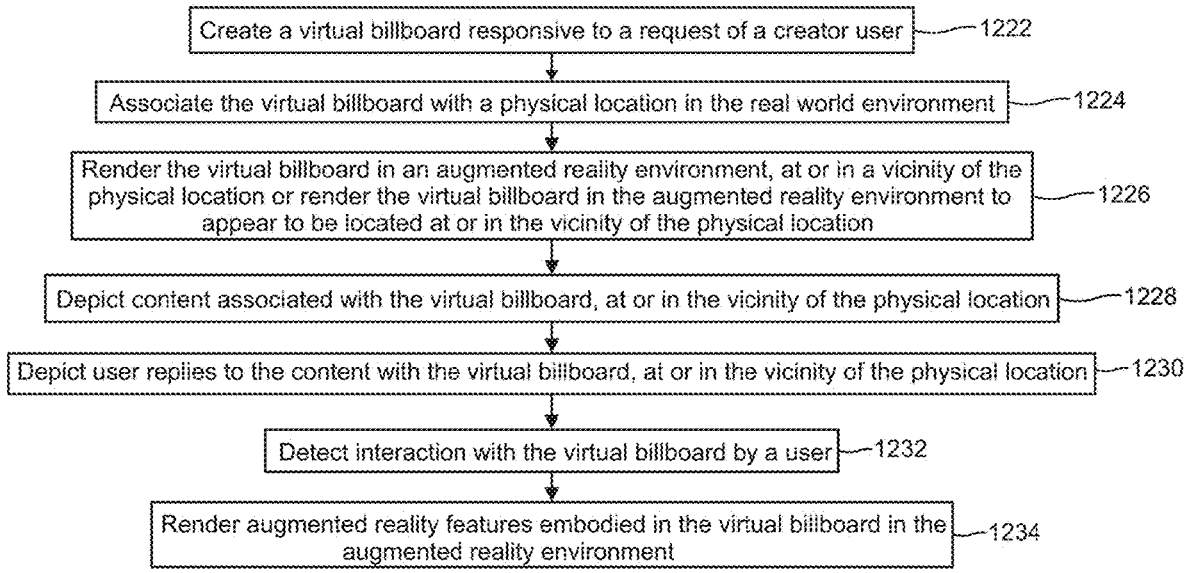
FIG. 12B depicts a flow chart illustrating an example process to facilitate interaction with a virtual billboard associated with a physical location, in accordance with embodiments of the present disclosure.

FIG. 12B depicts a flow chart illustrating an example process to facilitate interaction with a virtual billboard associated with a physical location, in accordance with embodiments of the present disclosure.

The virtual billboard can include one or more of, a note, a review, an offer, an ad, a promotion. A virtual billboard object can be a seed for threaded discussions or interactions. In general, virtual billboards can be placed in space, pinned to a user or a moveable object, or can be pinned to a physical surface at a physical location.

For example, an entity (user, organization, user group, corporation, etc.) can place a virtual billboard at a physical location. The billboard can, for example, depict a finite headline (for example 140 characters, or less, or more) with customizable formatting and background and color settings etc. Other users can then reply to this with comments, likes, or attaching other objects to it. The replies can appear in a thread under or around the virtual billboard. The replies can also be collapsed or expanded.

In one embodiment, when the replies are expanded, they can appear in physical space as a 2D or 3D thread or cloud of related content to the virtual billboard. The replies can also appear on a virtual billboard detail page as a thread of messages or responses. Users can see whether a billboard object has responses or is popular before they interact with the object—, for example by a badge that provides a popularity score, or via visual effects like pulsation or glow or clouds of content objects that indicate the popularity and/or activity level of the billboard.

In one embodiment, a virtual billboard is created responsive to a request of a creator user (as shown in the example flows of FIG. 6A-FIG. 6B), in process 1222. In general, the physical location with which the virtual billboard is associated is specified in the request of the creator user. The creator user can be an individual user, a user group, an entity, an organization, a corporation, etc. The creator user can also designate or specify the design, form shape, animation, behavior and/or content of the virtual billboard. The virtual billboard can be configured have, for example, a glow, a vibration movement, a pulsating movement, a halo, a cloud, a frame, an outline of the billboard, a color, changing colors, background sounds or music, a tone, text showing an object exists, an animation, etc. Template or default shapes forms and/or behaviors can also be utilized or drawn upon.

The virtual billboard is associated (e.g., by server 100 of FIG. 1, server 300 of FIG. 3A) with a physical location in the real world environment, in process 1224. In being associated with the physical location, the virtual billboard (e.g., as shown in the examples of FIG. 7-FIG. 8) can be rendered in an augmented reality environment, at or in a vicinity of the physical location or render the virtual billboard in the augmented reality environment to appear to be located at or in the vicinity of the physical location, in process 1226.

In addition, content associated with the virtual billboard, is depicted at or in the vicinity of the physical location, in process 1228. For example, a virtual billboard can be posted near Rose wines on sale at the end of the summer season and be created by the stock manager (e.g., creator user). The stock manager can design the virtual billboard either from scratch or using a system provided template. The stock manager can specify the details of the sale for the Rose wines, in the content associated with the virtual billboard. For example, 20% off all Rose wines. The virtual billboard can be set to be active for the month of September, for example. The virtual billboard can also be set to activate each year during the month of September. The stock manager can additionally configure the virtual billboard to take on certain special behavior during certain times of the day, for example, from 6-8 pm during their busy wine shopping hours.

In addition, users may be able to interact with the virtual billboard. The interaction with the object can be initiated by voice, touch, eye, gaze, gesture (body, hand, head, arms, legs, limbs, eyes, torso, etc.), text input and/or other command submitted by the given user with respect to the object. For example, a voice command can be used to input a reply to the first generated content. The interaction can also be initiated through input text or gestured to specify the text. The interaction can also include a reply to the object where the reply can include emoticon, GIFs, stickers, multimedia content or other attachments. Voice command can also be used to specify attachments or identify other content to be included in the reply to the object. The reply can include another VOB or multiple other VOBs including or without other types of content. Any combination of the above input can be used to interact with and/or respond to the object.

For example, users (e.g., wine critic, the wine producer, other wine producers, corporate wine buyers, shoppers, or other store staff) can interact with the virtual billboard and comment or react to the virtual billboard. Users can like the billboard, comment on the sale, ask questions (how long is the sale for?), comment on the wine. Such user feedback and queries can be posted with the virtual billboard for others to see or the respond to. For example, the store manager can reply using the virtual billboard to a user that the sale is going on for a month. Wine critics can provide tasting notes and wine ratings. A shopper may be able to respond directly to another user's feedback and ask a question of that user. For example, Bob the buyer can respond to Sue's tasting notes of 'floral and crisp' and ask Sue what she paired the wine with. Depending on the status of Sue, Bob may receive a response from Sue in real time or near real time. Responses to individual comments can be private or public. Other users can post their reviews, etc. User feedback can be managed or moderated by the creator user.

As such, in one embodiment, user replies or user feedback to the content with the virtual billboard, can be depicted at or in the vicinity of the physical location, in process 1230. Interaction with the virtual billboard by a user is detected, in process 1232. Augmented reality features embodied in the virtual billboard can be rendered in the augmented reality environment, in process 1234. The augmented reality features can include, for example the user replies or user comments, depicted as a 3D thread associated with the virtual billboard. The augmented reality features can also include, for example, stickers, GIFs, emoticons, animations, videos, clips, games, objects or scenes rendered in 360 degrees or 3D and/or music, sounds, tones. The augmented reality features can also include one or more of, a performance, an action, a routine rendered or played in 360 degrees or 3D.

In one embodiment, the virtual billboard is world-locked. In world locking the virtual billboard, the virtual billboard is associated with the physical location in the real world environment (e.g., fixed to the physical location). As such he virtual billboard is perceptible to a user, if and when the given user is physically at or in a vicinity of the physical location. In addition, the virtual billboard is enabled to be interacted with by the user if and when the user is at or in a vicinity of the physical location.

For example, the virtual billboard for the Rose sale can be affixed to the location of the shelf where the Rose wines are kept in the wine store, and users (e.g., shoppers or store staff) can see and interact with the virtual billboard when they are near the Rose wine shelf.

In a further embodiment, the virtual billboard is user-locked and the physical location with which the virtual billboard is associated, includes a physical space around a user. The physical space around the user is moveable with movement of the user in the real world environment. As such, in user-locking the virtual billboard, the virtual billboard is rendered in the augmented reality environment to move with or appear to move with the user in the augmented reality environment.

For example, the virtual billboard for the Rose sale can be user-locked to a store manager or wine department manager on staff at a given time. The virtual billboard can also be user locked to different members of the staff during different times of the day. In this manner, shopper users see the virtual billboard and can access the details of the sale, of the wine, or other user comments/feedback if and when they are near the staff member with whom the virtual billboard is user locked.

The user locked virtual bill board moves around in the real world environment as the user with whom it is locked to, moves around. For example, the virtual billboard can be user locked to Joe the afternoon store manager. As Joe moves around in the store, stock room, to the Rose shelf, or to a different wine shelf, or to the cashier, the virtual billboard moves with Joe around the physical store.

As such, the system (server 100 of FIG. 1, server 300 of FIG. 3A) detects the movement of the user in the real world environment and identifies changes in location of the physical space around the user due to the movement of the user in the real world environment. The virtual billboard can then be rendered to move in the augmented reality environment in accordance with the changes in location of the physical space around the user such that the virtual billboard moves with or appears to move with the user in the augmented reality environment.

Figure 13A:
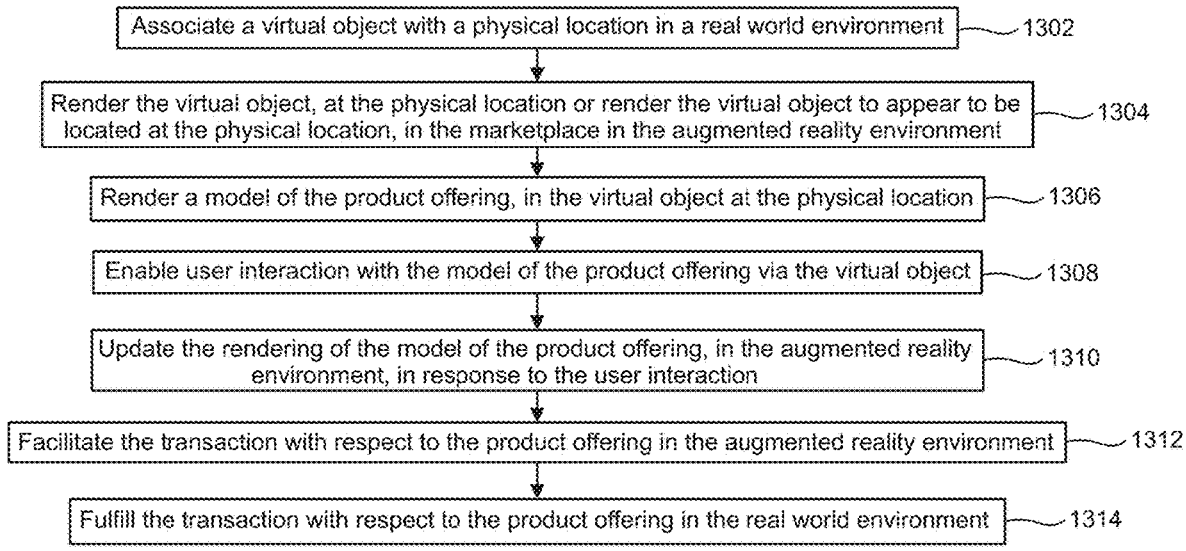
FIG. 13A depicts a flow chart illustrating an example process to administer a marketplace having multiple seller entities via an augmented reality environment, in accordance with embodiments of the present disclosure.

FIG. 13A depicts a flow chart illustrating an example process to administer a marketplace having multiple seller entities via an augmented reality environment, in accordance with embodiments of the present disclosure.

The system (e.g., server 100 of FIG. 1, server 300 of FIG. 3A) can enable virtual objects (VOBs) to be put in a physical place that a user can buy or that cause something to be bought. The object or virtual object is generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable.

The marketplace, or a store can be world locked (e.g., at a physical location). The marketplace or store can also be user locked (e.g., positioned in the real world environment in relation to a user. For example, in a user's inbox in the AR environment or in a user's view of the AR environment, there can be a visualization in the user's view which depicts or presents virtual objects that are for sale or that enable them to buy things.

Individual seller users, retailers, manufacturers, e-commerce platforms, third party entities (e.g., Amazon, JET, Costco, Trader Joe's or other online markets), the disclosed system (e.g., server 100 of FIG. 1, server 300 of FIG. 3A) can also cause product VOBs to appear in the marketplace in the AR environment for users to buy. Users can perceive the VOBs that can be purchased, for example, when the user is at a given physical location (with which the VOB is associated, whether the VOB is world locked or user locked. Users can perceive the VOBs that can be purchased, for example, if any applicable contextual triggers are detected.

To begin the process, a virtual object representing a product offering (e.g., offerings 232 and 236 as shown in the example marketplace 230 of FIG. 2D) having real-world utility is associated with a physical location in a real world environment, in process 1302. Asset holders, asset creators, intermediaries, agents for others (e.g., individual users, brokers, agents, companies, retailers, manufacturers, distributors, third party e-commerce retailers/platforms, third party marketplaces, etc.) can enter or submit assets into the system (e.g., server 100 of FIG. 1, server 300 of FIG. 3A) as VOBs to be transacted on or marketed in the marketplace (e.g. example market place 230 of FIG. 2D).

The virtual object includes product offering information having product metadata and/or transaction metadata. The product metadata includes, one or more of, delivery price, delivery date, availability, product name, product brand, product release date, product manufacturing date, manufacturer, price, tax, VAT, user reviews, critic reviews, product features, product material, manufacturing location, seller ID, seller rating, seller reviews, etc.

The transaction metadata can facilitate a transaction with respect to the product offering and can includes, one or more of, price, volume discounts, discounts, student discounts, loan term, rent or lease term, license terms, etc. In general, the platform supports transactions including but not limited to, a sale, purchase, exchange, barter, rent, lease, rent, license, borrow or loan transaction.

For example, a furniture company F (seller, retailer, reseller, and/or manufacturer) can list some furniture (e.g., sofa, coffee table, lamps, etc.) and place them near or outside a new residential apartment building in New York City. In addition, the furniture company can place the listed furniture as VOBs inside individual units in the new apartment building such that prospective renters or buyers of an apartment can visualize the furniture when viewing the apartments.

The VOBs of the furniture listed for sale can include or be associated with product information. For example, the VOB product metadata can include, furniture name, price, material, availability, earliest shipment date, release date, shipping cost, manufacturer, manufacturing location, etc. The transaction metadata can include, the price of the furniture for purchase, or the price to rent the furniture and terms of the furniture rental, etc. The apartment renters or buyers can also purchase the furniture then and there, and have it delivered at a specified date.

As such, the platform (e.g., as hosted by server 100 of FIG. 1, server 300 of FIG. 3A) enables the physical location (e.g., outside the new apartment building and/or inside specific units of the new New York apartment building) with which the virtual object (e.g., product listing of various furniture pieces) is associated, to be specified by a seller entity (e.g., furniture company F).

In some examples, the seller entity can be an individual user (e.g., independent individual furniture maker, used furniture seller, antique furniture dealer, etc.). Note that a seller entity can also be a platform (e.g., a furniture reseller platform) hosted by a third party entity. In one embodiment, third party entities can sell assets on the platform in accordance with payment or revenue share terms of the platform (e.g., as hosted by server 100 of FIG. 1, server 300 of FIG. 3A). In one embodiment, the system (e.g., server 100 of FIG. 1, server 300 of FIG. 3A) can resell the per-use versions of third party objects.

The virtual object, can be rendered at the physical location or rendered to appear to be located at the physical location (e.g., outside the new apartment building and/or inside specific units of the new New York apartment building) in the marketplace in the augmented reality environment, in process 1304.

Moreover, a model of the product offering, can be rendered in the virtual object at the physical location, in process 1306. For example, a real life size of the furniture listing available for sale or rent can be made to appear in a unit in the building for visualization. The apartment buyer or renter can manipulate the VOB of the furniture listing to rearrange its location or position, change the color, pattern, change the finish (e.g., fabric, leather, wood, stainless steel, chrome, etc.) to visualize how it fits into the space and to examine or select colors, patterns, etc.

In a further embodiment, the model of the product offering depicted in the virtual object is rendered in 3D or substantially in 360 degrees. The virtual object can enable a user to enter the model of the product offering to explore internals of the product offering.

For example, in the case of a product listing for a car represented by a VOB, the VOB can be a 3D model of the car's exteriors and interiors. The VOB can be the size of a real life car and the prospective buyer or renter can enter into (e.g. step into) the VOB of the car and test the experience from the interior of the car.

In another case of a product listing of a house on the market (e.g., either it has not yet been built, or the house is in a different location) and is represented by a VOB in the marketplace, the VOB can be the size of the house, and the prospective buyer, or renter can enter into the VOB to see the inside of the house. The VOB of the house can thus be rendered wherever the prospective buyer or renter is, or at a real estate agent's office.

User interaction is enabled with the model of the product offering via the virtual object, in process 1308. The interaction with the object can be initiated by voice, touch, eye, gaze, gesture (body, hand, head, arms, legs, limbs, eyes, torso, etc.), text input and/or other command submitted by the given user with respect to the object. The interaction can also be initiated through input text or gestured to specify the text. The interaction can also include a reply to the object where the reply can include emoticon, GIFs, stickers, multimedia content or other attachments. Voice command can also be used to specify attachments or identify other content to be included in the reply to the object. The reply can include another VOB or multiple other VOBs including or without other types of content. Any combination of the above input can be used to interact with the object.

Further embodiments include detecting interaction with the virtual object representing the product offering and rendering augmented reality features embodied in the virtual object in the augmented reality environment. The augmented reality features can include, for example, stickers, GIFs, digital tattoos, emoticons, animations, videos, clips, games, objects or scenes rendered in 360 degrees or 3D and/or music, sounds, tones. The augmented reality features can also include one or more of, a performance, an action, a routine rendered or played in 360 degrees or 3D.

The rendering of the model of the product offering, is updated, in the augmented reality environment, in response to the user interaction, in process 1310. For example, the rendering of the VOB of a car is changed from a view of the interior when the user steps into the car. The user (e.g. prospective car buyer or renter) can also change the color or finish of the interior (e.g. black leather to red leather, or camel leather, etc.). Laura, who is viewing a sofa listing VOB inside a Manhattan apartment can interact with the virtual sofa to change its color from blue to red to visualize the color scheme inside the apartment.

Laura, after trying different locations for the sofa using the VOB, and testing different colors or finishes of the sofa can decide to purchase a red soft with a leather finish. Laura can, via the VOB, specify the options (e.g., red, leather) of the sofa which she wants, ascertain whether it is available and its availability date. Laura can also via the VOB pay for the sofa and arrange for the sofa to be delivered to the apartment on a suitable date.

As such transaction is initiated responsive to detection of a transaction request with respect to the virtual object in the augmented reality environment. The transaction with respect to the product offering is facilitated in the augmented reality environment, in process 1312. The transaction with respect to the product offering is fulfilled in the real world environment, in process 1314.

The marketplace in the augmented reality environment can include multiple virtual objects and each of the multiple virtual objects can represent a different product offering (e.g., a car, a house, a sofa, a coffee table, a table lamp, an earring, a ski mask, etc.). Different product offerings can have different selling entities and can be placed at different physical locations in the real world environment.

As such a second virtual object which represents a second product offering having real-world value can be associated with a second physical location in the real world environment, such that the second virtual object is rendered in the marketplace in the augmented reality environment, at the second physical location or is rendered in the augmented reality environment to appear to be located at the second physical location. The physical location with which the second virtual object is associated, is specified by a second seller entity.

For example, flooring specialist (Jon's Floors) can sell hardwood, carpet or laminate floors and can elect to show their floors in another New York apartment building. Prospective customers looking for floors upgrades can try out different types of flooring solutions offered by Jon's Floors in their apartment and conduct a transaction to purchase the floor and/or arrange an installation.

In general, multiple seller entities provide product offerings having real-world value in the marketplace to be transacted on via the augmented reality environment. Multiple virtual objects are can be to represent each of the product listings in the augmented reality environment.

In one example, one of the multiple virtual objects is associated with a given physical location in the real world environment where the given physical location is specified by one of the seller entities who listed a given product offering associated with the one of the multiple virtual objects.

One embodiment includes world locking the given virtual object to the physical location of the real world environment. In this case, the physical location with which the VOB is associated with is fixed and the virtual object can be perceptible to a user, if and when the given user is physically at or in a vicinity of the physical location. The world locked virtual object is enabled to be interacted with by the user if and when the user is at or in a vicinity of the physical location. Moreover, the transaction with respect to the product offering is enabled, if and when the user is at or in a vicinity of the physical location.

In an alternative embodiment, a given VOB is user locked. In this case the physical location with which the virtual object is associated, includes a physical space around a user, the physical space around the user being moveable with movement of the user in the real world environment. The virtual object representing the given product listing is then rendered in the augmented reality environment to move with or appear to move with the user in the augmented reality environment.

Embodiments of the present disclosure include detecting the movement of the user in the real world environment, identifying changes in location of the physical space around the user due to the movement of the user in the real world environment, and rendering the virtual object to move in the augmented reality environment in accordance with the changes in location of the physical space around the user such that the virtual object moves with or appears to move with the user in the augmented reality environment. Moreover, the transaction with respect to the product offering is enabled, if and when a second user is at or in a vicinity of the physical space around the user.

Figure 13B:
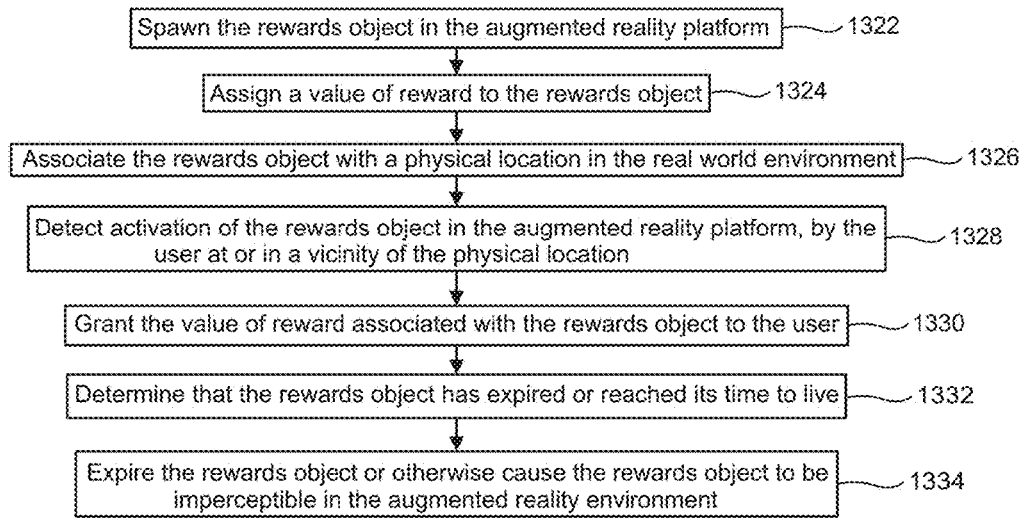
FIG. 13B depicts a flow chart illustrating an example process to spawn a rewards object in an augmented reality environment, in accordance with embodiments of the present disclosure.

FIG. 13B depicts a flow chart illustrating an example process to spawn a rewards object in an augmented reality environment, in accordance with embodiments of the present disclosure.

A rewards object can include, one or more of, virtual currency, digital currency, cryptocurrency, virtual money, crystals, gems, points, credits, gold, silver. The system can include support and/or generate 3D objects for: coins, pile of coins, silver coins, gold coins, gems of various styles and colors, power up crystals, etc.

Some rewards objects or treasures include power ups. Power up objects can enable users to see hidden treasures, see more VOBs in their view of the AR environment, get a higher spawn rate for rewards objects for a while, and/or have bigger rewards for their rewards objects. Other power ups can make avatars of users glow brighter or appear more special in a group for a while—stand out, be more popular.

One embodiment includes rewards that are treasures that provide points, powerups that enhance your game play. For example, power-ups allow or enable users can see VOBs in the AR environment that were not visible to others, perform operations or actions in the AR environment that others cannot. A rewards object can also include, a limited edition virtual object. The limited edition virtual object is collectible by the user. In some instances, only specific number of them (e.g., 1000, 10000, etc.) were made and the authenticity of the limited edition virtual object can be authenticated via a ledger of distributed ledger (block chain) to certify their authenticity. There can be rewards objects that are world locked or user locked. Rewards objects can be seen by a particular user or by everyone or any group. The disclosed marketplace can be used in trading or exchanging or buying the limited edition VOBs.

In one embodiment, the system (e.g., server 100 of FIG. 1, server 300 of FIG. 3A) enables placement of rewards objects such as, coins, crystals, gift cards, chests, presents, fortune cookies, at specified places (e.g., in people's homes and offices, school, on the street, etc.) The system can also enable rewards objects to be placed for example, within a given distance (e.g., 1 feet, 2 feet, 5 feet, up to 15 meters, up to 50 meters or up to 100 meters, over 100 meters, etc.) of anywhere another user dwells for more than a given amount of time (e.g., 5 min, 10, min, 30 min, 1 hour, 2 hours, over 2 hours, etc.)

In some instances, these rewards objects can be visible only to the specified recipients (e.g., Bob). These can be rewards objects which are treasures around Bob that gives Bob points—that only Bob and/or other specified users can find. These rewards objects can further include gifts/treasures that Bob's friends or connections have given to Bob.

There are also rewards objects that are treasures that anyone can find—these can be found competitively. Note that there can be a few different layers of treasures—treasures in the public layer which can be for example, first come first serve or limited edition, treasures that only Bob can see that are either spawned by system or given to Bob by a friend, treasures for groups/layers that are published by the layer owner.

The rewards object is spawned in the augmented reality platform, in process 1322. The rewards object can be associated with a physical location in the real world environment, as in process 1326 such that the virtual object is rendered in the digital in the augmented reality platform, at the physical location or is rendered in the augmented reality platform to appear to be located at the physical location.

In one embodiment, the system (e.g., server 100 of FIG. 1, server 300 of FIG. 3A) can automate the spawning of rewards objects in the AR environment. To spawn rewards objects, a rewards campaign can be set up. It can apply to the entire world or to certain targeted locations, and/or any targeted set of users, over any period of time or all time, and/or under all conditions or only special conditions.

To configure a rewards campaign, one can configure a set of variables that define the campaign. For example, the probability that rewards of various value levels are to be spawned can be specified, the probability can be configured or specified using variables including, per unit time, per unit volume of physical space or per unit area of physical area, at a given time, at a given time range, per user, per user group, or based on context, etc. The value of rewards objects can also be configured per campaign such the probability of each type or tier of reward can be separately configured in the campaign. A function or table, or matrix can be used to represent various combinations or permutations of these variables.

Rewards can also be configured such that there is an infinite or finite number of rewards objects available from a single virtual object. For example, a rewards campaign can spawn rewards objects (e.g., virtual money or crystals or cash) at various locations—where each object vends 10 copies of itself to the first 10 people. The object might indicate how many are left on a badge on the object.

In general, rewards objects or treasures can have points associates them. When the system (e.g., server 100 of FIG. 1, server 300 of FIG. 3A) generates or spawns objects, points can be assigned by the system. When a user (e.g., individual user, entity, user group, corporation, advertiser, etc.) wants to put some points on a rewards object, the user can, in one embodiment, acquire the points via the system (e.g., with or without volume discount) to be associated the rewards object to be collected or gained by a user who collects, activates or otherwise interacts with the rewards object.

As such, in one embodiment, a value of reward is assigned to the rewards object, in process 1324. The rewards object can be associated with a rewards campaign. The rewards campaign can for instance, identify a set of users or criteria to identify the set of users to whom the rewards object is perceptible in the augmented reality platform. The rewards campaign can also identify or specify a contextual trigger which causes the spawning of the rewards object in the augmented reality environment.

In one embodiment the rewards campaign defines a probability that the rewards object is spawned in the augmented reality environment relative to another rewards object. The probability that the rewards object is spawned in the augmented reality environment relative to another rewards object can be specified for a given time or time period. In addition, the probability that the rewards object is spawned in the augmented reality environment relative to another rewards object is specified for the physical location in the real world environment. The probability can also be specified for the physical location at a given time instant, or over the time period.

In a further embodiment, the probability that the rewards object is spawned in the augmented reality environment relative to another rewards object can be specified for the user. For example, there can be additional kickers to rewards values or probability of seeing rewards objects in the AR environment based on user rank, user context, and/or other states of a user. Any combination and any number of the variables including time, location, user, context can be used to define or specify spawning probability.

The value of reward for rewards objects can also be defined or specified in the rewards campaign. The rewards campaign can be configured by a friend of the user in the real world environment, where the rewards object was designated to be received by the user from the friend. A rewards campaign can alternatively be configured by a third party advertiser. The reward value of the rewards object can then be purchased by a third party advertiser from a host of the augmented reality platform.

The rewards objects can for instance vend some information or render content or perform some other action. In order for the user to get the point, the user may be required to activate the rewards object, interact with it, and/or consume, view or access the information or content associated with or vended by the rewards object. For example, an advertiser or publisher can associate a rewards object with their video or ad, and offer some points to users if they interact with it, read it, listen to it, answer a question, collect it, watch it, share it, favorite it, like it, etc.

Therefore, the system (e.g., server 100 of FIG. 1, server 300 of FIG. 3A) can associate the rewards object with an advertisement having interactive content. The rewards object can be activated in response to detecting interaction with the advertisement by the user in the augmented reality platform. Activation of the rewards object can then be detected in the augmented reality platform, by the user at or in a vicinity of the physical location, in process 1328. The interaction with the interactive content includes one or more of, a collection action, a view or playback action or a share action.

The interaction with the object can be initiated by voice, touch, eye, gaze, gesture (body, hand, head, arms, legs, limbs, eyes, torso, etc.), text input and/or other command submitted by the given user with respect to the object. For example, a voice command can be used to input a reply to the first generated content. The interaction can also be initiated through input text or gestured to specify the text. The interaction can also include a reply to the object where the reply can include emoticon, GIFs, stickers, multimedia content or other attachments. Voice command can also be used to specify attachments or identify other content to be included in the reply to the object. The reply can include another VOB or multiple other VOBs including or without other types of content. Any combination of the above input can be used to interact with and/or respond to the object.

Augmented reality features embodied in the rewards object can also be rendered in the augmented reality environment. The augmented reality features can include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

In a further embodiment, the value of reward associated with the rewards object is granted to the user, in process 1330. The value of reward (e.g., points) can be used usable for exchange or transaction in the augmented reality platform or in the real world environment.

Embodiments of the present disclosure further include, assigning or designating a time-to-live or expiration time to the rewards object. Some rewards objects may only appear very briefly, and/or may recur and only appear for a few minutes at a time with each recurrence. The time to can be specified in a parameter of the rewards campaign associated with the rewards object. When it is determined that the rewards object has expired or reached its time to live, as in process 1332, the rewards object can be set to have been expired or otherwise caused to be unperceptible in the augmented reality environment, in process 1334.

One embodiment of the present disclosure includes a treasure loop competitive interaction. The point system can start with by way of example, 1 point per object. Treasure loops offered by advertisers can offer more points.

Further embodiments of the present disclosure include Revealing Unexplored vs. Explored Territory in the AR environment. A user-interface for AR can for example, show unexplored areas around a user or on the map as a different color or shade or style of image from areas that have previously been explored. This can reveal what areas a user, or members of a group, have explored or not. Unexplored areas can have virtual objects, rewards objects or treasures that have not been found yet. The first user or few users to navigate or explore a place can find certain rewards objects that are there only for the first party to uncover the place.

Further embodiments of the present disclosure include, examples of special types of VOBs. For example, Special virtual objects can be provided to facilitate a way to share and access: Profiles, messaging groups, UGC (user generated content) (e.g., in the public layer (the default public group)), UGC in sites (private layers for content sharing with audience), Shopping, Games, Advertisements, Search queries or Business Cards (e.g., users can have a business card object that users can customize).

There can be a virtual outline around a place for an event, for example, A Virtual Border, Virtual Fence that is visible in AR mode and on maps to users. A type of VOB can include a wand. For example, an AR want can be used to select virtual objects—this could be a physical wand device.

Examples of the present disclosure further include VOBs that dispenses, triggers, releases, etc. other virtual objects. For example, a VOB can dispenses other objects similar to an augmented reality vending machine. The disclosed system enables some set of VOBs to be vended/dispensed for free or for a fee, to users who interact with the dispensed object.

Further embodiments of the present disclosure include, a VOB, AR event or action that can be spawned, triggered or controlled by a physical device. For example, the disclosed system includes an AR trigger in the real world with a physical presence that spawns an AR object, AR action, or any other AR event. Examples of the physical trigger can include by way of example, one or more of: actuator, zipper, button, switch, landmine, lever, trap door, door knob, light switch, springs, etc.

Figure 14:
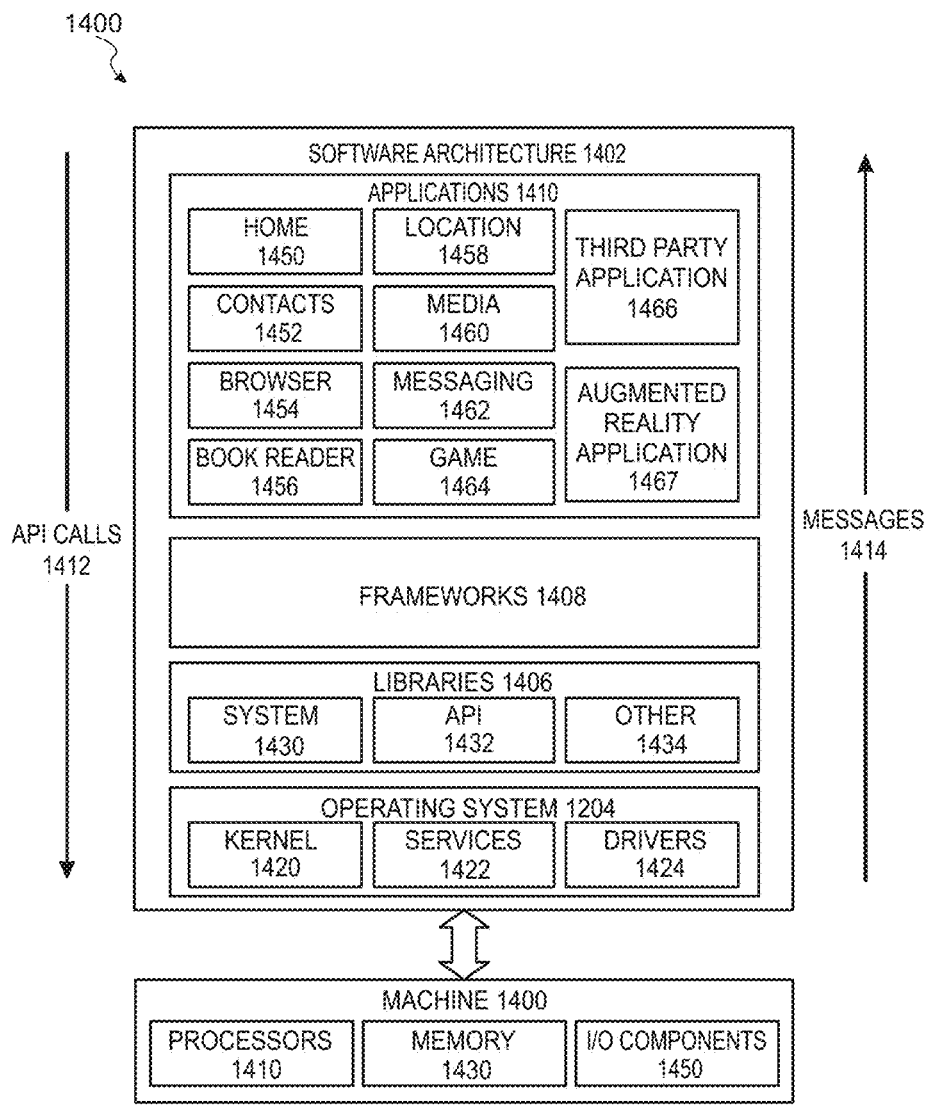
FIG. 14 is a block diagram illustrating an example of a software architecture that may be installed on a machine, in accordance with embodiments of the present disclosure.

FIG. 14 is a block diagram illustrating an example of a software architecture 1400 that may be installed on a machine, in accordance with embodiments of the present disclosure.

FIG. 14 is a block diagram 1400 illustrating an architecture of software 1402, which can be installed on any one or more of the devices described above. FIG. 14 is a non-limiting example of a software architecture, and it will be appreciated that many other architectures can be implemented to facilitate the functionality described herein. In various embodiments, the software 1402 is implemented by hardware such as machine 1500 of FIG. 15 that includes processors 1510, memory 1530, and input/output (I/O) components 1550. In this example architecture, the software 1402 can be conceptualized as a stack of layers where each layer may provide a particular functionality. For example, the software 1402 includes layers such as an operating system 1404, libraries 1406, frameworks 1408, and applications 1410. Operationally, the applications 1410 invoke API calls 1412 through the software stack and receive messages 1414 in response to the API calls 1412, in accordance with some embodiments.

In some embodiments, the operating system 1404 manages hardware resources and provides common services. The operating system 1404 includes, for example, a kernel 1420, services 1422, and drivers 1424. The kernel 1420 acts as an abstraction layer between the hardware and the other software layers consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH drivers, flash memory drivers, serial communication drivers (e.g., Universal Serial Bus (USB) drivers), WI-FI drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematics functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a search/discovery application 1456, a location application 1458, a media application 1460, a messaging application 1462, a game application 1464, and other applications such as a third party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third party application 1466 (e.g., an application developed using the Android, Windows or iOS. software development kit (SDK) by an entity other than the vendor of the particular platform) may be mobile software running on a mobile operating system such as Android, Windows or iOS, or another mobile operating system. In this example, the third party application 1466 can invoke the API calls 1412 provided by the operating system 1404 to facilitate functionality described herein.

An augmented reality application 1467 may implement any system or method described herein, including integration of augmented, alternate, virtual and/or mixed realities for digital experience enhancement, or any other operation described herein.

Figure 15:
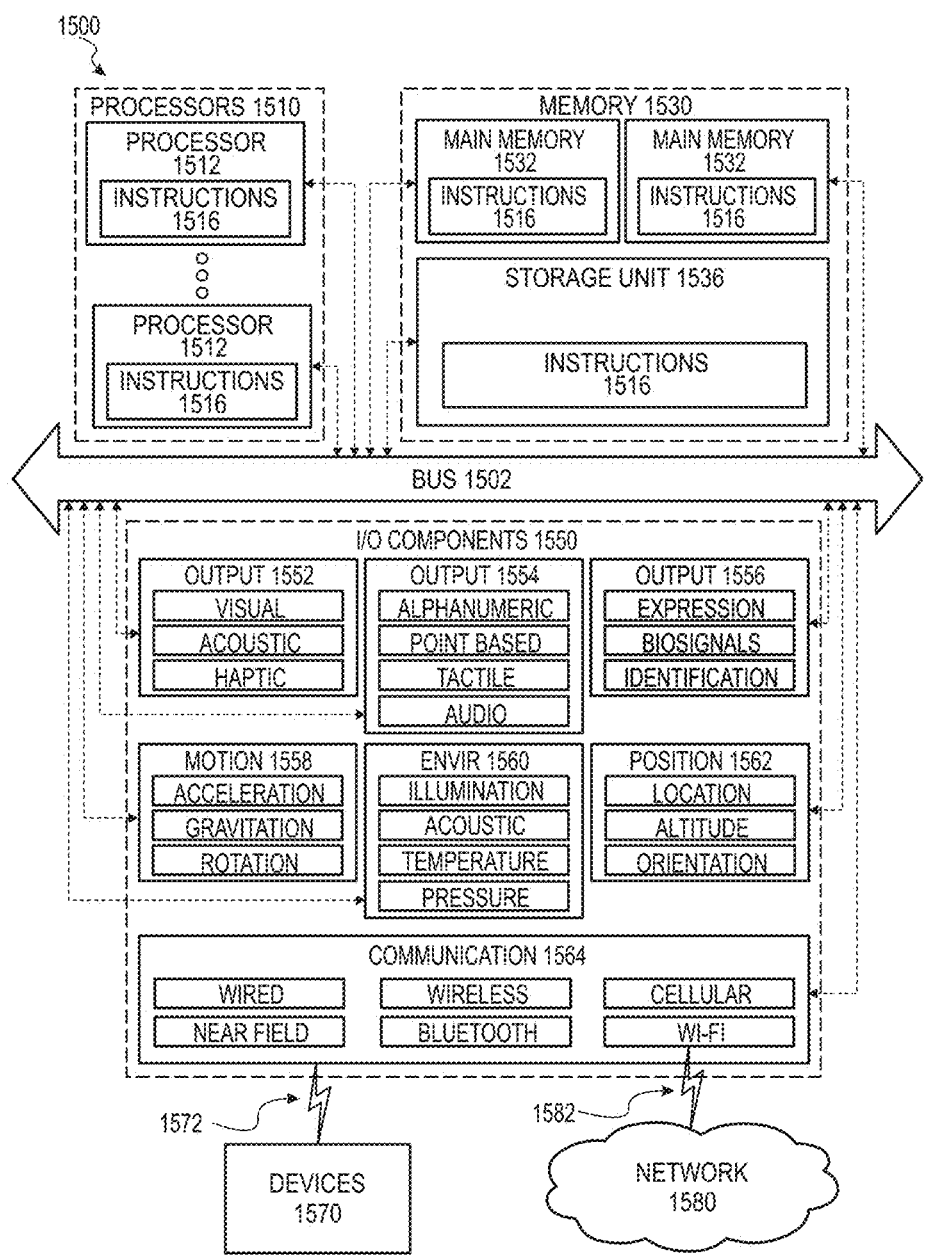
FIG. 15 is a block diagram illustrating components of a machine, according to some example embodiments, able to read a set of instructions from a machine-readable medium (e.g., a machine-readable storage medium) and perform any one or more of the methodologies discussed herein.

FIG. 15 is a block diagram illustrating components of a machine 1500, according to some example embodiments, able to read a set of instructions from a machine-readable medium (e.g., a machine-readable storage medium) and perform any one or more of the methodologies discussed herein.

Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. Additionally, or alternatively, the instruction can implement any module of FIG. 3A and any module of FIG. 4A, and so forth. The instructions transform the general, non-programmed machine into a particular machine programmed to carry out the described and illustrated functions in the manner described.

In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 can include processors 1510, memory/storage 1530, and I/O components 1550, which can be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1512 and processor 1510 that may execute instructions 1516. The term "processor" is intended to include multi-core processor that may comprise two or more independent processors (sometimes referred to as "cores") that can execute instructions contemporaneously. Although FIG. 15 shows multiple processors, the machine 1500 may include a single processor with a single core, a single processor with multiple cores (e.g., a multi-core processor), multiple processors with a single core, multiple processors with multiples cores, or any combination thereof.

The memory/storage 1530 can include a main memory 1532, a static memory 1534, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 can also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, the term "machine-readable medium" or "machine-readable storage medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" or "machine-readable storage medium" should be taken to include a single medium or multiple media (e.g., a centralized or distributed database, or associated caches and servers) able to store instructions 1216. The term "machine-readable medium" or "machine-readable storage medium" shall also be taken to include any medium, or combination of multiple media, that is capable of storing, encoding or carrying a set of instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 1550 can include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 can include many other components that are not shown in FIG. 15. The I/O components 1550 are grouped according to functionality merely for simplifying the following discussion and the grouping is in no way limiting. In example embodiments, the I/O components 1550 can include output components 1552 and input components 1554. The output components 1552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 1552 can include biometric components 1556, motion components 1558, environmental components 1560, or position components 1562 among a wide array of other components. For example, the biometric components 1556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 can include acceleration sensor components (e.g., an accelerometer), gravitation sensor components, rotation sensor components (e.g., a gyroscope), and so forth. The environmental components 1560 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or other suitable device to interface with the network 1580. In further examples, communication components 1564 include wired communication components, wireless communication components, cellular communication components, Near Field Communication (NFC) components, Bluetooth. components (e.g., Bluetooth. Low Energy), WI-FI components, and other communication components to provide communication via other modalities. The devices 1570 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 1564 can detect identifiers or include components operable to detect identifiers. For example, the communication components 1564 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or other type of cellular or wireless coupling. In this example, the coupling 1582 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 can be transmitted or received over the network 1580 using a transmission medium via a network interface device (e.g., a network interface component included in the communication components 1564) and utilizing any one of a number of transfer protocols (e.g., HTTP). Similarly, the instructions 1516 can be transmitted or received using a transmission medium via the coupling 1572 (e.g., a peer-to-peer coupling) to devices 1570. The term "transmission medium" shall be taken to include any intangible medium that is capable of storing, encoding, or carrying the instructions 1516 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure. Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method to facilitate an augmented reality experience in an augmented reality environment of a real world environment, the method, comprising:
   causing to be perceptible, by a recipient user of the augmented reality environment, a virtual object, such that the recipient user is able to engage in the augmented reality experience;
   wherein, the virtual object is shared with the recipient user by another entity that uses the augmented reality environment;
   wherein, the virtual object is depicted such that the recipient user engages in the augmented reality experience via the augmented reality environment;
   rendering or depicting content associated with the virtual object, responsive to detection of a contextual trigger;
   wherein, the contextual trigger occurs when the recipient user is engaging in a given action or activity in a given location in the real world environment or at a given time;
   wherein:
   the content associated with the virtual object is rendered or depicted during the augmented reality experience includes multiple stages of rendering;
   wherein, the multiple stages of rendering are tracked with and identified by a status parameter of the virtual object.

2. The method of claim 1, wherein:
   the contextual trigger occurs at one or more of:
   predetermined times or time periods;
   certain locations in the real world environment.

3. The method of claim 1, further comprising:
   detecting an interaction trigger with respect to the virtual object, the interaction trigger being detected responsive to engagement with the augmented reality experience in the augmented reality environment;
   further rendering or depicting the content associated with the virtual object;
   wherein, the content associated with the virtual object is further rendered or depicted, in a subsequent stage of the multiple stages of rendering;
   wherein, the subsequent stage of rendering is identified based on one or more of, the status parameter or the interaction trigger;
   wherein, a state of the virtual object after the content has cycled through the multiple stages of rendering is further determined by the status parameter of the virtual object, the state including, one or more of:
   an expire state, a vanish state, a continue state, a pause state, a morph state, and a change state.

4. The method of claim 1, wherein:
   the content associated with the virtual object is rendered or depicted during the augmented reality experience includes multiple stages of rendering;
   wherein, the multiple stages of rendering includes, one or more of:
   depiction or presentation of a name, title or subject of the virtual object;
   depiction of behaviors or animations of the virtual object;
   depiction of a payload portion of the content;
   wherein, the payload portion of the content includes, one or more of:
   a video, a text based message, a game, an experience, a prize and points.

5. The method of claim 1, wherein:
   the augmented reality experience includes one or more of:
   (i) a real time or near real time augmented reality chat session or an augmented reality messaging session;
   (ii) asynchronous exchanges of augmented reality messages, augmented reality conversations, augmented reality electronic mail or augmented reality greeting cards; and
   (iii) a multiplayer mode gaming experience, wherein, the recipient user and the other entity interact with the virtual object.

6. The method of claim 1, wherein, the virtual object includes, one or more of:
  (i) a greeting card, wherein, the content of the greeting card is at least in part specified or designed by the other entity and designated for the recipient user; wherein, the greeting card includes a template style or template design having 3D features or 3D scenes that are pre-configured; and
  (ii) a business card, wherein, the business card is for the other entity and designated for the recipient user;
  wherein, the content associated with the virtual object includes one or more of a text message, a conversation, a graphical message, music or other audible content, works of art, animation, games, scenes, limericks, jokes, a 3D scene, and an animated 3D object.

7. A system to facilitate an augmented reality experience in an augmented reality environment of a real world environment, the system, comprising:
  a processor,
  memory coupled to the processor, the memory having stored thereon instructions, which when executed by the processor, cause the processor to:
  cause to be perceptible, by a recipient user of the augmented reality environment, a virtual object, such that the recipient user is able to engage in the augmented reality experience;
  render or present content associated with the virtual object, responsive to detection of a contextual trigger;
  wherein, the virtual object is shared with the recipient user by another entity that uses the augmented reality environment;
  wherein, the content associated with the virtual object is rendered or presented during the augmented reality experience includes multiple stages of rendering;
  wherein, the multiple stages of rendering are tracked with and identified by a status parameter of the virtual object.

8. The system of claim 7,
  wherein, the contextual trigger occurs when the recipient user is engaging in a given action or activity in a given location in the real world environment or at a given time.

9. The system of claim 7, wherein:
  the contextual trigger occurs at one or more of:
    predetermined times or time periods;
    certain locations in the real world environment.

10. The system of claim 7, wherein, the memory having further stored thereon instructions, which when executed by the processor, cause the processor to:
  detect an interaction trigger with respect to the virtual object, the interaction trigger being detected responsive to engagement with the augmented reality experience in the augmented reality environment;
  further render or present the content associated with the virtual object;
  wherein, the content associated with the virtual object is further rendered or presented, in a subsequent stage of the multiple stages of rendering.

11. The system of claim 7,
  wherein, a state of the virtual object after the content has cycled through the multiple stages of rendering is further determined by the status parameter of the virtual object.

12. The system of claim 7,
  wherein, the multiple stages of rendering includes, one or more of:
    presentation of a name, title or subject of the virtual object;
    depiction of behaviors or animations of the virtual object.

13. The system of claim 7, wherein, the multiple stages of rendering includes:
  depiction of a payload portion of the content.

14. The system of claim 7, wherein:
  the augmented reality experience includes one or more of:
    (i) a real time or near real time augmented reality chat session or an augmented reality messaging session; and
    (ii) asynchronous exchanges of augmented reality messages, augmented reality conversations, augmented reality electronic mail or augmented reality greeting cards.

15. The system of claim 7, wherein:
  the virtual object is caused to be perceptible to the recipient user, in response to
    determination that the recipient user is an intended recipient, or
    determination that the recipient user is in a given location in the real world environment.

16. A method to facilitate an augmented reality experience in an augmented reality environment of a real world environment, the method, comprising:
  causing to be perceptible, by a recipient user of the augmented reality environment, a virtual object, such that the recipient user is able to engage in the augmented reality experience;
  wherein, the virtual object is shared with the recipient user by another entity that uses the augmented reality environment;
  wherein, the virtual object is depicted such that the recipient user engages in the augmented reality experience via the augmented reality environment;
  wherein, content associated with the virtual object is rendered or presented during the augmented reality experience includes multiple stages of rendering;
  wherein, the multiple stages of rendering are tracked with and identified by a status parameter of the virtual object.

17. The method of claim 16, further comprising:
  rendering or presenting the content associated with the virtual object, responsive to detection of a contextual trigger;
  wherein, the contextual trigger occurs when the recipient user is engaging in a given action or activity in a given location in the real world environment.

18. The method of claim 16, further comprising:
  rendering or presenting the content associated with the virtual object, responsive to detection of a contextual trigger;
  wherein, the contextual trigger occurs when the recipient user is engaging in a given action or activity at a given time.

19. The method of claim 16, further comprising, rendering or presenting the content associated with the virtual object, responsive to detection of a contextual trigger;
  wherein:
    the contextual trigger occurs at one or more of:
      predetermined times or time periods;
      certain locations in the real world environment.

20. The method of claim 16, further comprising:
  detecting an interaction trigger with respect to the virtual object, the interaction trigger being detected responsive to engagement with the augmented reality experience in the augmented reality environment;

further rendering or presenting the content associated with the virtual object;

wherein, the content associated with the virtual object is further rendered or presented, in a subsequent stage of the multiple stages of rendering;

wherein, the subsequent stage of rendering is identified based on one or more of, the status parameter or the interaction trigger.

* * * * *